(12) United States Patent
Mischel, Jr. et al.

(10) Patent No.: US 11,737,182 B1
(45) Date of Patent: *Aug. 22, 2023

(54) SYSTEMS AND METHODS FOR CHANGING A COLOR TEMPERATURE OF A LIGHT

(71) Applicant: ELECTRIC MIRROR, LLC, Everett, WA (US)

(72) Inventors: James V Mischel, Jr., Seattle, WA (US); James Vernon Mischel, Sr., Arlington, WA (US); Richard Allen Lindsay, Mukilteo, WA (US); Michael Martin Uhl, Seattle, WA (US); Johann Friedrich Adam, Seattle, WA (US)

(73) Assignee: ELECTRIC MIRROR, LLC, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,297

(22) Filed: Nov. 8, 2020

Related U.S. Application Data

(63) Continuation of application No. 15/604,617, filed on May 24, 2017, now Pat. No. 10,939,522.
(Continued)

(51) Int. Cl.
*H05B 33/00* (2006.01)
*H05B 45/20* (2020.01)
(Continued)

(52) U.S. Cl.
CPC ............ *H05B 45/20* (2020.01); *H05B 47/16* (2020.01); *H05B 47/19* (2020.01)

(58) Field of Classification Search
CPC .. B60R 11/04; B60R 1/00; B60R 1/12; B60R 11/0235; B60R 1/1207; B60R 2011/0026; B60R 2011/0033; B60R 2011/0082; B60R 2011/0084; B60R 2011/0089; B60R 2011/0282; B60R 2011/0288; B60R 2011/0294; B60R 2001/1215; B60R 2001/1253; B60R 2300/105; B60R 2300/406; B60R 2300/806; B60R 11/0241; B60R 11/0247; B60R 1/02; B60R 1/025; B60R 1/04; B60R 1/06; B60R 2001/1223;
(Continued)

(56) References Cited

U.S. PATENT DOCUMENTS

| 2013/0342131 A1* | 12/2013 | Recker | H02J 50/40 |
| | | | 315/292 |
| 2014/0001963 A1* | 1/2014 | Chobot | H05B 47/165 |
| | | | 315/153 |

(Continued)

*Primary Examiner* — Monica C King
(74) *Attorney, Agent, or Firm* — Peloquin, PLLC; Mark S. Peloquin, Esq.

(57) ABSTRACT

Systems and methods include reading a value of a desired light color temperature-time function. A first drive signal parameter is selected for a first light source having a first color temperature and a second drive signal parameter is selected for a second light source having a second color temperature. The drive signal parameters are selected to create a color temperature for a value of the desired light color temperature-time function. First light is emitted from the first light source and second light from the second light source. The first light and the second light combine to form blended light at the color temperature for the value of the desired light color temperature-time function.

18 Claims, 54 Drawing Sheets

Related U.S. Application Data

(60) Provisional application No. 62/488,782, filed on Apr. 23, 2017, provisional application No. 62/488,766, filed on Apr. 23, 2017, provisional application No. 62/484,923, filed on Apr. 13, 2017, provisional application No. 62/423,612, filed on Nov. 17, 2016, provisional application No. 62/340,845, filed on May 24, 2016.

(51) Int. Cl.
*H05B 47/19* (2020.01)
*H05B 47/16* (2020.01)

(58) Field of Classification Search
CPC ....... B60R 2001/1284; B60R 2011/004; B60R 21/01566; B60R 2300/103; B60R 2300/106; B60R 2300/302; B60R 2300/8026; B60R 2300/804; B60R 2300/8053; B60R 1/003; B60R 2300/10; B60R 2300/20; B60R 2300/308; B60R 2300/808; B60R 1/088; B60R 2300/301; B60R 2300/8066; B60R 2300/207; B60R 2300/8093; B60R 2021/0004; B60R 2021/23107; B60R 2021/23153; B60R 2021/23161; B60R 2021/23169; B60R 2021/23519; B60R 2021/23523; B60R 2021/23557; B60R 2021/2358; B60R 2021/2359; B60R 21/20; B60R 21/213; B60R 21/232; B60R 21/233; B60R 21/235; B60R 21/30

See application file for complete search history.

(56) References Cited

U.S. PATENT DOCUMENTS

2014/0028196 A1\* 1/2014 Taki ................ H05B 45/10
 315/130
2017/0079111 A1\* 3/2017 Rezeanu ............ H05B 47/105

\* cited by examiner

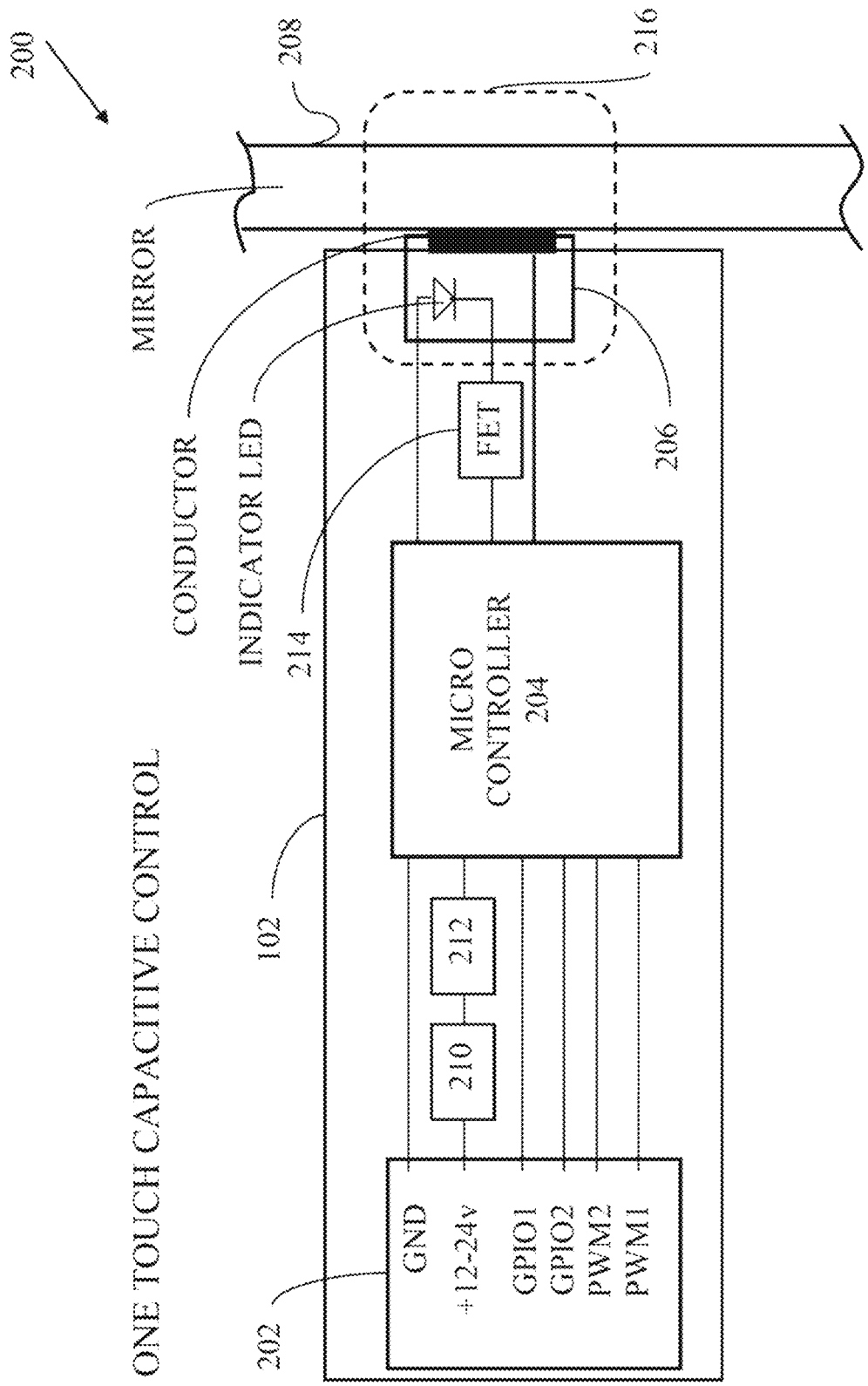

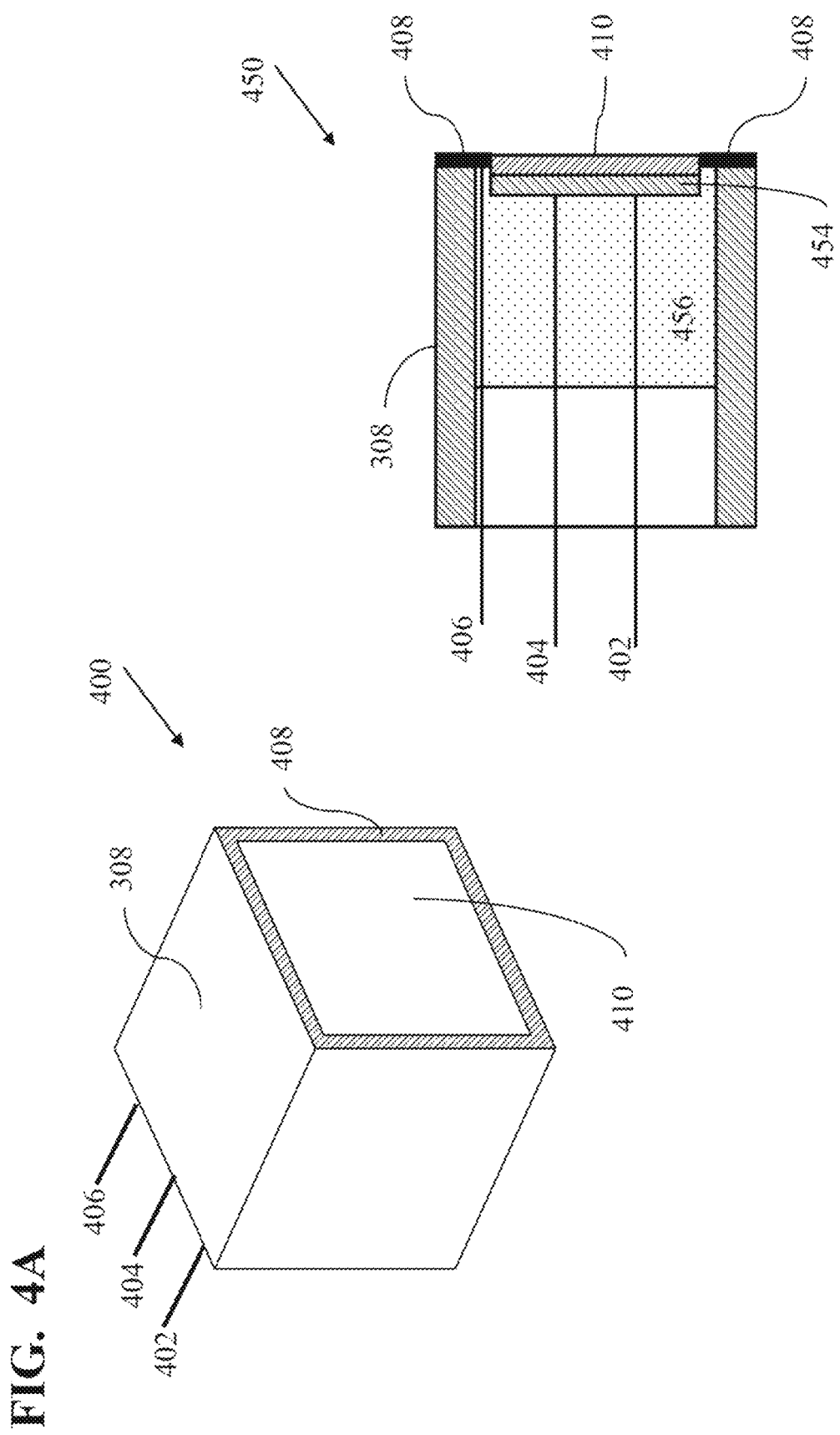

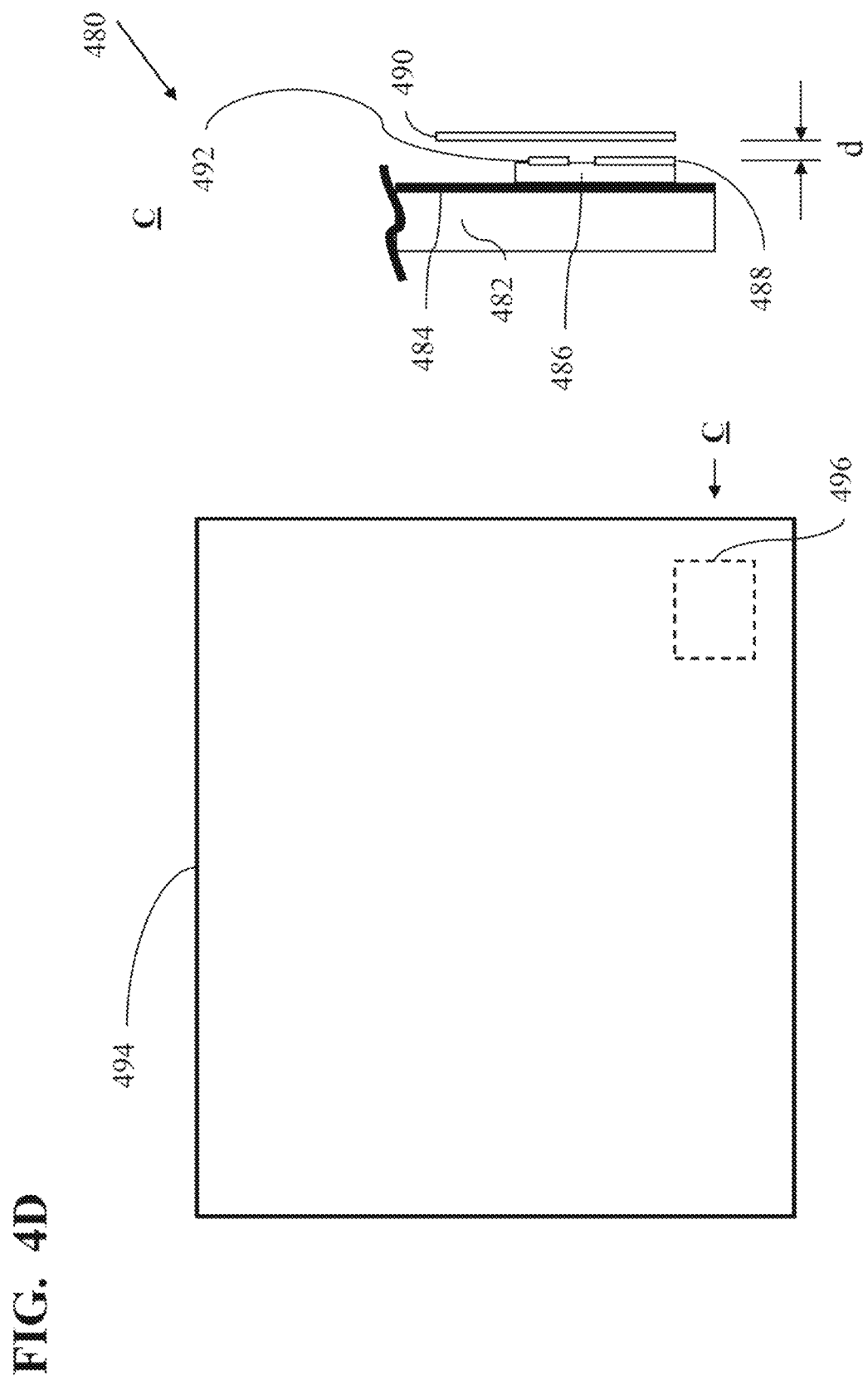

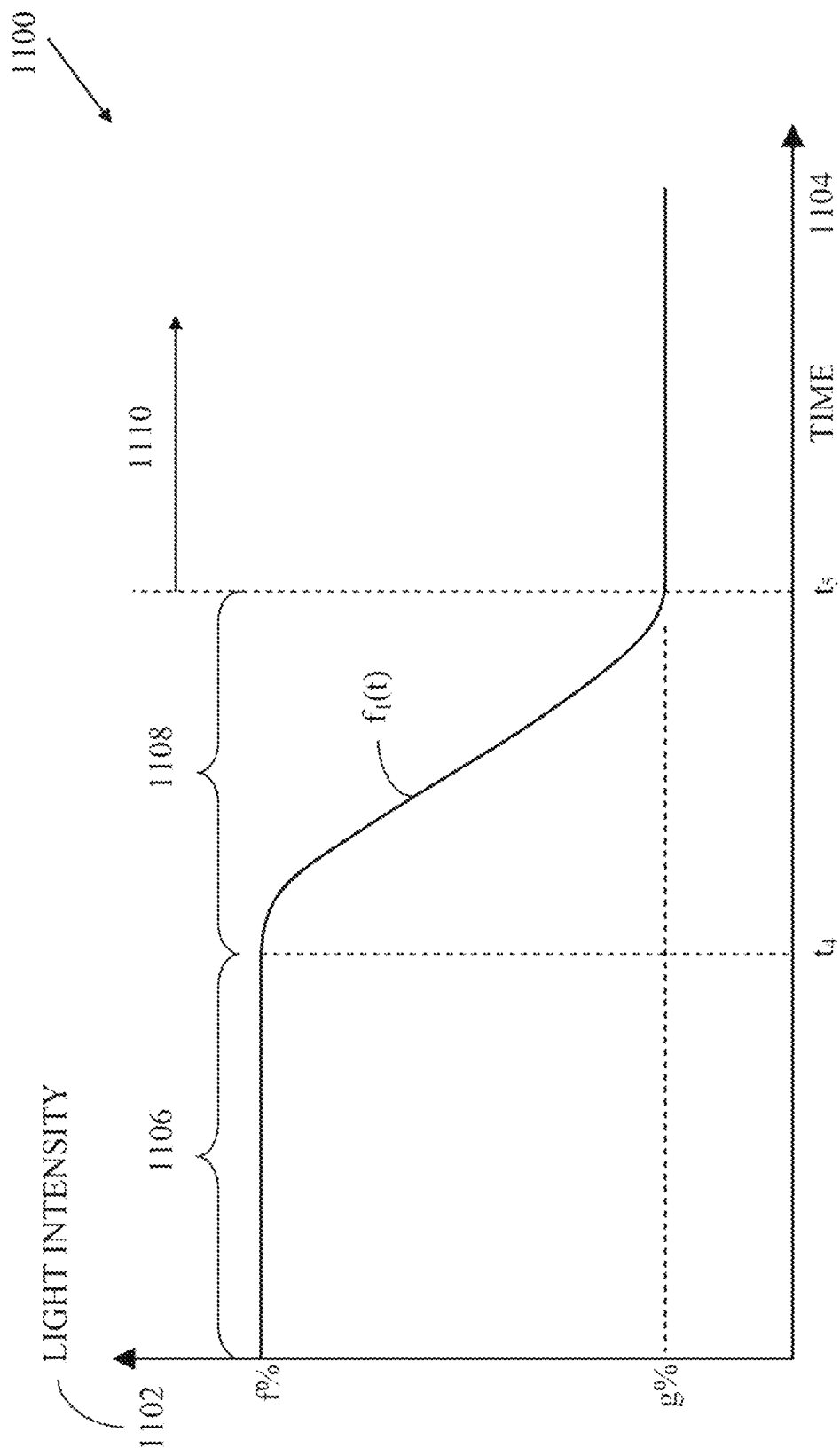

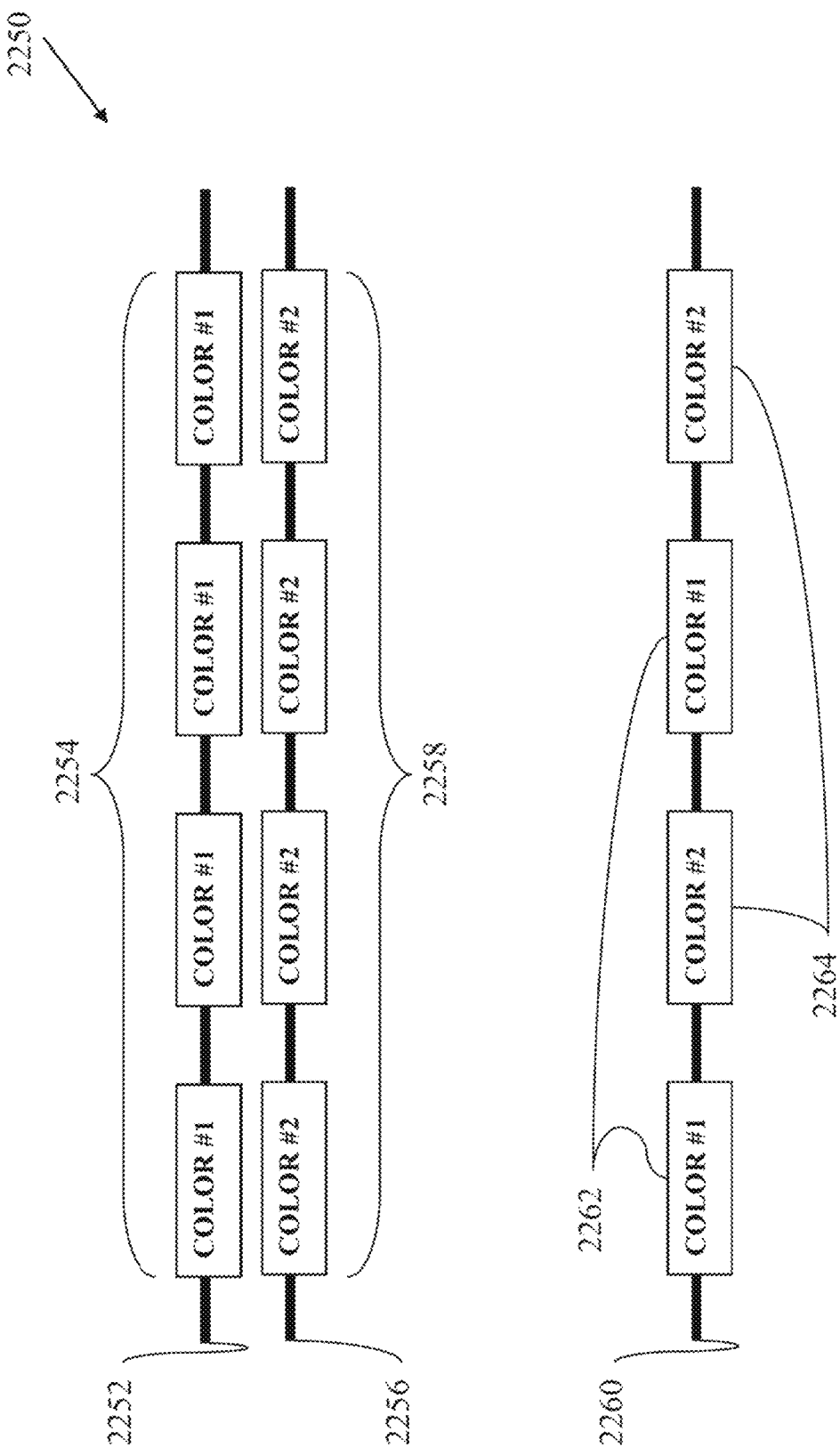

FIG. 40

| LIGHT COLOR TEMPERATURE KELVIN (K) | SOURCE OF LIGHT |
|---|---|
| 15,000-27,000 | Clear blue poleward sky |
| 6,500 - 9,500 | LCD or CRT screen |
| 6,500 | Daylight, overcast |
| 6,200 | Xenon short-arc lamp |
| 5,500 - 6,000 | Vertical daylight, electronic flash |
| 5,000 | Tubular fluorescent lamps or cool white/daylight |
| 4,100 - 4,150 | Moonlight |
| 3,350 | Studio light |
| 3,200 | Studio lamps |
| 3,000 | Warm white compact fluorescent and LED lamps |
| 2,700 | Soft white compact fluorescent and LED |
| 2,550 | Soft white incandescent lamp |
| 2,400 | Standard incandescent lamp |
| 1,850 | Sunset, Sunrise, Candle flame |
| 1,700 | match flame, low pressure sodium lamps (LPS/SOX) |

SYSTEMS AND METHODS FOR CHANGING A COLOR TEMPERATURE OF A LIGHT

RELATED APPLICATIONS

This application claims priority from co-pending U.S. patent application Ser. No. 15/604,617 entitled "SYSTEMS AND METHODS FOR CHANGING COLOR TEMPERATURE OF A LIGHT," filed on May 24, 2017. This application claims priority from U.S. Provisional Patent Application No. 62/340,845 entitled "SYSTEMS AND METHODS FOR CHANGING COLOR TEMPERATURE OF A LIGHT IN A MIRROR," filed on May 24, 2016. U.S. provisional patent application No. 62/340,845 entitled "SYSTEMS AND METHODS FOR CHANGING COLOR TEMPERATURE OF A LIGHT IN A MIRROR," is hereby fully incorporated by reference. This application claims priority from U.S. Provisional Patent Application. No, 62/423,612 entitled "SYSTEMS AND METHODS FOR INTEGRATING CAPACITIVE TOUCH CONTROL INTO A MIRROR," filed on Nov. 17, 2016. U.S. provisional patent application No. 62/423,612 entitled "SYSTEMS AND METHODS FOR INTEGRATING CAPACITIVE TOUCH CONTROL INTO A MIRROR," is hereby fully incorporated by reference. This application claims priority from U.S. Provisional Patent Application No. 62/488,782 entitled "APPARATUSES AND METHODS FOR AN INTERACTIVE DEVICE," filed on Apr. 23, 2017. U.S. provisional patent application No. 62/488,782 entitled "APPARATUSES AND METHODS FOR AN INTERACTIVE DEVICE," is hereby fully incorporated by reference. This application claims priority from U.S. Provisional Patent Application No. 62/488,766 entitled "APPARATUSES AND METHODS FOR AN INTERACTIVE DEVICE," filed on Apr. 23, 2017. U.S. provisional patent application No. 62/148,766 entitled "APPARATUSES AND METHODS FOR AN INTERACTIVE DEVICE," is hereby fully incorporated by reference. This application claims priority from U.S. Provisional Patent Application No. 62/484,923 entitled "APPARATUSES AND METHODS FOR AN INTERACTIVE MIRROR," filed on Apr. 13, 201.7, U.S. provisional patent application No. 62/484,923 entitled "APPARATUSES AND METHODS FOR AN INTERACTIVE MIRROR," is hereby fully incorporated by reference.

BACKGROUND

1. Field of Invention

The invention relates generally to lighting temperature control and capacitive sensing and more specifically to methods, apparatuses, and systems for control of electronic devices through lighting color temperature control, capacitive touch sensing, and capacitive proximity sensing.

2. Art Background

Living beings, which includes humans and animals, spend time in the presence of artificial light. Artificial light differs from natural light in color temperature and intensity. For example, incandescent bulbs typically radiate light with a color temperature of approximately 2,400-3,300 degrees Kelvin depending on a particular design. Fluorescent lights are also used to produce artificial light Standard fluorescent lights radiate light having a color temperature of approximately 5,500 degrees Kelvin. The color temperature of natural light, radiating from the sun, ranges from approximately 1,850 degrees Kelvin at sunrise to approximately 15,000-27,000 degrees Kelvin for a clear blue poleward sky. The color temperature of natural light is changed as the light is scattered by particles in the atmosphere. Thus, the color temperature of natural light received at a location on the earth depends on a given location of the sun over the earth, which is influenced by time of day and latitude of the location. Radiation of artificial light onto living beings over extended periods of time at constant color temperature and/or intensity can result in a mismatch between the biological needs of the living beings exposed to the artificial light. Adverse biological effects can result from the mismatch. This can present a problem.

In addition, living beings have bio-rhythms associated with their daily cycle of life, i.e., day time, evening time, night time, etc. Living beings function more efficiently when the light incident upon the living being is in sync with the biorhythm. For example, light of a certain color temperature is associated with daytime. Light of a different color temperature is associated with evening time and then night time prior to sleep time. Certain activities are associated with light having different color temperatures and/or intensities. For example, the color temperature of natural light at sunrise is associated with waking. Artificial light illuminating a living space and the living beings occupying it at constant color temperature and or constant intensity is discordant with the natural light cycles of nature and living beings. This can present a problem.

The color perceived by an observer of clothing or skin is affected by the color temperature of the light used to illuminate the clothing or skin during the observation. Thus, makeup applied while a person uses a first color temperature of light for illumination can appear different when viewed under a different color temperature of light. This can present a problem.

Light switches are used to turn an artificial light source on and off. Such switches typically transition the light source from an off-state to an on-state over a very short (almost imperceptible) time interval on the order of a fraction of a second usually several 10 s to 100 s of milliseconds. The result is an abrupt change in the illumination and color temperature of an environment, for example, when a dark room becomes fully lit. Such abrupt changes are not experienced in nature and can be irritating to a living being's senses; thereby producing a state of stress within the living being on an emotional and physiological level. This can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 2A illustrates a one-touch control system, according to embodiments of the invention.

FIG. 4A illustrates a sensor module, according to embodiments of the invention.

FIG. 4D illustrate sensor conductive pickups, according to embodiments of the invention.

FIG. 11A illustrates indicator light functionality during night light mode, according to embodiments of the invention.

FIG. 22B illustrates arrangements of light elements used to produce light at multiple color temperatures, according to embodiments of the invention.

FIG. 40 illustrates color temperature associated with different lighting sources.

DETAILED DESCRIPTION in the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Methods, apparatuses, and systems are described that provide for the integration of capacitive sensors and capacitive control(s) into a device. Methods, apparatuses, and systems are described that provide for the radiation of light from a region of a device at a color temperature. The color temperature of the radiated light can be changed as function of time either by a user's interaction with a control system of the device or with the use of a software application on a user device. In various embodiments, a device is a mirror platform, a light, or a display. Examples, of a light are, but are not limited to; a lighted wall sconce, a desk or table lamp, a ceiling light, a wall light, a floor light, etc. Examples of a display are, but are not limited to; a display for a computer, a tablet, a phone, a wrist wearable device, a flat panel television or video display, etc. In some embodiments, the color temperature of light emitted from a device, e.g., a mirror platform is synchronized across a plurality of such devices distributed in a hospitality environment, such as a hotel, motel, conference center, etc. In other embodiments, a user selects a color temperature of the light radiated by a device. In some embodiments a user utilizes a user device to control a color temperature as a function of time profile for the light radiated by a device. In various embodiments, the device undergoes state changes during a transition time to provide smooth transitions between states.

Figure 1A:
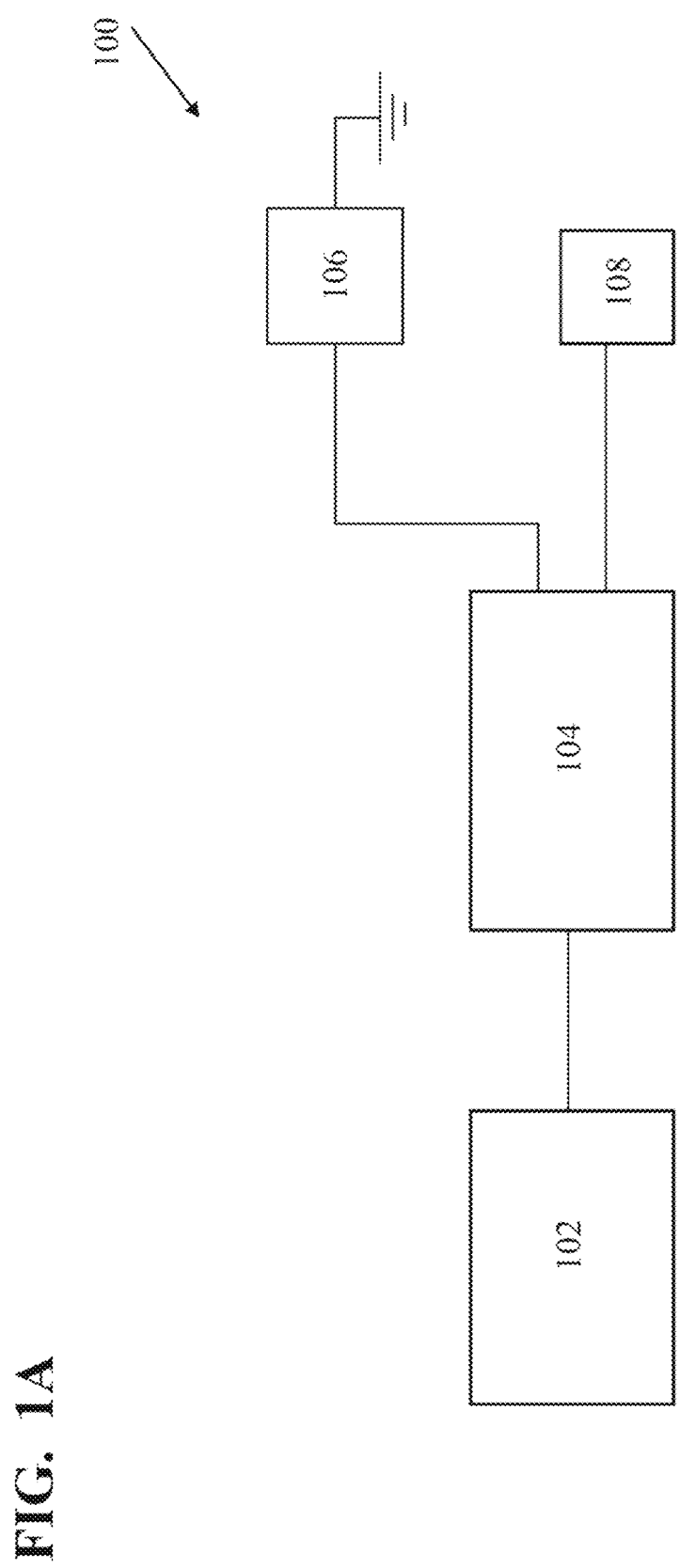
FIG. 1A illustrates a capacitive control system, according to embodiments of the invention.

FIG. 1A illustrates, generally at 100, a capacitive control system, according to embodiments of the invention. With reference to FIG. 1A, a capacitive control system 100 can be configured as a capacitive touch control system or a capacitive proximity control system. As used in this description of embodiments, capacitive touch control implies that a user touches a surface with a finger or other body part in order to trigger a state change within the capacitive control. As used in this description of embodiments, capacitive proximity control implies that a user triggers the capacitive sensor when a part of the user's body, such as a finger, is within a detection range of the capacitive sensor. Both capacitive proximity control and capacitive touch control can be configured to produce a single state change or a plurality of state changes as described below in conjunction with embodiments of the invention.

In one or more embodiments, a capacitive control 102 is configured to output a control signal to a pulse width modulation (PWM) circuit 104. The pulse width modulation circuit 104 modulates a width in time of the voltage supplied to a device 108. In various embodiments, the PWM circuit 104 includes a switch to turn a signal on and off at a predetermined frequency in the range of DC to kilohertz or higher as needed in a given application. In one or more embodiments, the switch is implemented as a low-side metal-oxide-semiconductor field-effect transistor (MOSFET). In the circuit presented in FIG. 1A a power supply ±24 volts is illustrated at 106 however the PWM circuit can be adjusted to work with power supplies having voltage values other than those shown in FIG. 1A.

A device 108 can be configured differently in different embodiments. In one or more embodiments, the device 108 is a light emitting diode (LED) or an array of light emitting diodes (LED array). The LED or LED array can be incorporated into a mirror to provide a source of direct light, back light, or night light as described below in conjunction with the figures that follow. In various embodiments the device 108 is any electronic device that would be incorporated with a mirror such as but not limited to a defogger, a television, a video display, a clock, wireless communication interface, power usage measurement and/or reporting, etc.

A power supply 106 provides a source of power the PWM circuit 104. In one or more embodiments, the power supply 106 is a ±24 volt supply. In other embodiments, the voltage is different. The example shown herein utilizing ±24 volts is provided merely for illustration and does not limit embodiments of the invention.

In various embodiments, the capacitive control system 100 (FIG. 1A) is implemented in an integrated circuit device, which may include an integrated circuit package containing the integrated circuit. In some embodiments, the capacitive control system 100 or part of the capacitive control system 100 is implemented in a single integrated circuit die. In other embodiments, the capacitive control system 100 is implemented in more than one integrated circuit die of an integrated circuit device which may include a multi-chip package containing the integrated circuit.

Figure 1B:
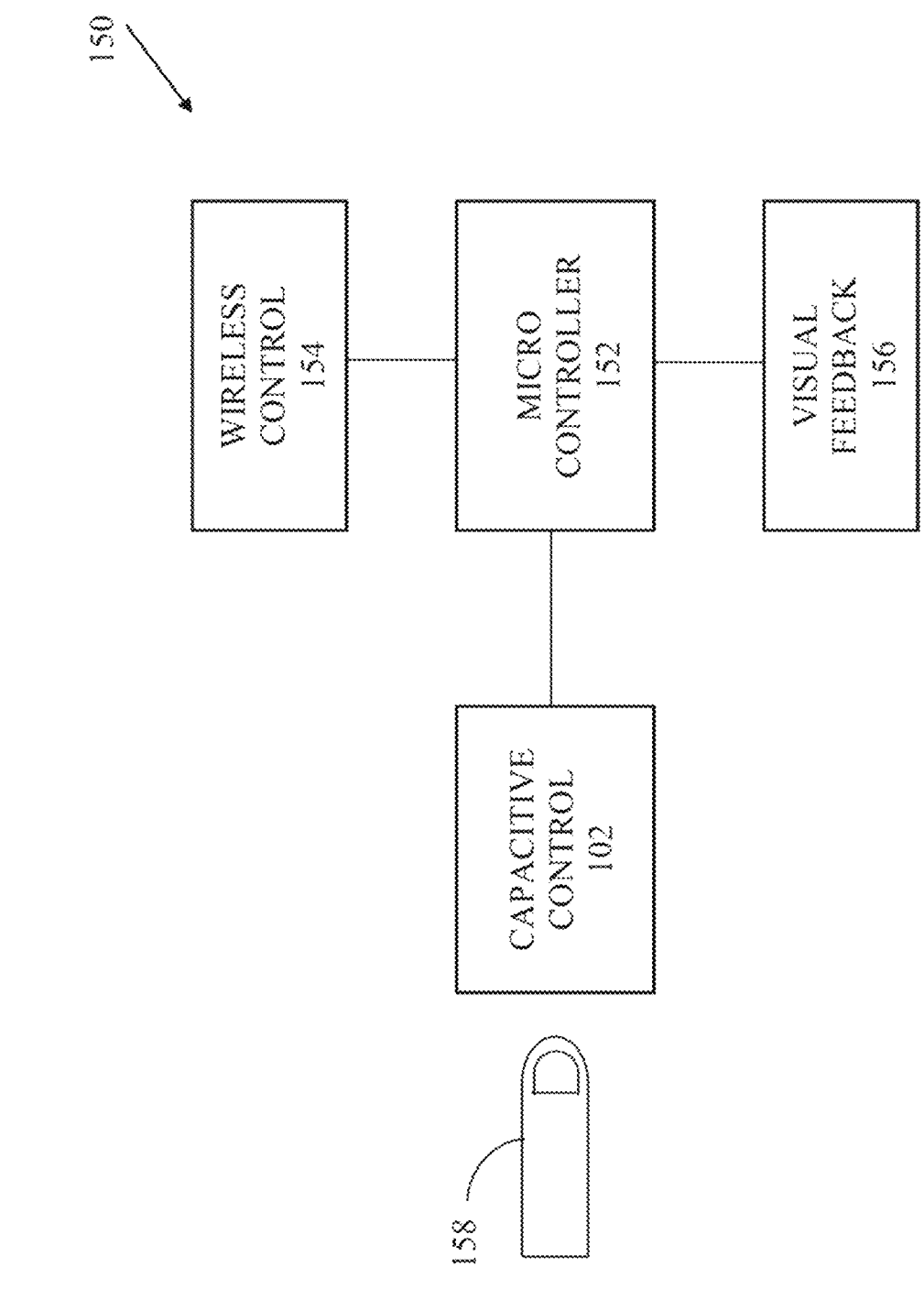
FIG. 1B illustrates another control system, according to embodiments of the invention.

FIG. 1B illustrates, generally at 150, another control system, according to embodiments of the invention. With reference to FIG. 1B, a capacitive control 102 is configured to provide a control signal to a microcontroller 152. The microcontroller 152 is configured to send control signals to a wireless control 154. Visual feedback 156 is configured to be responsive to the microcontroller 152. In operation, in one embodiment, a user 158 triggers a capacitive control 102. The capacitive control can be either a capacitive touch control or a capacitive proximity sensor as described above. The capacitive control 102 sends a control signal to the microcontroller 152. The microcontroller 152 processes the control signal received from the capacitive control 102 and then sends a control signal to the wireless control 154. Wireless control 154 can be for example wireless synchronization with a mobile device, such as but not limited to Bluetooth pairing for example. Visual feedback 156 is provided as a form of visual feedback to the user which communicates that the wireless action was acknowledged by the system. Visual feedback can be for example a light incorporated into a mirror such that in operation, responsive to a user 158 triggering capacitive control 102, the micro controller 152 initiates pairing and provides visual feedback to a user. The visual feedback can be in the form of light emitted from an LED or LED array in response to a PWM signal from a PWM circuit as shown in the figures herein.

The example of Bluetooth paring given herein is one example of a device control by the capacitive control 102 in response to the user 158. Other electronics can be controlled by the microcontroller 152, such as for example home or hospitality automation communication and control.

In various embodiments, the control system 150 (FIG. 1B) is implemented in an integrated circuit device, which may include an integrated circuit package containing the integrated circuit. In some embodiments, the control system 150 or part of the control system 150 is implemented in a single integrated circuit die. In other embodiments, the control system 150 is implemented in snore than one integrated circuit die of an integrated circuit device which may include a multi-chip package containing the integrated circuit.

FIG. 2A illustrates, generally at 200, a one-touch control system, according to embodiments of the invention. With reference to FIG. 2A, the capacitive control 102 from FIG. 1A is illustrated in greater detail. A sensor module 206 is in contact with a surface such as a mirror 208. The mirror 208 can have a conductive layer deposited on a front side, a back side or in an intermediate layer of the mirror structure. A microcontroller 204 is configured to be electrically connected to a conductive pickup in the sensor module 206. The conductive pickup permits "finger capacitance" of the user to combine with a parasitic capacitance of the sensor which is then sensed by a microcontroller 204. The microcontroller 204 is configured with a connector 202. A diode 210 and a voltage regulator 212 provide a source of regulated power to the microcontroller 204. In ne or more embodiments, the diode 210 is a schottky diode. A detailed view of the region indicated by 216 is presented below in FIG. 3.

In various embodiments, the one-touch control system 200 (FIG. 2A) is implemented in an integrated circuit device, which may include an integrated circuit package containing the integrated circuit. In some embodiments, the one-touch control system 200 part of the one-touch control system 200 is implemented in a single integrated circuit die. In other embodiments, the one-touch control system 200 is implemented in more than one integrated circuit die of an integrated circuit device which may include a multi-chip package containing the integrated circuit.

Figure 2B:
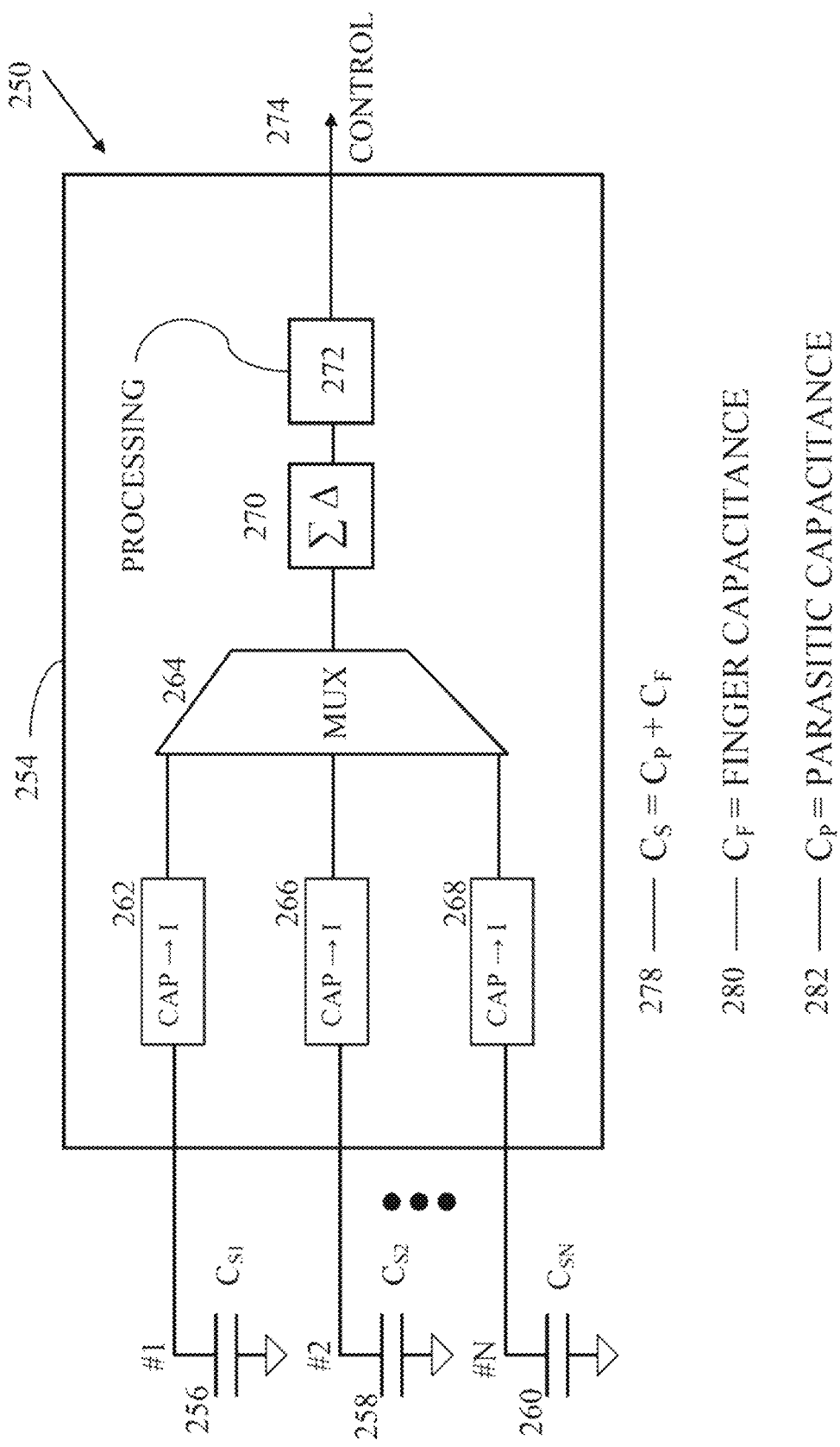
FIG. 2B illustrates a capacitive sensing system utilizing multiple capacitive sensors, according to embodiments of the invention.

FIG. 2B illustrates, generally at 250, a capacitive sensing system utilizing multiple capacitive sensors, according to embodiments of the invention. With reference to FIG. 2B, a capacitive sensing system 254 receives a general number of N capacitive sensor inputs from capacitive sensors 256, 258 through 260, Each capacitive sensor, i.e., 256, 258, through 260 provides capacitance to a capacitance-to-current converter 262, 266 through 268 respectively. The currents, output from the capacitance-to-current converters are input into a multiplexer 264. The output of the multiplexer 264 is input into a current-to-digital converter 270. In various embodiments, current to digital converter 270 performs the function of an analog-to-digital converter. In some embodiments, the current-to-digital converter utilizes a sigma-delta modulator scheme to output a digital signal, where an amplitude of the digital signal is proportional to the sensor capacitance. In one or more embodiments, the capacitive sensing system 254 is used as the microcontroller 204 in FIG. 2A.

The current-to-digital converter 270 can be configured with a sampling rate which can be adjusted to the hertz, kilohertz, or megahertz range. The output of the current-to-digital converter is input into the block 272 for processing, thereby outputting a signal at 274 which contains information about the presence or lack of presence of the user's finger.

Equation 278 provides the relationship between sensor capacitance $C_s$ parasitic capacitance $C_p$ 282 and the user's body capacitance or finger capacitance $C_f$ 280. While it is common to refer to a user's finger or finger capacitance a user can use another body part to interact with one or more of the capacitive sensors 256 through 260, such as a hand, elbow, etc. As used in this description of embodiments, the term finger capacitance "$C_f$" will be used, however no limitation is implied by the use of the word "finger." When a user is not interacting with a capacitive sensor $C_s=C_p$, because $C_f=0$. A raw count input into the processing block 272 is related to the sensor capacitance $C_s$, as follows: raw count=$G_c$* $C_s$, where $G_c$ is the capacitance-to-digital conversion gain.

In various embodiments, the capacitive sensing system 250 (FIG. 2B) is implemented in an integrated circuit device, which may include an integrated circuit package containing the integrated circuit. In some embodiments, the capacitive sensing system 250 or part of the capacitive sensing system 250 is implemented in a single integrated circuit die. In other embodiments, the capacitive sensing system 250 is implemented in more than one integrated circuit die of an integrated circuit device which may include a multi-chip package containing the integrated circuit.

Figure 3:
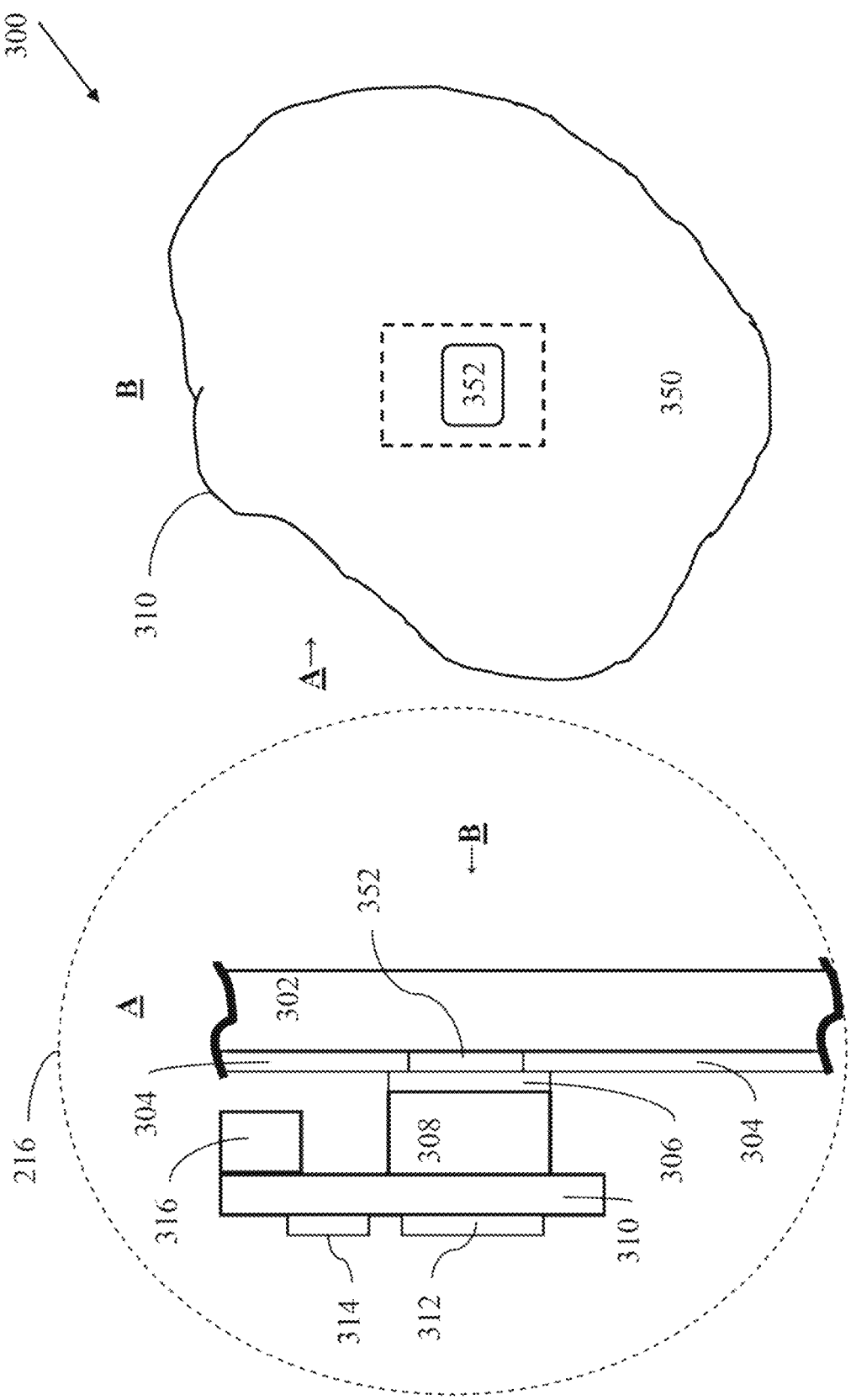
FIG. 3 illustrates integrating a capacitive control system with a mirror, according to embodiments of the invention.

FIG. 3 illustrates, generally at 300, integrating a capacitive control system with a mirror, according to embodiments of the invention. With reference to FIG. 3, an enlarged view from FIG. 2A is illustrated in 216 (View A) and a plan front view of the capacitive control system integrated behind a mirror (as indicated by dashed line) is illustrated in View B. Referring now to View A, a mirror cross-section is illustrated with glass layer 302 and a reflective layer 304 on a back side of the glass layer 302. The reflective layer 304 of the mirror has been reduced in effectiveness over a region indicated at 352 to create an area that is transparent to electromagnetic field lines. In some embodiments, within the region 352, the reflective layer 304 is fully removed in other embodiments it is partially removed. Region 352 allows electromagnetic field lines emanating from a sensor conductive pickup 408 (described below in conjunction with FIG. 4) to interact with a user in order to provide the needed finger capacitance $C_f$ for sensing as either a touch or a proximity event depending on whether the system is configured for touch or proximity sensing. In other embodiments, the reflective layer 304 is not reduced in effectiveness over the region 352.

A sensor module 308 is adhered to the back side of the mirror with an adhesive layer 306. The adhesive layer 306 is a layer of two-way tape in some embodiments. In other embodiments the adhesive layer is a liquid adhesive such as epoxy. In other embodiments the sensor module is positioned on the back side of the mirror with a mechanical bracket. Mounting the sensor module on the back side of the mirror is preferably performed so that the relative motion between the sensor module 308 and the mirror 302 is minimized or eliminated. Minimizing or eliminating relative motion reduces or eliminates false signals from the capacitance control system.

In one or more embodiments, the sensor module 308 is mounted on a printed circuit board 310. Additional components, such as a connector 316, microcontroller 312 other integrated circuits 314 are also mounted on the primed Circuit board 310 to form the capacitive control system.

FIG. 4A illustrates a sensor module, according to embodiments of the invention. With reference to FIG. 4A, the sensor module 308 is illustrated in perspective view at 400 and in side view at 450. Mounted on a face of the sensor module 308 is the sensor conductive pickup 408 forming a square loop. In various embodiments, the conductive pickup 408 is made using a conductive material, such as but limited to; a material like copper, aluminum, stainless steel, silver paint, etc. In the center of the square loop 408 is a diffuser element 410. On a back side of the diffuser element 410 is a light source 454. The light source 454 can be configured using a variety of technologies, such as but not limited to, light emitting diode (LED), organic light emitting diode (OLED), etc. A first conductor 402 and a second conductor 404 provide a source of electrical power to the light source 454. A conductor 406 is attached to the sensor conductive pickup 408. In one Car more embodiments, during assembly, the conductors 402, 406, and 406 are electrically coupled to the PCB board 310 where power is supplied and the sensor conductive pickup is connected to a capacitive sensing system as shown in FIG. 2A or FIG. 2B above. In some embodiments potting 456 is applied to the hack side cavity of the sensor module 308.

Figure 4B:
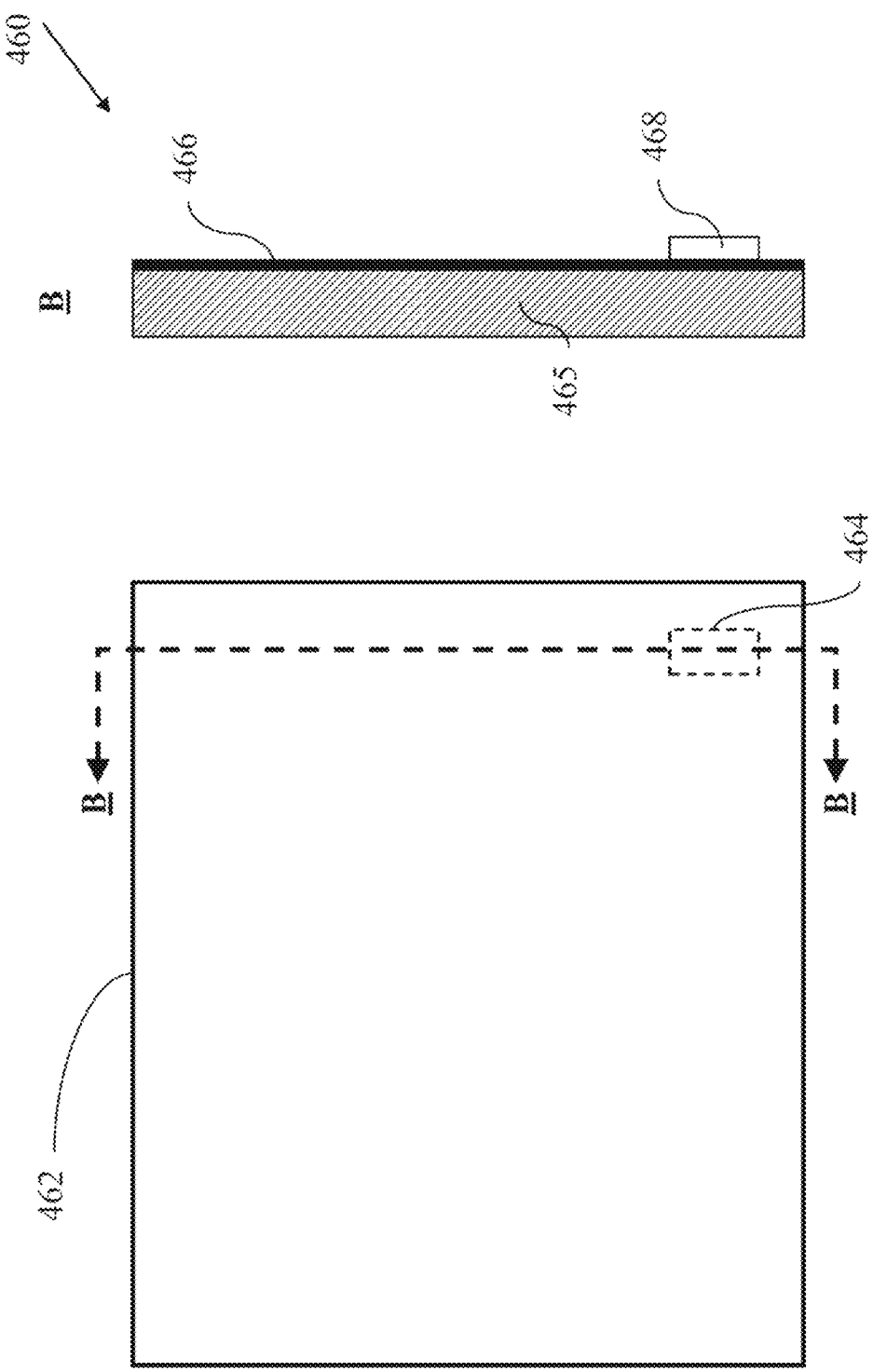
FIG. 4B illustrates using the silver layer of the mirror as the sensor conductive pickup, according to embodiments of the invention.

FIG. 48 illustrates, generally at 460 using the silver layer of the mirror as the sensor conductive pickup, according to embodiments of the invention. With reference to FIG. 4B, a mirror 462 has a glass layer 465 and a reflective layer 466. In various embodiments, the reflective layer is made using an electrically conductive material such as silver paint. A capacitive sensing system is indicated at 464 (dashed lines indicating location on a back side of the mirror 462 which is not visible from the front side of the mirror) and 468 (cross-sectional view B showing location of the capacitive sensing system on the back side of the mirror). The reflective layer 466 is electrically coupled to the capacitive sensing system 468. The reflective layer 466 functions as the sensor conductive pickup that responds to finger capacitance $C_f$ when a user is within range of the conductive layer 466. In other embodiments, a chassis of the mirror is used as the sensor conductive pickup. In yet other embodiments, the chassis of the mirror together with the reflective layer of the mirror are used as the sensor conductive pickup.

Figure 4C:
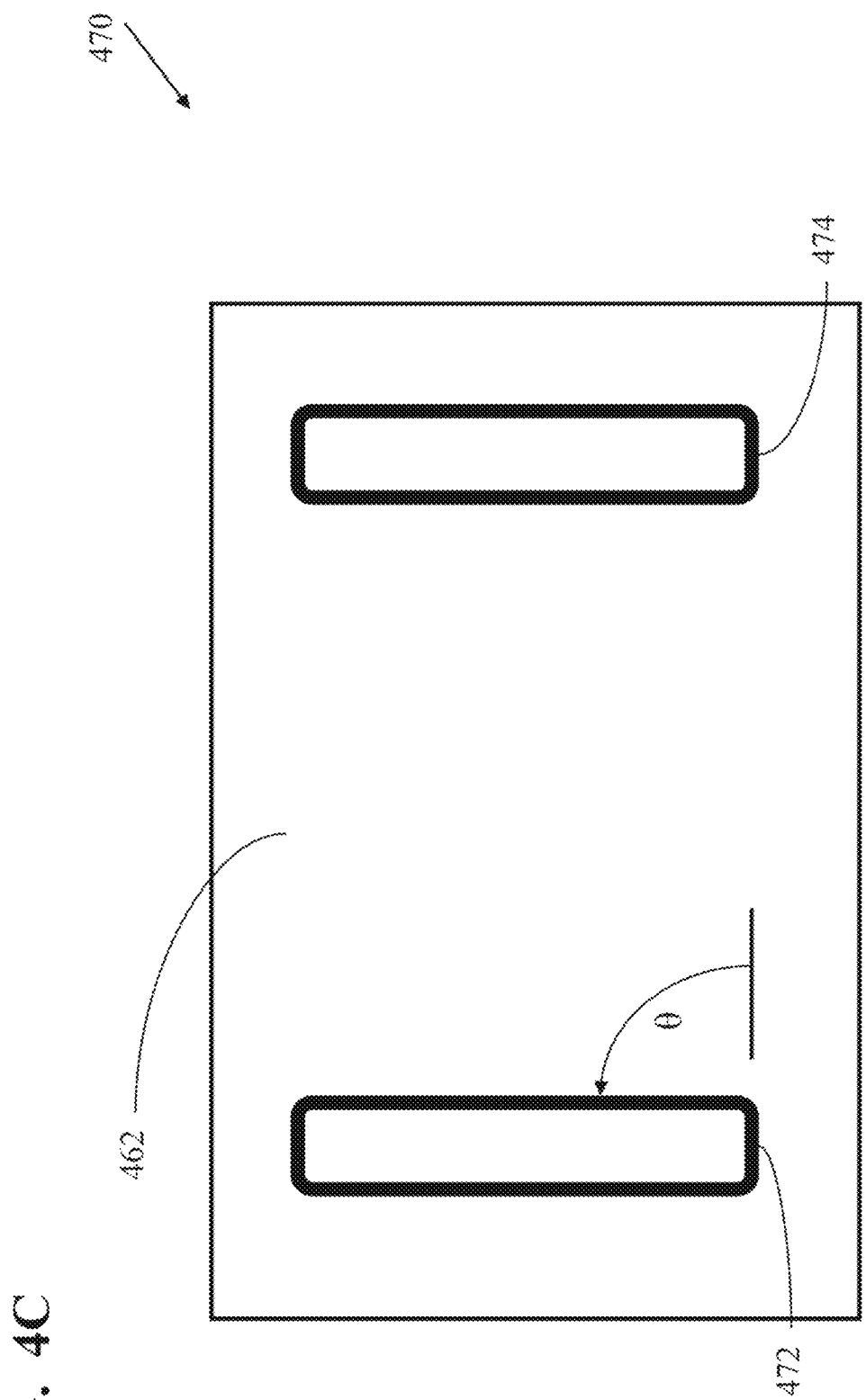
FIG. 4C illustrates sensor conductive pickup loops, according to embodiments of the invention.

FIG. 4C illustrates, generally at 470, sensor conductive pickup loops, according to embodiments of the invention. With reference to FIG. 4C, a back side of a mirror is indicated at 462. Located on the back side of the mirror 462 is a first sensor conductive pickup loop 472. In some embodiments, a second sensor conductive pickup loop is included as shown at 474. Sensor conductive pickup loop(s) are input to a capacitive touch sensing system as described above but not shown in FIG. 4C to preserve clarity in the illustration. In various embodiments, the sensor conductive pickup loops extend to the upper and lower edge of the mirror 462. In other embodiments, the sensor conductive pickup loops are rotated ninety degree and extend from left to right along the back side of the mirror 462. In some embodiments, both vertically oriented and horizontally oriented loops are included on the mirror 462. In other embodiments, the loops are oriented at an angle or angles other than ninety degrees from the angle shown in FIG. 4C.

FIG. 4D illustrates, generally at 480, sensor conductive pickups, according to embodiments of the invention. With reference to FIG. 410, a mirror is illustrated at 494. Dashed region 496 indicates where the capacitive touch sensing system is located on a back side of the mirror 494. A side view, "C," shows the mirror glass 482 with a reflective silver layer 484 attached to a back side of the mirror glass 482. As described above, the reflective layer 484 can be located as an intermediate layer of the mirror 494 or on a front side of the mirror 494.

In one embodiment, a sensor conductive pickup 488 is fixed to a printed circuit board 486 and is electrically isolated from the reflective layer 484. A capacitive touch control processing system, as described above, is indicated at 492 and is configured to process signals from the sensor conductive pickup 488. An electromagnetic reflector 490 is located behind the sensor conductive pickup 488 by a distance d. When a user comes within proximity of the capacitive sensing system the user's body provides a capacitance $C_f$ which is sensed by the sensor conductive pickup 488. The electromagnetic reflector 490 enhances the capacitance sensed by the system during an interaction with a user, thereby making the system more sensitive to a user's presence, such as the user's finger proximate thereto.

Figure 5:
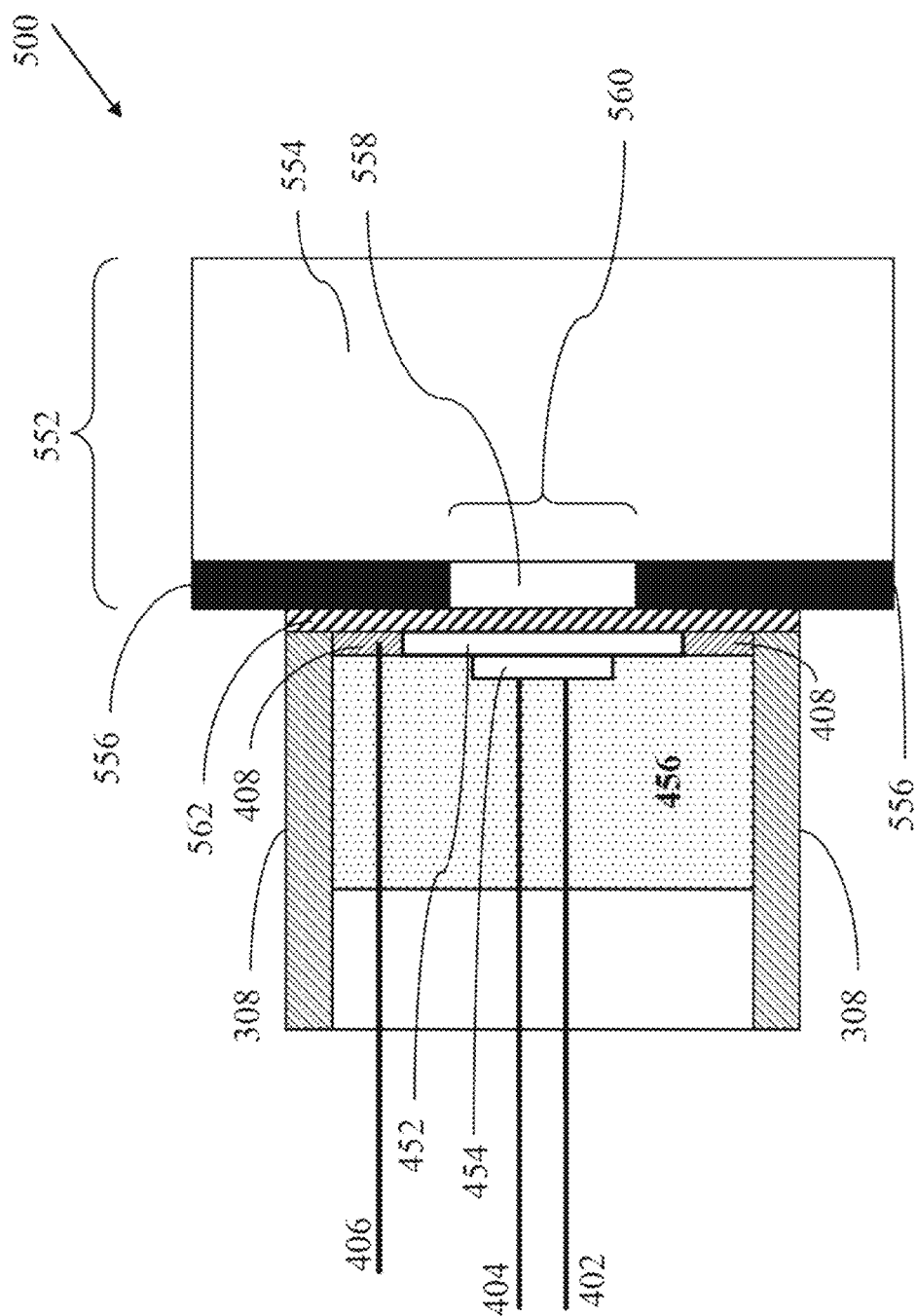
FIG. 5 illustrates a cross-sectional view of the sensor module from FIG. 4 integrated into a mirror, according to embodiments of the invention.

FIG. 5 illustrates, generally at 500, a cross-sectional view of the sensor module from FIG. 4A integrated into a mirror, according to embodiments of the invention. With respect to FIG. 5, the sensor module 308, from FIG. 4A, is coupled to a back side of a mirror 552. The mirror 552 has a glass layer 554 and a reflective layer 556. The reflective layer 556 is often a silver layer which is electrically conductive. In one or more embodiments, the conductive layer 556 is removed or reduced from a region 560. Providing a region 560, where the reflective layer is removed or reduced, permits the electric tiled to emanate from the region 560 such that a user can interact with the field and introduce a finger capacitance $C_f$ to a sensor conductive pickup 408. An adhesive 562 is used to mechanically couple the sensor module 308 to the back side of the mirror 552.

Figure 6:
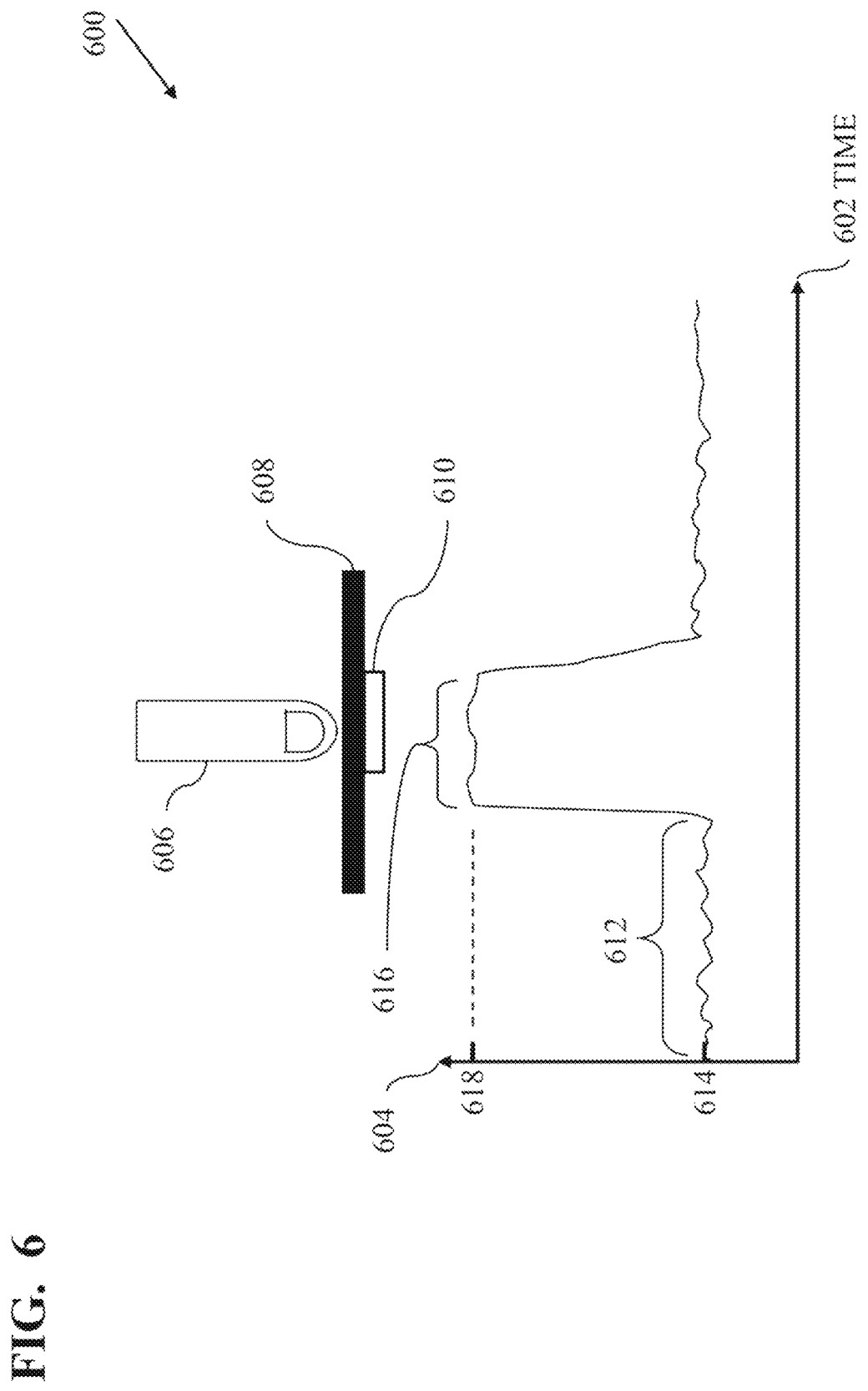
FIG. 6 illustrates change in capacitance from interaction with a user's finger, according to embodiments of the invention.

FIG. 6 illustrates, generally at 600, change in capacitance from interaction with a user's finger, according to embodiments of the invention. With reference to FIG. 6, sensor capacitance $C_s$ from a capacitive sensing system is plotted on the vertical axis at 604 as a function of time 602. In some embodiments, $C_s$ is a raw count which is proportional to sensor capacitance $C_s$. In one or more embodiments, the raw count is taken from the output of the current-to-digital converter 270 as shown in FIG. 2B.

In operation, in one or more embodiments, the capacitive sensing system is configured for capacitive touch sensing, as previously discussed. The capacitive touch system outputs sensor capacitance $C_s$ as illustrated in FIG. 6. A period of time, indicated at 612, marks the time before a user 606 touches a surface 608 which contains a capacitive sensor 610. An output of the system during time 612 is indicated at 614. When the user 606 touches the surface 608 the user's finger interacts with the electric field of the capacitive touch sensor 610 which causes the capacitance measured by the system to increase as indicated by a region 616 to a level 618. The region 616 indicates the period of time that the user's finger is in contact with the surface 608. The region 616 is variable depending on how long the user's finger is in contact with the surface 608. A general period of time is indicated by 616. In some embodiments, the region 616 is a brief contact, such as a tap. In other embodiments, the region is a longer period of time. In various embodiments, logic is configured to provide system functionality that is based on a length of time represented by the region 616 or 720, 740, or 742 (FIG. 7) as described below in conjunction with the figures herein.

When the user 606 moves away from the surface 608 $C_f$ decreases (equation 278) which causes the capacitance measured by the system to fall decrease to the level indicted at 614. Thus, the state change from level 614 to 618 or from level 618 to level 614 produces a change in capacitance sensed by the system which is used to control electronic devices with a capacitive touch sensing system.

Figure 7:
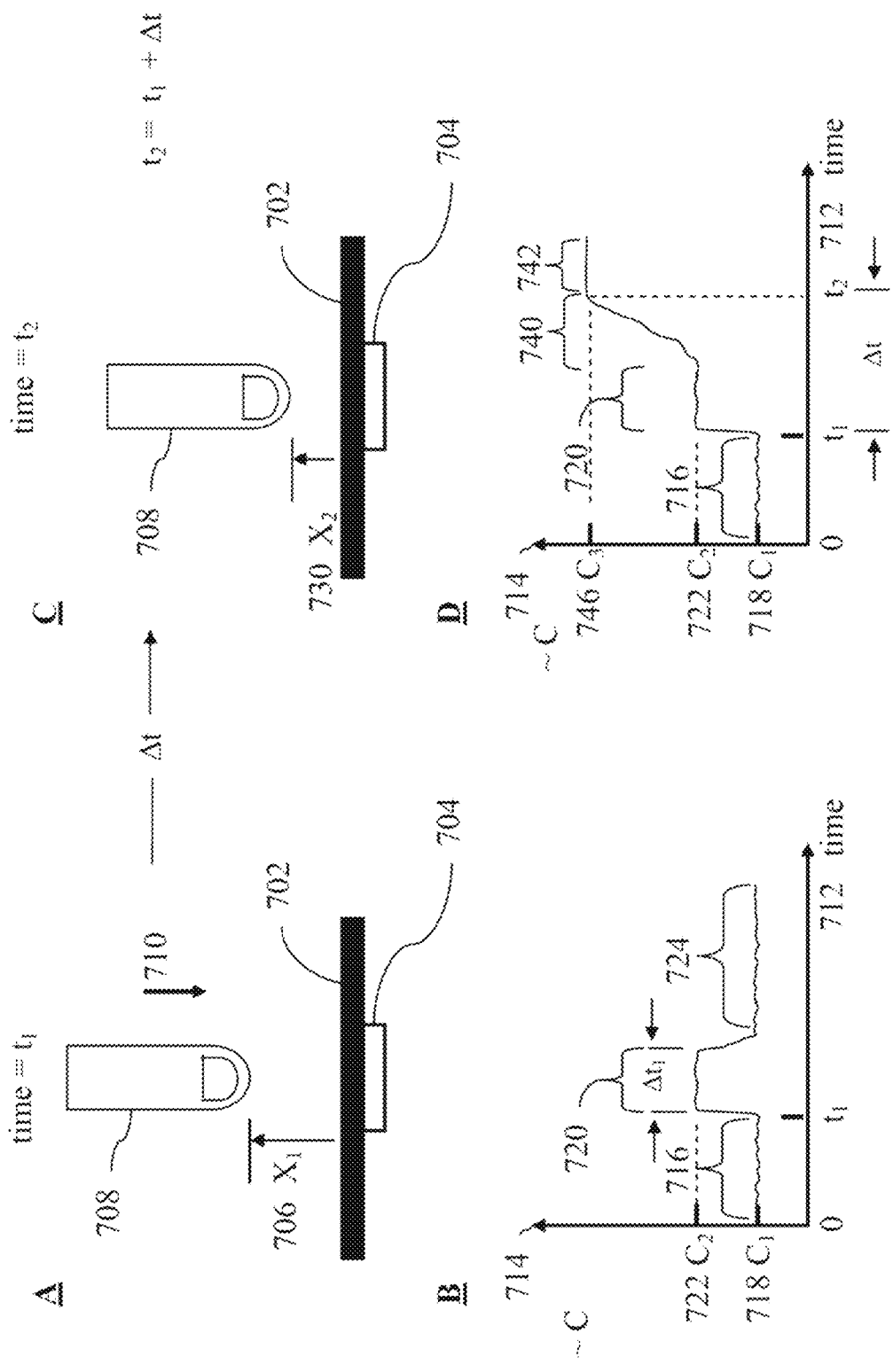
FIG. 7 illustrates proximity sensing with one capacitive sensor, according to embodiments of the invention

FIG. 7 illustrates, proximity sensing with one capacitive sensor, according to embodiments of the invention. With reference to FIG. 7, view A illustrates a surface 702 with capacitive control system 704 coupled to a back side of the surface. A user indicated at 708 moves into the detection range of the capacitive control system 704 as indicated by a distance $X_1$ at 706.

Graph B corresponds with View A and illustrates an output from the capacitive control system 704 plotted on a vertical axis 714 as a function of time 712. Before a user 708 is within a detection range of the capacitive control system 704 an output $C_1$ at 718 is output for a period of time indicated at 716.

When the user is within a detection range $X_1$ 706, the system output increases from $C_1$ at 718 to $C_2$ at 722. While the user maintains position at $X_1$ 706 the system outputs capacitance $C_2$ at 722 for a period of time 720. If the user moves out of the detection range $X_1$ 706 then the output of the capacitance decreases to $C_1$ at 718. A period of time 724 indicates the tune when the user 708 is outside of the detection range of the system 704.

If the user moves toward the surface 702, indicated by the arrow 710, the user moves to a new position X2 after time interval Δt relative to the surface 702. Note that X2<X1 and $t_2=t_1+\Delta t$. At Graph D corresponds with View C and illustrates an output from the capacitive control system 704. Graph D records capacitive output from the capacitive control system 704 while the user moves from position $X_1$ 706 to position $X_2$ 730. As the user moves from position $X_1$ to position $X_2$ the output of the system increases from $C_2$ 722 to $C_3$ 746. For times greater than $t_2$, the user remains stopped at position $X_2$ and the output of the capacitive control system 704 remains constant at output level $C_3$ indicated at 746. Remaining stopped at a position to produce approximately constant system output is also accomplished by maintaining contact with the surface 608 (FIG. 6). Constant system output is also referred to herein as "hold." Thus, a "hold" can be accomplished by maintaining contact with the surface 608 (FIG. 6) or by maintaining a constant distance as illustrated in View C and Graph D (FIG. 7).

During the time interval At indicated by 740, the output of the capacitive control system 704 continues to increase from $C_2$ 722 to $C_3$ 746. The transition from one output value (e.g., $C_2$) to the other (e.g., $C_3$) or to any value intermediate there between, permits control of a device with multiple state changes. Such multiple state changes can be used to provide an increase in a quantity or a decrease in the quantity. Some examples of decreasing or increasing a quantity are, but are not limited to, increasing a light source level or decreasing a light source level. In some embodiments, a color temperature of a light source is changed by either a touch or by the proximity of a user's hand. In other embodiments, a sound level is increased or decreased in response to the proximity of a user's hand.

Figure 8:
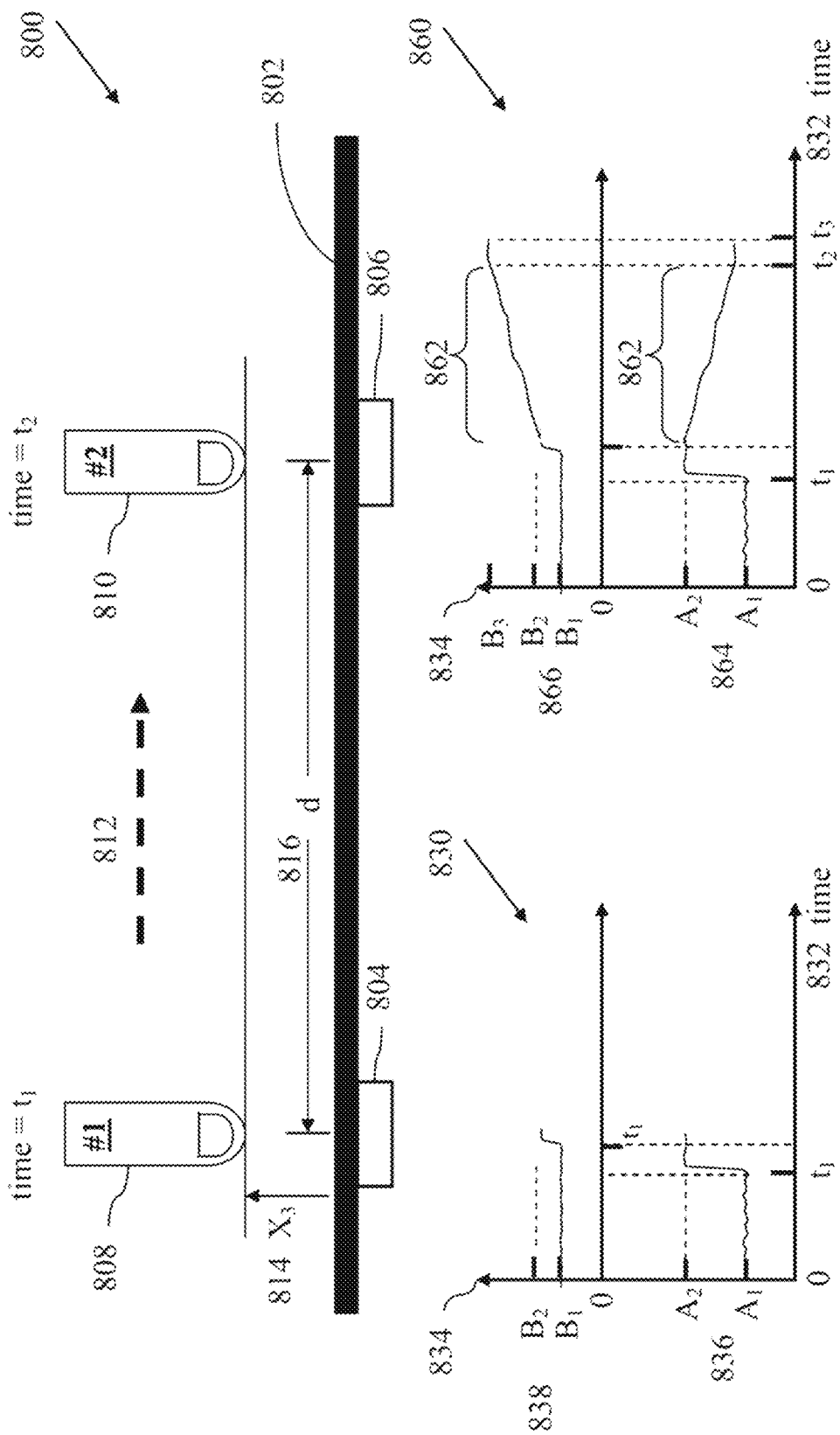
FIG. 8 illustrates proximity sensing with two capacitive sensors, according to embodiments of the invention.

FIG. 8 illustrates, generally at 800, proximity sensing with two capacitive sensors, according to embodiments of the invention. With reference to FIG. 8, a user, indicated at 808, moves from position #1 at 808 to position #2 at 810 in the direction of an arrow 812 in a path substantially parallel (but not necessarily so) to a surface 802. The user is offset from the surface 802 by a distance indicated by $X_3$ at 814. The surface 802 has incorporated herein, two sensors, each is configured as a capacitive sensor and in one or more embodiments as capacitive proximity sensors. A first capacitive sensor A at 804 and a second capacitive sensor B at 806 are separated by a distance d at 816. Each of the capacitive sensors A and B axe input into a captive control system configured for proximity sensing, such as described above it conjunction with the preceding figures. The inputs from capacitive sensor A and capacitive sensor B are processed as separate channels by the capacitive control Graph 830 displays outputs for sensors A and B from the capacitive control up to time $t_1$. With respect to 830, time is plotted along axis 832 and capacitance is plotted long vertical axis 834. The vertical axis 834 is partitioned into a segment for displaying the output 836 for sensor A and the output 838 for sensor B. Before time $t_1$ a user is not within a detection range of either sensor A or B therefore the output of the system is at $A_1$ and $B_1$ which is nominally the noise floor of the capacitive sensing system. At time $t_1$, the user is within detection range. Sensor A registers an output 836 of amplitude $A_2$. Sensor B registers an output 838 of amplitude $B_2$. Note that $A_2 > B_2$ because the user 808 is closer to sensor A then sensor B at position #1. User position or motion can also be detected by comparing the points in time that the capacitance rises above a threshold at each sensor location. Note that in the example illustrated in 830 $t_1$ is less than $t_1'$, the separation in time of the responses A2 and B2 together with processing logic can be used to establish a value for a variable to control an electronic device associated with the system, such as, but not limited to, an intensity level of a light source or a color temperature of a light source.

Graph 860 displays outputs for sensors A and B from the capacitive control up to time $t_3$. Graph 860 displays the transient in system output created while the user moves from 808 to 810 in the direction indicated at 812. As the user moves from position #1 to position #2 across distance d, indicated at 816, an output of the system 864 responsive to sensor A decreases to $A_3$ over time interval 862. Similarly, an output of the system 866 responsive to sensor B increases from $B_2$ to $B_3$ in the same time interval 862.

In some embodiments, the outputs from sensor A and sensor B are two channels of raw count capacitive system output (such as the output from the capacitance-to-digital converter 270 from FIG. 2B) where the value is proportional to the sensor capacitance $C_s$. The capacitive system outputs, for the sensors A and B, are processed for example in a block 272 (FIG. 2B) in order to obtain a control signal for use with electronics. In some embodiments, relative capacitance levels are computed between two or more sensor outputs to determine where a parameter should be set within a given range for control of a device such as a light source, sound source volume, etc.

In various embodiments, processing can be accomplished in different ways such as by computing a difference count between two sensors A and B and comparing the difference count as a function of time. A centroid can be computed with two or more sensors to establish a position within a range, etc. Processing such as this is done for example in the block 272 (FIG. 2B) to obtain a control signal for use with different electronic devices.

Figure 9:
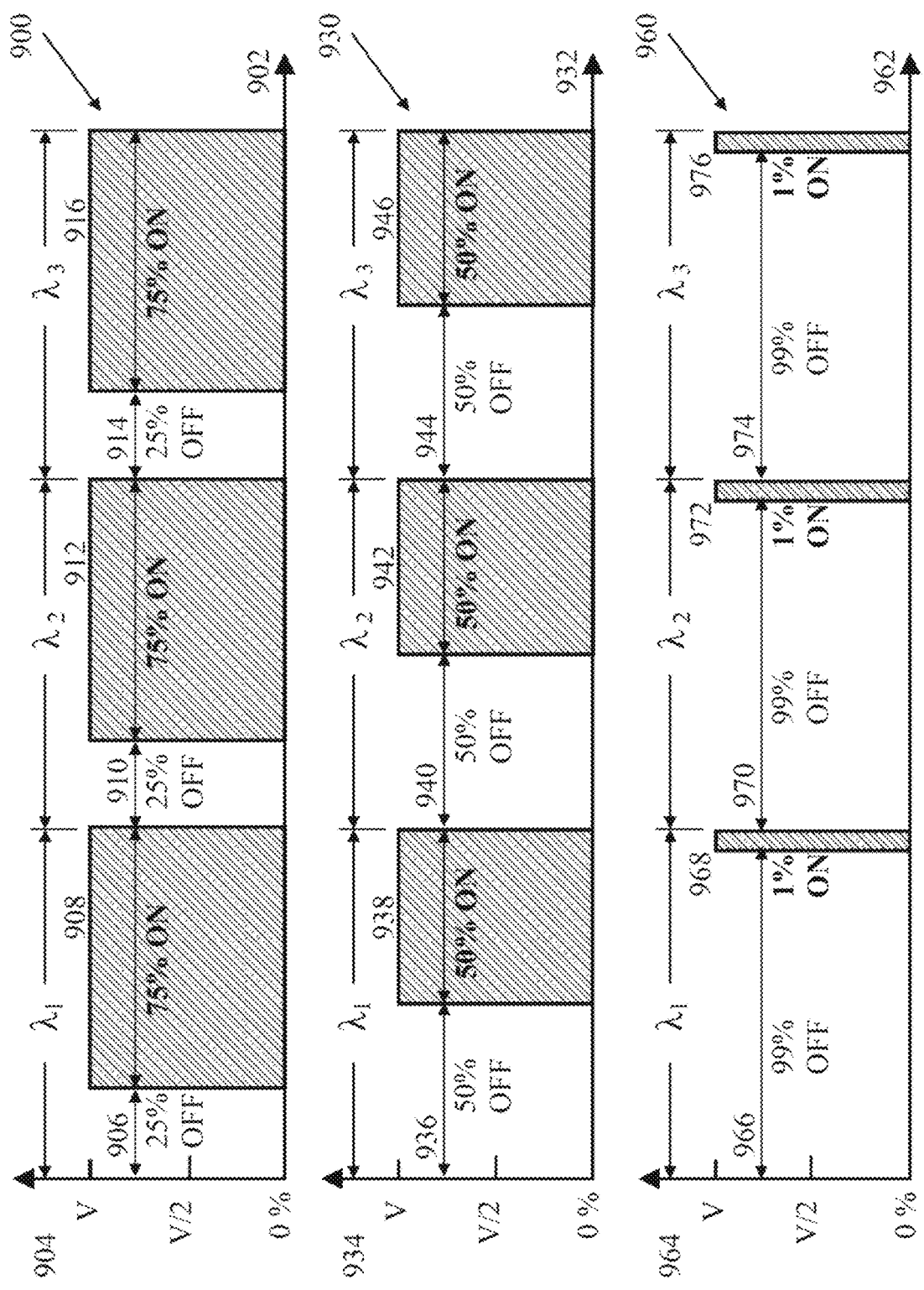
FIG. 9 illustrates mirror light intensity control utilizing pulse width modulation (PWM) according to embodiments of the invention.

FIG. 9 illustrates mirror light intensity control utilizing pulse width modulation (PWM), according to embodiments of the invention. As described above in conjunction with the preceding figures a control signal is obtained from a capacitive touch control such as 102 or 254. The capacitive touch control provides a control signal to an electronic device. In one or more embodiments, the electronic device is a PWM circuit, such as 104 in FIG. 1A.

FIG. 9 illustrates pulse width modulation (PWM), according to embodiments of the invention. Pulse width modulation can be applied to an electrical signal which is sent to a light source such as an LED or an OLED or another type of light source. As the "ON" time is decreased, the light source puts out less light. Dimming is accomplished with a PWM signal according to embodiments of the invention. For example, in one embodiment, at 900 a 75% "ON" signal is sent to a first light source. The 75% ON signal turns the light source ON for 75% of a cycle period or wavelength as indicated by $\lambda_1$ with a 25% OFF time during the cycle period. In one or more embodiments, during PWM the light source is turned ON to full power. The perceived intensity of the light source varies depending on the ratio of ON time to OFF time.

At 930 a 50% ON signal is sent to a first light source, The 50% ON signal turns the light source ON for 50% of a cycle period or wavelength as indicated by $\lambda_1$ with a 50% OFF time during the cycle period. In one or more embodiments, during PWM the light source is turned ON to full power. The perceived intensity of the light source varies depending on the ratio of ON time to OFF time with a 50% signal producing less light output than the 75% ON time PWM signal.

At 960 a 1% ON signal is sent to a first light source. The 1% ON signal turns the light source ON for 1% of a cycle period or wavelength as indicated by $\lambda_1$ with the light source OFF for 99% of time during the cycle period. In one or more embodiments, during PWM, the light source is turned ON to full power. The perceived intensity of the light source varies depending on the ratio of ON time to OFF time with a 1% ON signal producing less light output than the 50% ON time PWM signal.

Additionally, the ON time is reduced further to any percentage of a cycle, such as hut not limited to, 0.1% ON time. A 0.1% ON time signal is sent to a first light source by the output of the PWM circuit 104 (FIG. 1A). The 0.1% ON signal turns the light source ON for 0.1% of a cycle period or wavelength as indicated by $\lambda_1$ with the light source OFF for 99.9% of time during the cycle period. In one or more embodiments, during PWM, the light source is turned ON to full power for this very short time resulting in a very dim night light.

Thus, in one or more embodiments an intensity of a light source is adjusted using a PWM signal generated in response to a capacitive control signal received either through touch or proximity of a user to a capacitive sensor incorporated into a surface such as a mirror. In various embodiments, the PWM techniques described herein are applied to a source of light. The same light source can function as the primary light within a mirror and as well as the night light.

Figure 10:
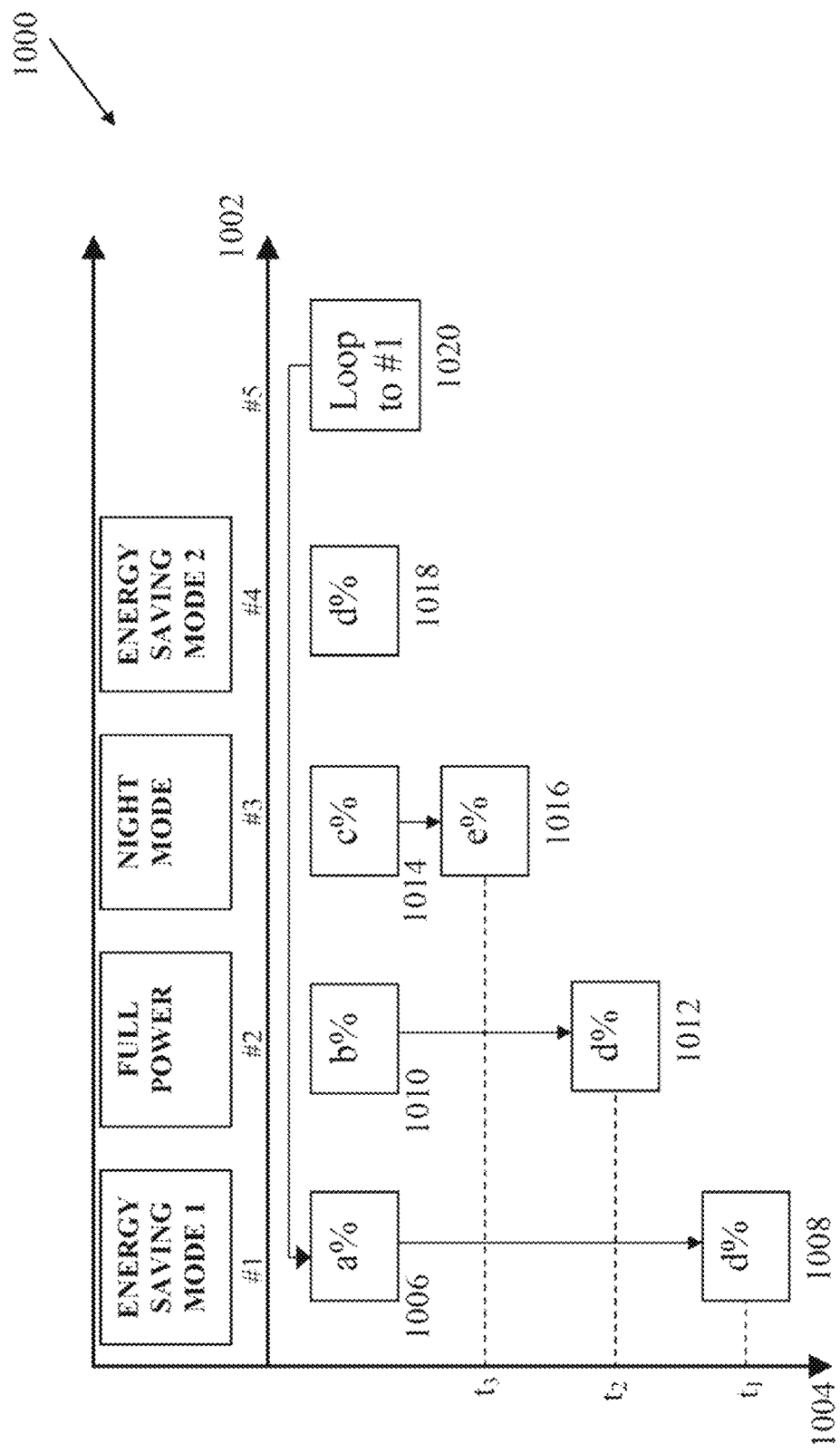
FIG. 10 illustrates light source control, according to embodiments of the invention.

FIG. 10 illustrates, generally at 1000, light source control, according to embodiments of the invention. With reference to FIG. 10, successive single touches of a capacitive control are indicated along the axis 1002, ranging from one to five. Elapsed time is indicated along an axis 1004. As used in this description of embodiments, use of the term "touch" implies either a touch of a surface by a user or a proximity sensing event as described above. Thus, the word "touch" is used synonymously for actual touch and proximity sensing. Therefore, it is understood that the term covers both capacitive sensing systems configured for an actual touch and capacitive sensing systems configured for sensing the presence of a user when the user is within a detection range of the system (proximity). A touch initiates a state change of the capacitive control system. As used in this description of embodiments, such a control is referred to herein as a "one touch" control. The term "one touch" control implies that a plurality of functions is controlled by a single control as opposed to a plurality of controls.

In various embodiments, a one touch control is used to control lighting, power to a device such as a television, video display, defogger, etc. Such applications of the one touch control are given by way of example and do not limit embodiments of the invention. A one touch control is implemented as described above with a capacitive touch sensor and a microprocessor in order to perform the functions needed to control an electronic device.

In one embodiment directed to control of the intensity of light, where the light is built into a minor, the following functionality is accomplished in FIG. 10. A first touch is indicated at 1006. The first touch 1006 powers up the light device into energy savings mode indicated by a % of full power. As long as a second touch is not imparted to the one touch control the functionality will proceed to a block 1008 after time "$t_1$" has elapsed with the light intensity changing to d %.

A second touch, imparted by a user to the one touch control, initiates a function indicated at a block 1010 where the light intensity is changed to b % of full power. Similarly, as long as a third touch is not imparted to the one touch control the functionality will proceed to a block 1012 after time "$t_2$" has elapsed with the light intensity changing to d %.

A third touch, imparted by a user to the one touch control, initiates a function indicated at a block 1014 there the light intensity is changed to c % of full power. Similarly, as long as a fourth touch is not imparted to the one touch control the functionality will proceed to a block 1016 after time "$t_3$" has elapsed with the light intensity changing to e %.

A fourth touch, imparted by a user to the one touch control, initiates a function indicated a block 1018 where the light intensity is changed to d % of full power.

A fifth touch, imparted by a user to the one touch control, initiates a function indicated by the block at 1020 which transfers control back to the block 1006 thereby creating a loop.

In one or more embodiments, normal room light and night light mode are provided by a single light source and are controlled by the one touch control described herein. For example, one or more of modes one, two, and/or four are normal room light and mode three is night light mode.

In one or more embodiments, energy savings mode, normal full power room light, and night light mode are provided by a single light source and are controlled by the one touch control described herein. For example, one or more of modes one and two are power saver mode, more two is normal full power room light, and mode three is night light mode.

The one touch control functionality taught in FIG. 10 provides a framework within which different percentages of light can be associated with the variables, a, b, c, d, and e. In addition thereto, elapsed time $t_n$(n=1, 2, or 3) is a flexible parameter which can be varied according to a particular embodiment to achieve many and varied presentations of lighting experience to a user.

For example, in one embodiment given only for illustration, and with no limitation implied thereby, the following values are used: a=66%, b=100%, c=1.5%, d=33%, and e=0.1%. In this example, when the lighting device is in an off state, the user touches the one touch control which powers up the light device to 66% of full power—this is energy saving mode. After one hour has elapsed ($t_1$=1 hour), the lighting device output transitions into enhanced power saving mode where the light output is reduced to 33% of full power. As described above, the lighting device stays in d % mode (33% of full power in this example) until another touch occurs. When a second touch occurs, the light device increases the output to 100% (b=100%). After one hour has elapsed ($t_2$=1 hour) the lighting device output reduces output to an enhanced power saving mode where the light output is reduced to 33% of full power. In this example $t_1$=$t_2$=1 hour. In other implementations $t_1 \neq t_2$. When a third consecutive touch occurs, the lighting device enters night light mode with c=1.5%. After an elapsed time of $t_3$=approximately 20 minutes, the lighting device enters a second stage of night light mode with e=0.1% of full power. A two-stage night light mode accommodates the user's biological adaptation to the lower light level of the indoor environment by adapting the night light to a vet lower level night light level (a second stage of night light mode) gradually over time interval $t_3$ to light output e % which is approximately an order of magnitude less than that of the first stage of night light mode c %. When a fourth touch occurs, the lighting device comes out of night light mode and emits light at the energy saving mode where d=33% of full power. A fifth touch cycles control back to enemy saving mode at the block 1006.

As noted in the above example, the values given for a %, b % c %, d %, e %, $t_1$, $t_2$, and $t_3$ are only one example. Many variations are possible within the teachings of the embodiments presented herein. For example, reductions from one light level to a lesser second light level are all within the scope of the embodiments taught herein with no limitations implied by the specific numeric example given above. Similarly, elapsed times are flexible and different values are all contemplated within the scope of embodiments taught herein. Power saving mode is also flexible where power saving mode is less than full power. Note that two examples of power savings mode are provided within the numeric example above, i.e., 66% and 33%. Other values are all within the scope of the embodiments contemplated by the description of embodiments provided herein.

FIG. 11A illustrates, generally at 1100, indicator light functionality during night light mode, according to embodiments of the invention. With reference to FIG. 11A, light intensity is plotted on a vertical axis 1102 as a function of time, where time is plotted on a horizontal axis 1104. With reference to FIG. 11A, the light intensity referred to on the axis 1102 is the light intensity of the light associated with the indicator light source 454 (FIG. 4A above) for example or the light associated with other indicator light sources discussed in the figures to follow. In some embodiments, the main light region is used as the indicator light window.

When a user touches the capacitive touch control or comes within the capacitive sensor's range without actually touching the surface (proximity sensor) such is indicated during a segment of time 1106. During, this segment of time, the light intensity emitted by the indicator light is at level f %. When the user stops touching the surface or withdraws from the trigger range of a proximity capacitive sensor, the light intensity transitions through a change in intensity indicated by $f_1(t)$ for a duration of time 1108 ($t_4$ to $t_5$)After time $t_5$ indicated by 1110 the light intensity is at level g % which indicates a successful state change. The intensity function in FIG. 11A is used to communicate a state change following a touch or a proximity trigger of a capacitive touch sensor as described in FIG. 10, for example, to communicate in response to blocks 1014 entering night light mode. Anon-limiting example, provided merely for illustration, for f % and g % are: f=100% and g=6.6%. Other light intensity values are used in other embodiments.

Figure 11B:
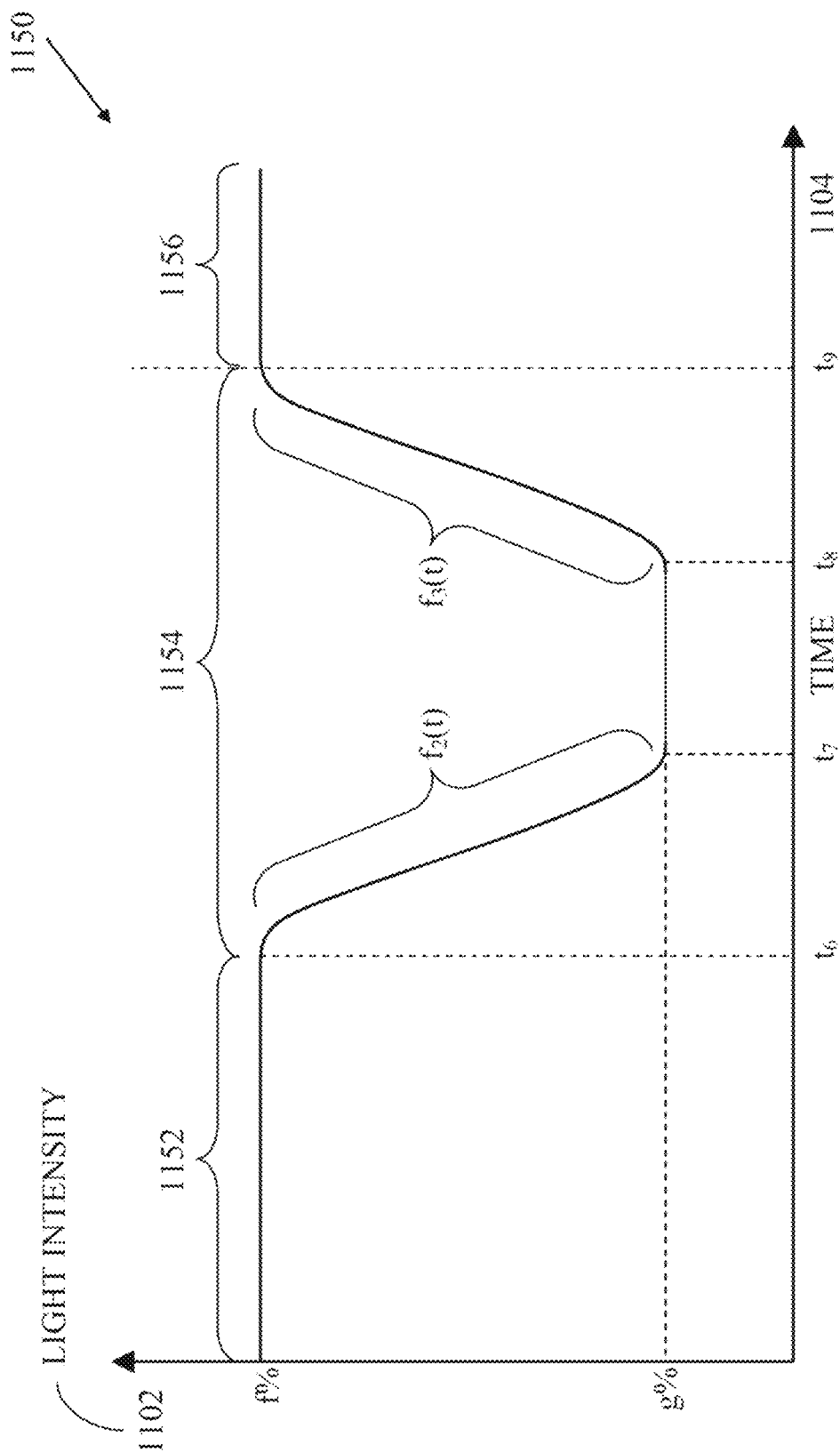
FIG. 11B illustrates indicator light functionality, according to embodiments of the invention.

FIG. 11B illustrates, generally at 1150, indicator light functionality, according to embodiments of the invention. With reference to FIG. 11B, another light intensity time function is illustrated for providing feedback communication to a user that a state change was successfully accomplished with a capacitive touch control. When a user touches the capacitive touch control or comes within the capacitive sensor's range without actually touching the surface (proximity sensor) such is indicated during a segment of time 1152. During this segment of time, the light intensity emitted by the indicator light is at level f %. When the user stops touching the surface or withdraws from the trigger range of a proximity capacitive sensor the light intensity transitions through a change in intensity indicated by $f_2(t)$ for a duration of time ($t_6$ to $t_7$). Alter time $t_7$ and up until is the light intensity is at level g % and then returns back to level f % at time $t_9$ transitioning as $f_3(t)$ back to f % light intensity which indicates a successful state change. The light intensity level of the indicator light region then stays at the level f % during time 1156. The intensity function in FIG. 1113 is used to communicate a state change following a touch or a proximity trigger of a capacitive touch sensor as described in FIG. 10 for example to communicate in response to blocks 1006, 1010, 1018, and 1020. A non-limiting example, provided merely for illustration, for f % and g % are: f=100% and g=6.6%. Other light intensity values are used in other embodiments.

The functions of time $f_1$, $f_2(t)$, and $f_3(t)$ provide a smooth transition from one light intensity to another thereby providing a soothing experience for the user as the light intensity transitions according to a function of time. The functions of time can be linear or they contain linear and curved portions or they can consist of only curved shapes. Different durations (e.g., ($t_5$–$t_4$), or ($t_9$–$t_8$) of the functions of time are used in different embodiments. A non-limiting example for a duration of a function of time is on the order of a second. Durations can be less than a second or more than a second in other embodiments. In some embodiments, the duration is very short on the order of milliseconds or less appearing to the user as instantaneous.

Figure 12:
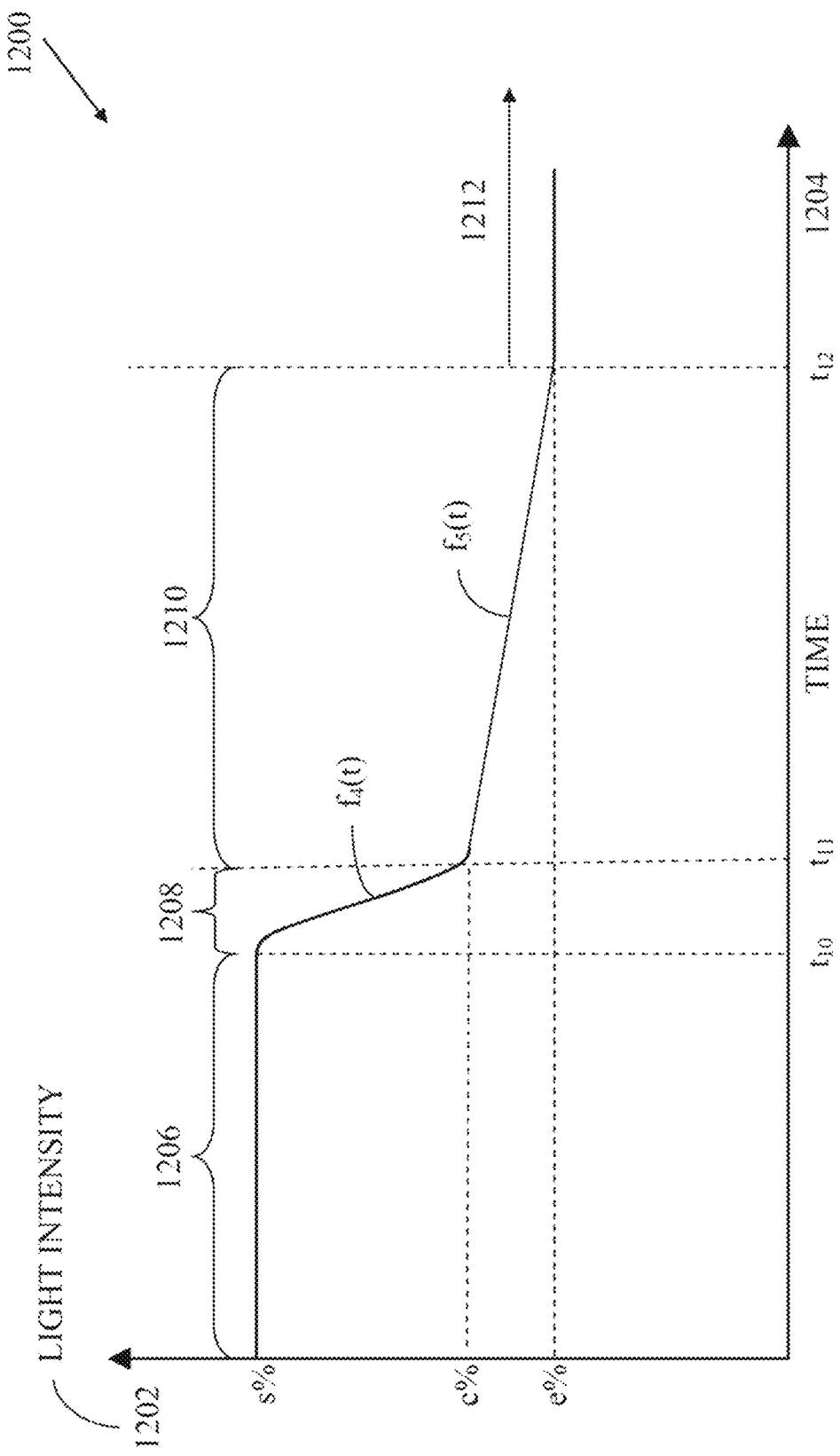
FIG. 12 illustrates two stage light source control, according to embodiments of the invention.

FIG. 12 illustrates, generally at 1200, two stage light source control, according to embodiments of the invention. With reference to FIG. 12, a two-stage light source intensity profile is illustrated with light intensity plotted on a vertical axis at 1202 as a function of time on the horizontal axis at 1204. In one or more embodiments, "two-stage" describes two-stage night light functionality. A first zone, indicated at 1206, corresponds with a finger touch of a capacitive touch sensor or triggering a capacitive touch sensor setup for use as a proximity sensor. Light intensity is at s % level at the start of the time axis. Depending on the logic employed for the control of light intensity, s % can take on a variety of different levels depending on a given system design. For example, s % can take on values of b % or d %, using the percentages described above in conjunction with FIG. 10. For the purpose of this discussion s % is the starting light intensity percentage that exists prior to the touch event. Following the touch event, system logic provides a transition of light intensity during the tinge period $t_1$ to $t_{11}$ following $f_4(t)$.

In response to the touch event, system logic embodied in the capacitive control system causes the light intensity to transition smoothly during time period 1208 following function $f_4(t)$ between $t_{10}$ and $t_{11}$. At time $t_{11}$ light intensity is at c %. Without the need for a subsequent touch event, the light intensity continues to transition during a time period 1210 from $t_{11}$ to $t_{12}$ following function $f_5(t)$. Function $f_5(t)$ can be a linear relationship or it can prescribe a curved shape. In some embodiments, time period 1210 is on the order of a biological response tine of the human eye to a decrease in light level from normal room light level to nighttime darkness. In some embodiments, this time period can be on the order of twenty (20) minutes, however it is flexible. After time period 1210 ends, the light intensity remains at e % as indicated at 1212 for times greater than $t_{12}$.

Figure 13:
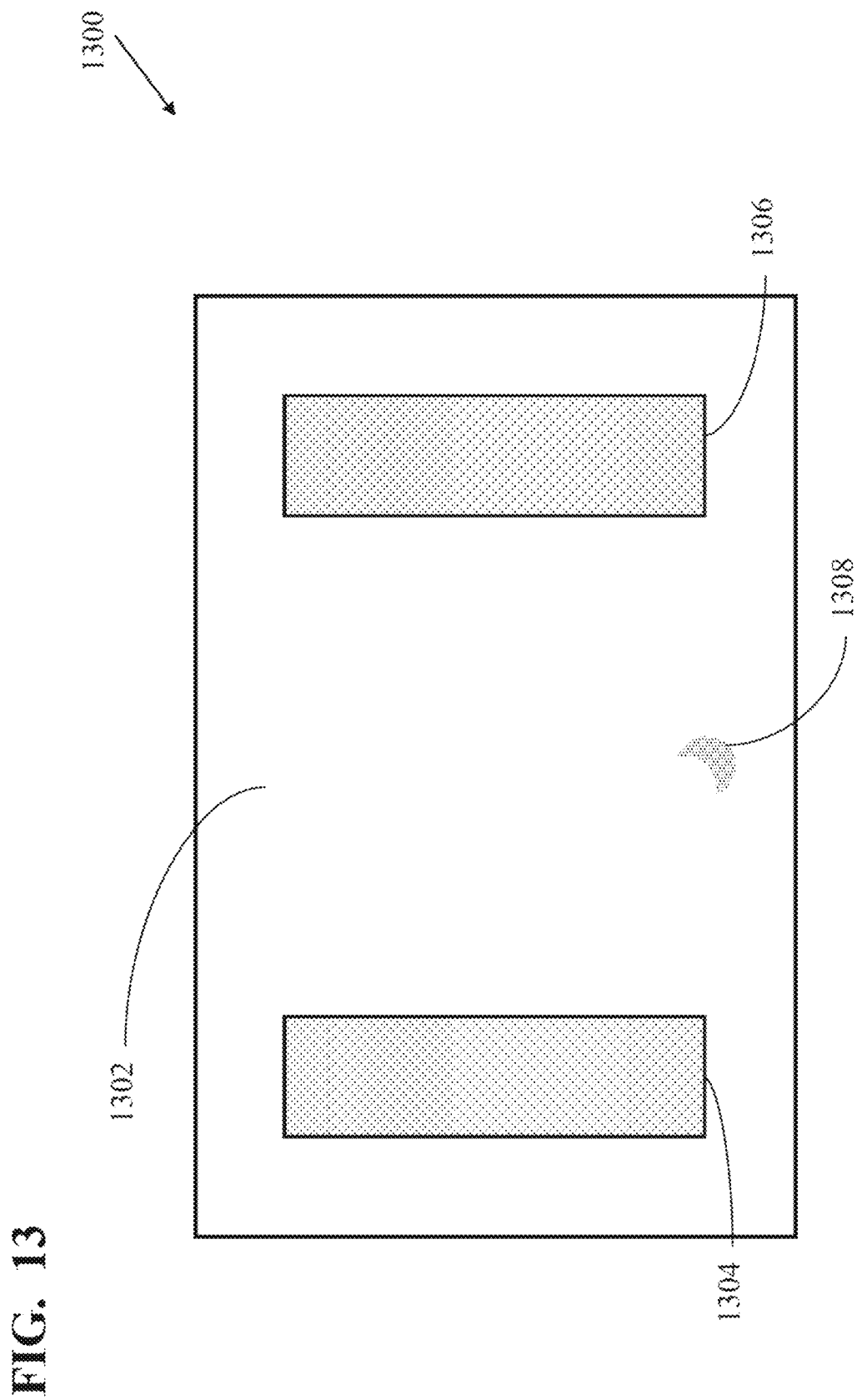
FIG. 13 illustrates one touch control incorporated into a mirror with visual feedback, according to embodiments of the invention.

FIG. 13 illustrates, generally at 1300, one touch control incorporated into a mirror with visual feedback, according to embodiments of the invention. With reference to FIG. 13, a mirror is illustrated at 1302. The mirror 1302 includes a first region 1304 and in some embodiments a second region 1306 which are used to supply a source of light within the window 1302. The sources of light can be configured as direct backlit regions of the mirror or as indirectly backlit regions. Light emitting diodes (LEDs), organic light emitting diodes (OLEDs). etc., are used in various embodiments as the light device that is controlled by the capacitive touch control. Pulse width modulated (PWM) signals are also used to provide the different intensities of light described in the figures herein. A visual feedback region is illustrated at 1308. The region 1308 is also referred to as an indicator window. The indicator window 1308 is used to provide visual feedback to communicate to a user when a state change has been triggered by the user in response to a touch event. In some embodiments, feedback to the user is accomplished by using one or more of regions 1304 and 1306 without including window 1308. In some embodiments, the night light function is provided by using the light elements that are used for the primary light devices configured for use with one or more of regions 1304 and/or 1306.

Figure 14:
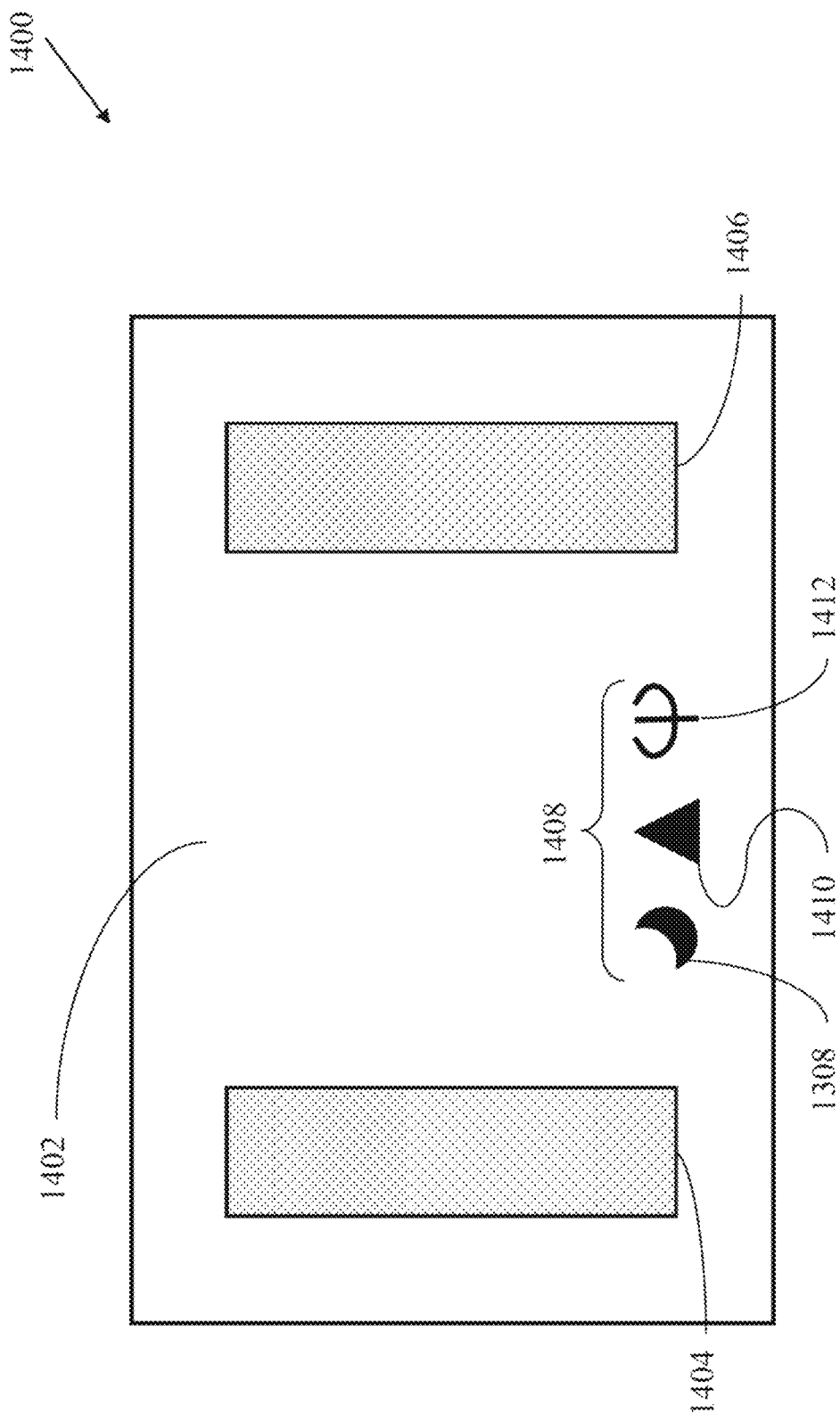
FIG. 14 illustrates control(s) incorporated into a minor with visual feedback, according to embodiments of the invention.

FIG. 14 illustrates, generally at 1400, control(s) incorporated into a mirror with visual feedback, according to embodiments of the invention. With reference to FIG. 14, a mirror is illustrated at 1402. The mirror 1402 includes a first region 1404 and in sonic embodiments a second region 1406 which are used to supply a source of light within the mirror 1402. The sources of light can be configured as direct backlit regions of the mirror or as indirectly backlit regions. Light emitting diodes (LEDs), organic light emitting diodes (OLEDs), etc., are used in various embodiments as the light device that is controlled by the capacitive touch control. Pulse width modulated (PWM) signals are also used to provide the different intensities of light described in the figures herein.

Visual feedback regions are illustrated at 1408. The regions 1408 are also referred to as indicator windows. The indicator window can indicate to the user where on the mirror surface a capacitive control is located. The indicator windows can provide a series of one touch functionalities for different devices that are controlled by the capacitive touch control system. For example, in one embodiment, indicator 1308 is used to provide feedback on a light device as described herein, e.g., power ON, power OFF, intensity, light color temperature, etc. Indicator 1410 is used to provide one touch feedback on audio volume for an electronic device. indicator window 1412 is used to provide feedback on wireless connectivity between devices such as Bluetooth pairing with a mobile device, etc. The indicator windows 1308, 1410, and 1412 are used to provide visual feedback to communicate to a user when a state change has been triggered by the user in response to a touch event as described herein in a one touch configuration. While certain shapes are used to illustrate the indicator windows in 1408 no limitation is implied thereby. These shapes are used merely for illustration and other shapes are used in other embodiments.

In some embodiments, feedback to the user is accomplished by using one or more of regions 1404 and 1406 without including windows 1408. In some embodiments, the night light function is provided by using the light elements that are used for the primary light devices configured for use with one or more of regions 1404 and/or 1406.

Figure 15:
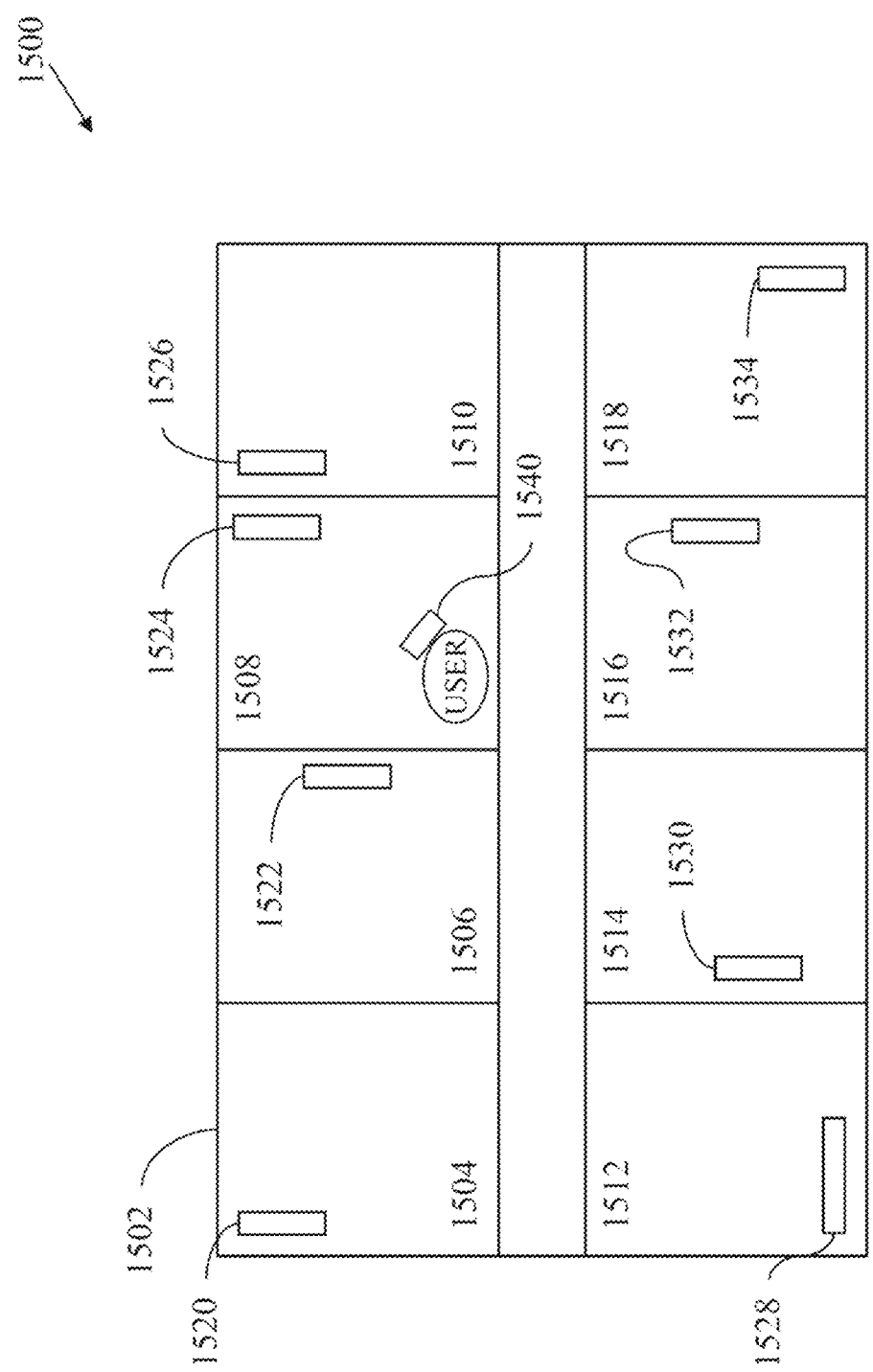
FIG. 15 illustrates a home or hospitality environment, according to embodiments of the invention.

FIG. 15 illustrates, generally at 1500, a home or hospitality environment, according to embodiments of the invention. With reference to FIG. 15, 1502 represents a home or hospitality area for example in various embodiments, a hotel, a motel, a conference center, a marina, a convention center, etc. Within the hospitality area 1502 there is a plurality of rooms or sub areas such as 1504, 1506, 1508, 1510, 1512, 1514, 1516, through 1518. Within one or more of the rooms or sub areas a mirror is located therein such as a mirror 1520, 1522, 1524, 1526, 1528, 1530, 1532, and 1534. In various embodiments, the plurality of mirrors 1520 through 1534 are configured each with a capacitive touch control system, which allows for the control of electronic device(s) or aspects of the home or hospitality environment from the respective mirrors within the given environment.

Figure 16:
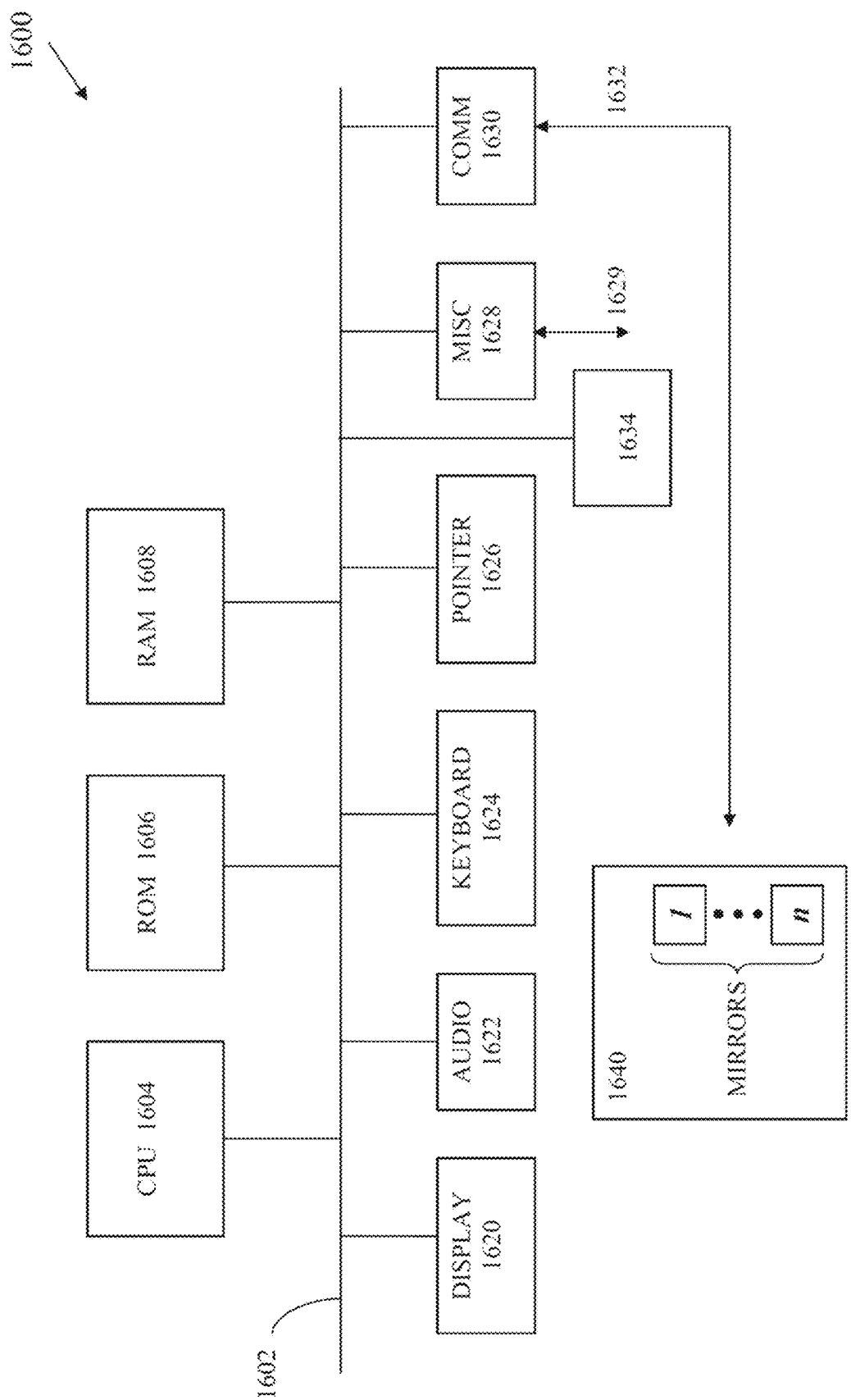
FIG. 16 illustrates a capacitive control system for use in a home or hospitality environment, according to embodiments of the invention.

FIG. 16 illustrates, generally at 1600, a capacitive control system for use in a home or hospitality environment, according to embodiments of the invention. With reference to FIG. 16, as used in this description of embodiments, a capacitive control system can be located in each of the mirrors 1 through n it as indicated in the block 1640. The block diagram is a high level conceptual representation and may be implemented in a variety of ways and by various architectures. Bus system 1602 interconnects a Central Processing Unit (CPU) 1604 (alternatively referred to herein as a processor), Read Only Memory (ROM) 1606, Random Access Memory (RAM) 1608, storage 1610, display 1620, audio, 1622, keyboard 1624, pointer 1626, miscellaneous input/output I/O) devices 1628, and communications 1630. RAM 1608 can also represent dynamic random access memory (DRAM). It is understood that me (not shown) can be included with the CPU block 1604. The bus system 1602 may be for example, one or more of such buses as a system bus, Peripheral Component interconnect (PCI), Advanced Graphics Port (AGP), Small Computer System Interface (SCSI). Institute of Electrical and Electronics Engineers (IEEE) standard number 994 (FireWire), Universal Serial Bus (USB), etc. The CPU 1604 may be a single, multiple, or even a distributed computing resource. Storage 1610 may be Compact Disc (CD), Digital Versatile Disk (DVD), hard disks (HD), solid state disk (SSD), optical disks, tape, flash, memory sticks, video recorders, a redundant array of independent disks (RAID), etc. Note that depending upon the actual implementation of a capacitive control system, the control system may include some, all, more, or a rearrangement of components in the block diagram. Thus, many variations on the control system of FIG. 16 are possible.

Connection with a network is obtained with 1632 via 1630 either wirelessly or through a wired connection, as is recognized by those of skill in the art, which enables the control system 1600 to communicate with a general number of n mirror platforms at 1640 which can be in remote locations throughout for example a home or hospitality area 1502 described above in conjunction with FIGS. 15. 1632 and 1630 flexibly represent communication elements in various implementations, and can represent various forms of telemetry, GPRS, Ethernet, Wide Area Network (WAN), Local Area Network (LAN), Internet connection, WiFi, WiMax, ZigBee, Infrared, etc. and combinations thereof. In various embodiments, a pointing device such as a stylus is used in conjunction with a touch screen, for example, via 1629 and 1628.

In various embodiments, devices are configured with electronic components such as, but not limited to, light sources, defoggers, etc. As described above, devices include various forms of mirrors, lamps, and other objects configured to provide light to environment. Some forms of mirrors where embodiments of the invention can be applied are illustrated in the figures below. These illustrations are lot meant to limit application of embodiments of the invention but are provided merely for illustration.

Figure 17A:
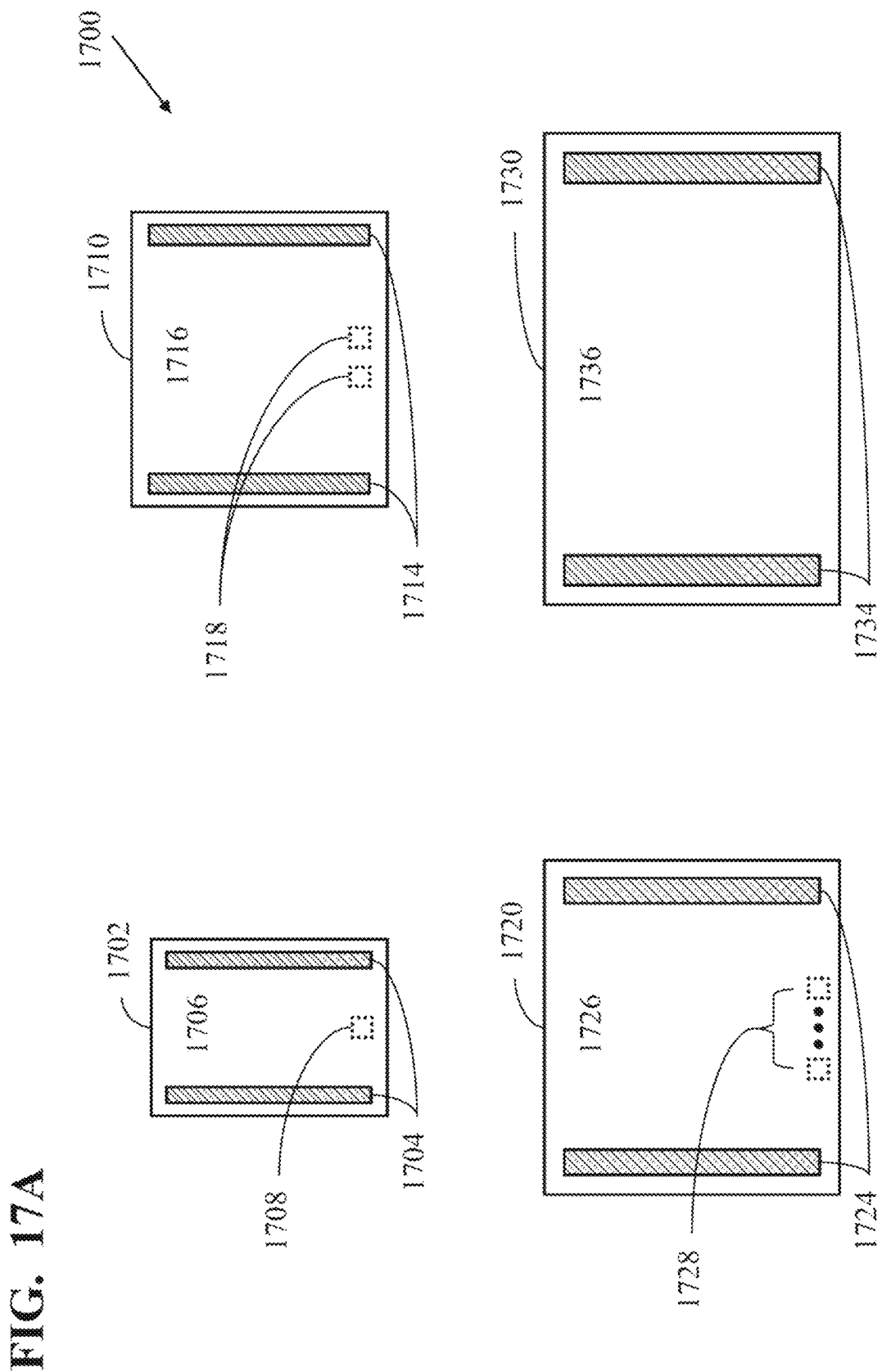
FIG. 17A illustrates mirrors, according to embodiments of the invention.

FIG. 17A illustrates, generally at 1700, mirrors according to embodiments of the invention. With reference to FIG. 17A, several mirror designs are illustrated. A mirror 1702 has a reflective area 1706 and one or more areas 1704 where the reflectivity has been changed to permit light to pass there through. In some embodiments, a region 1708 is provided to provide visual feedback to a user. The visual feedback is related to a state of a system used in conjunction with the mirror 1702. The region 1708 can be used in conjunction with a touch control, such as a capacitive touch control (one touch control) as described in conjunction with the other figures herein. The capacitive touch control can be used to control lighting such as intensity, light color temperature as well as to control other electronic devices and to control functionality for those devices.

A mirror 1710 has a reflective area 1716 and one or more areas 1714 where the reflectivity has been changed to permit light to pass there through. In some embodiments, regions 1718 are provided to provide visual feedback to a user. The visual feedback is related to a state of a system used in conjunction with the mirror 1710. The regions 1718 can be used in conjunction with two touch controls, such as capacitive touch controls (one touch controls) as described in conjunction with the other figures herein. The capacitive touch controls can be used to control lighting such as intensity, light color temperature as well as to control other electronic devices and to control functionality for those devices.

A mirror 1720 has a reflective area 1726 and one or more areas 1724 where the reflectivity has been changed to permit light to pass there through. In some embodiments, regions 1728 are provided to provide visual feedback to a user. The visual feedback is related to a state of a system used in conjunction with the mirror 1720. A general number of regions are illustrated at 1728 that can be used in conjunction with touch controls, such as capacitive touch controls (one touch controls) as described in conjunction with the other figures herein. The capacitive touch controls can be used to control lighting such as intensity, light color temperature as well as to control other electronic devices and to control functionality for those devices.

A mirror 1730 has a reflective area 1736 and one or more areas 1734 where the reflectivity has been changed to permit light to pass there through. In this embodiment, a separate region for visual feedback has not been provided. Visual feedback can be provided by using one or more of regions 1734 to provide visual feedback to a user. The visual feedback is related to a state of a system used in conjunction with the mirror 1730. Though not shown on the mirror 1730, in some embodiments, a capacitive one touch control or multiple capacitive one touch controls are incorporated therein. In some embodiments, the areas 1734 are used to provide feedback to a user in conjunction with a capacitive one touch control or multiple capacitive one touch controls.

Figure 17B:
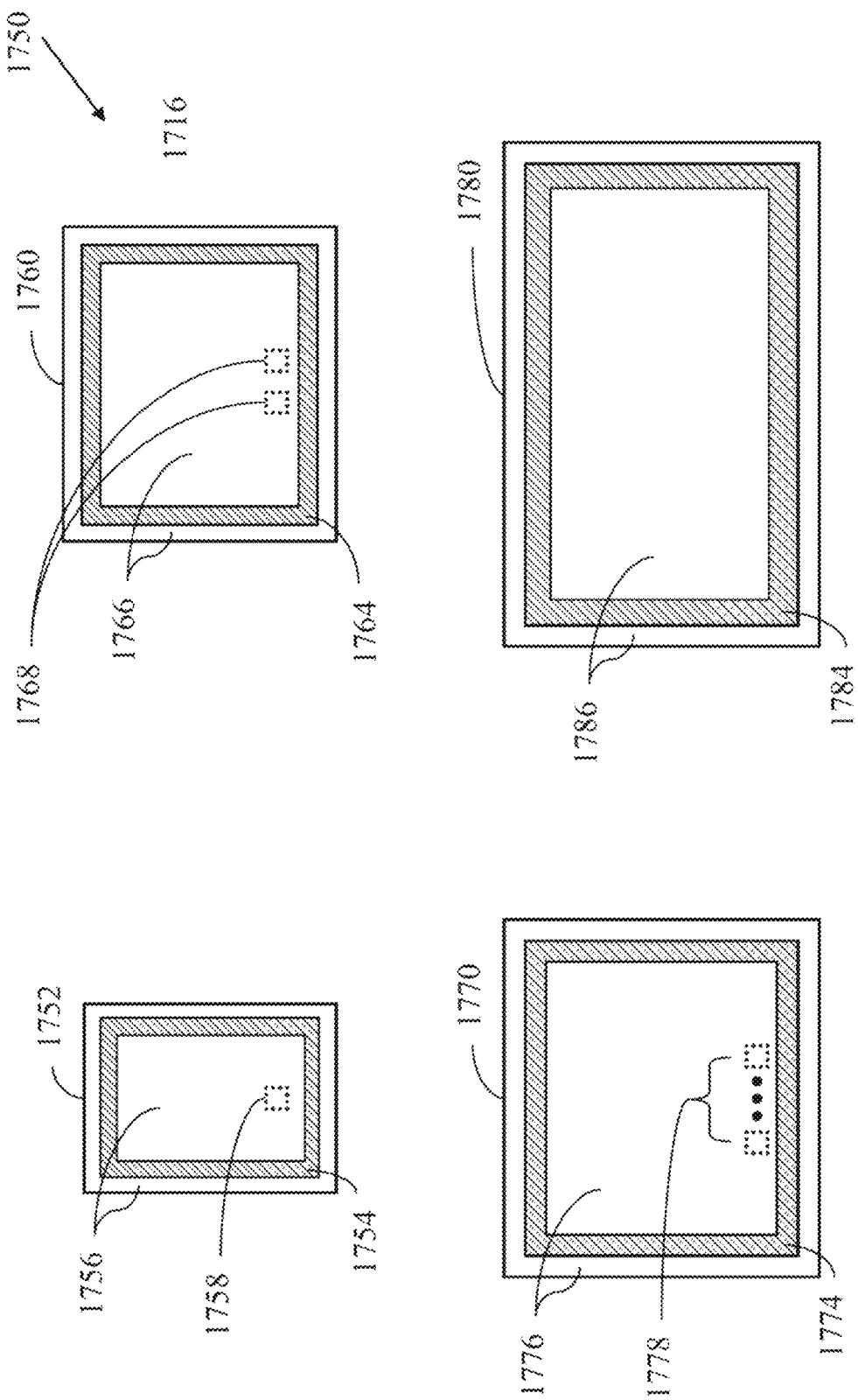
FIG. 17B illustrates additional mirrors, according to embodiments of the invention.

FIG. 17B illustrates, generally at 1750, additional mirrors, according to embodiments of the invention. With reference to FIG. 17B, a mirror 1752 has one or more reflective areas 1756 and an area 1754 where the reflectivity has been changed to permit light to pass there through. In some embodiments, a region 1758 is provided to provide visual feedback to a user. The visual feedback is related to a state of a system used in conjunction with the mirror 1752, The region 1758 can be used in conjunction with a touch control, such as a capacitive touch control (one touch control) as described in conjunction with the other figures herein. The capacitive touch control can be used to control lighting such as intensity, light color temperature as well as to control other electronic devices and to control functionality for those devices.

A mirror 1760 has one or more reflective areas 1766 and an area 1764 where the reflectivity has been changed to permit light to pass there through. In some embodiments, regions 1768 are provided to provide visual feedback to a user. The visual feedback is related to a state of a system used in conjunction with the mirror 1760. The regions 1768 can be used in conjunction with two touch controls, such as capacitive touch controls (one touch controls) as described in conjunction with the other figures herein. The capacitive touch controls can be used to control lighting such as intensity, light color temperature as well as to control other electronic devices and to control functionality for those devices.

A mirror 1770 has one or more reflective areas 1776 and an area 1774 where the reflectivity has been changed to permit light to pass there through. In some embodiments, regions 1778 are provided to provide visual feedback to a user. The visual feedback is related to a state of a system used in conjunction with the mirror 1770. A general number of regions are illustrated at 1778 that can be used in conjunction with touch controls, such as capacitive touch controls (one touch controls) as described in conjunction with the other figures herein. The capacitive touch controls can be used to control lighting such as intensity, light color temperature as well as to control other electronic devices and to control functionality for those devices.

A mirror 1780 has one or more reflective areas 1786 and an area 1784 where the reflectivity has been changed to permit light to pass there through. In this embodiment, a separate region for visual feedback has not beet provided. Visual feedback can be provided by using the region 1784 to provide visual feedback to a user. The visual feedback is related to a state of a system used in conjunction with the mirror 1780. Though not shown on the mirror 1780, in some embodiments, a capacitive one touch control or multiple capacitive one touch controls are incorporated therein. In some embodiments, the area 1784 is used to provide feedback to a user in conjunction with a capacitive one touch control or multiple capacitive one touch controls.

Figure 18:
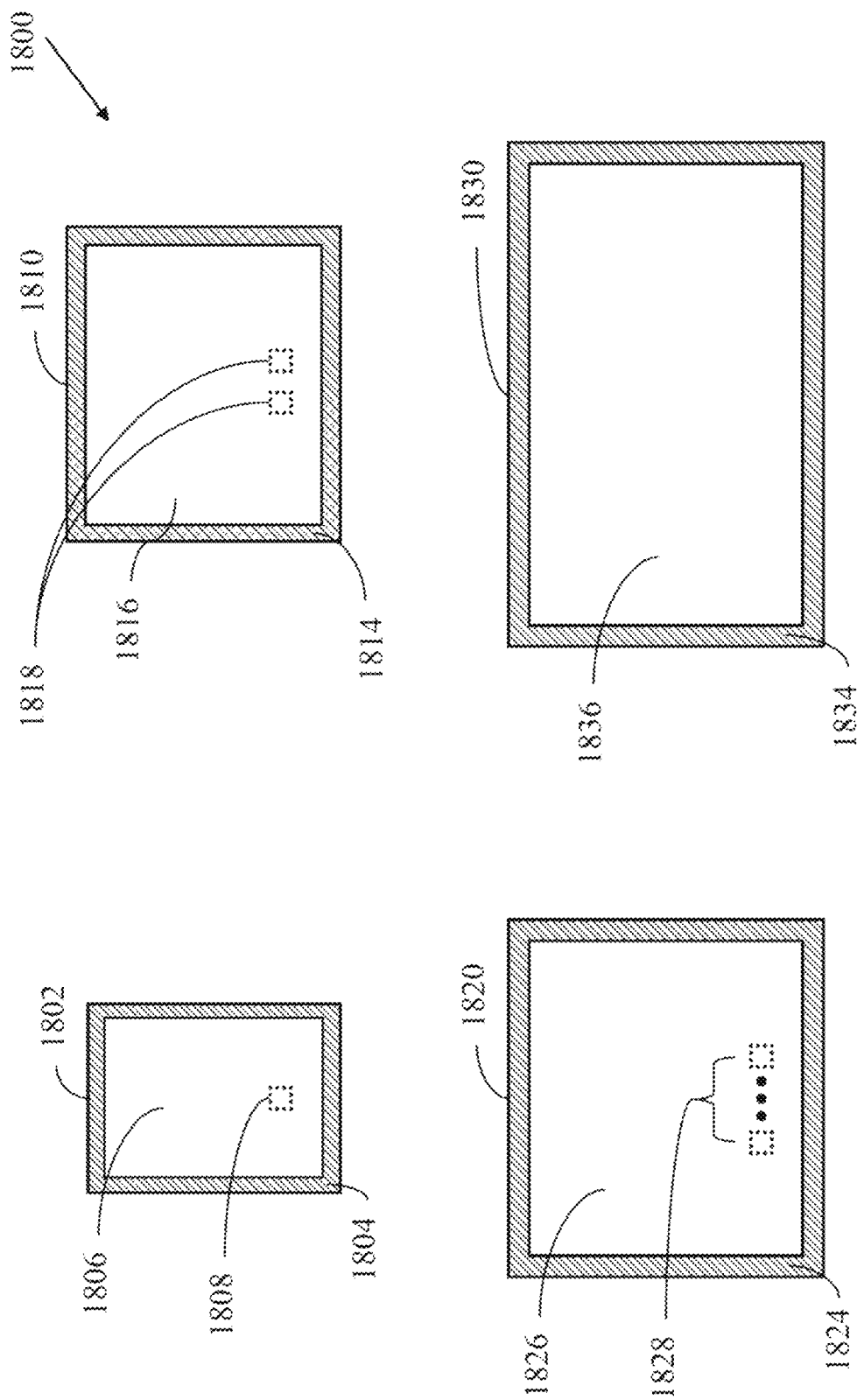
FIG. 18 illustrates yet additional mirrors, according to embodiments of the invention.

FIG. 18 illustrates, generally at 1800, yet additional mirrors, according to embodiments of the invention. With reference to FIG. 18, a mirror 1802 has a reflective area 1806 and an area 1804 where the reflectivity has been changed to permit light to pass there through. In some embodiments, a region 1808 is provided to provide visual feedback to a user. The visual feedback is related to a state of a system used in conjunction with the mirror 1802. The region 1808 can be used in conjunction with a touch control, such as a capacitive touch control (one touch control) as described in conjunction with the other figures herein. The capacitive touch control can be used to control lighting such as intensity, light color temperature as well as to control other electronic devices and to control functionality for those devices.

A mirror 1810 has a reflective area 1816 and an area 1814 where the reflectivity has been changed to permit light to pass there through. In some embodiments, regions 1818 are provided to provide visual feedback to a user. The visual feedback is related to a state of a system used in conjunction with the mirror 1810. The regions 1818 can be used in conjunction with two touch controls, such as capacitive touch controls (one touch controls) as described in conjunction with the other figures herein. The capacitive touch controls can be used to control lighting such as intensity, light color temperature as well as to control other electronic devices and to control functionality for those devices.

A mirror 1820 has a reflective area 1826 and an area 1824 where the reflectivity has been changed to permit light to pass there through. In some embodiments, regions 1828 are provided to provide visual feedback to a user. The visual feedback is related to a state of a system used in conjunction with the mirror 1820. The regions 1828 can be used in conjunction with two touch controls, such as capacitive touch controls (one touch controls) as described in conjunction with the other figures herein. The capacitive touch controls can be used to control lighting such as intensity, light color temperature as well as to control other electronic devices and to control functionality for those devices.

A mirror 1830 has a reflective area 1836 and an area 1834 where the reflectivity has been changed to permit light to pass there through. In this embodiment, a separate region for visual feedback has not been provided. Visual feedback can be provided by using the region 1834 to provide visual feedback to a user. The visual feedback is related to a state of a system used in conjunction with the mirror 1830. Though not shown on the mirror 1830, in some embodiments, a capacitive one touch control or multiple capacitive one touch controls are incorporated therein. In some embodiments, the area 1834 is used to provide feedback to a user in conjunction with a capacitive one touch control or multiple capacitive one touch controls.

Figure 19:
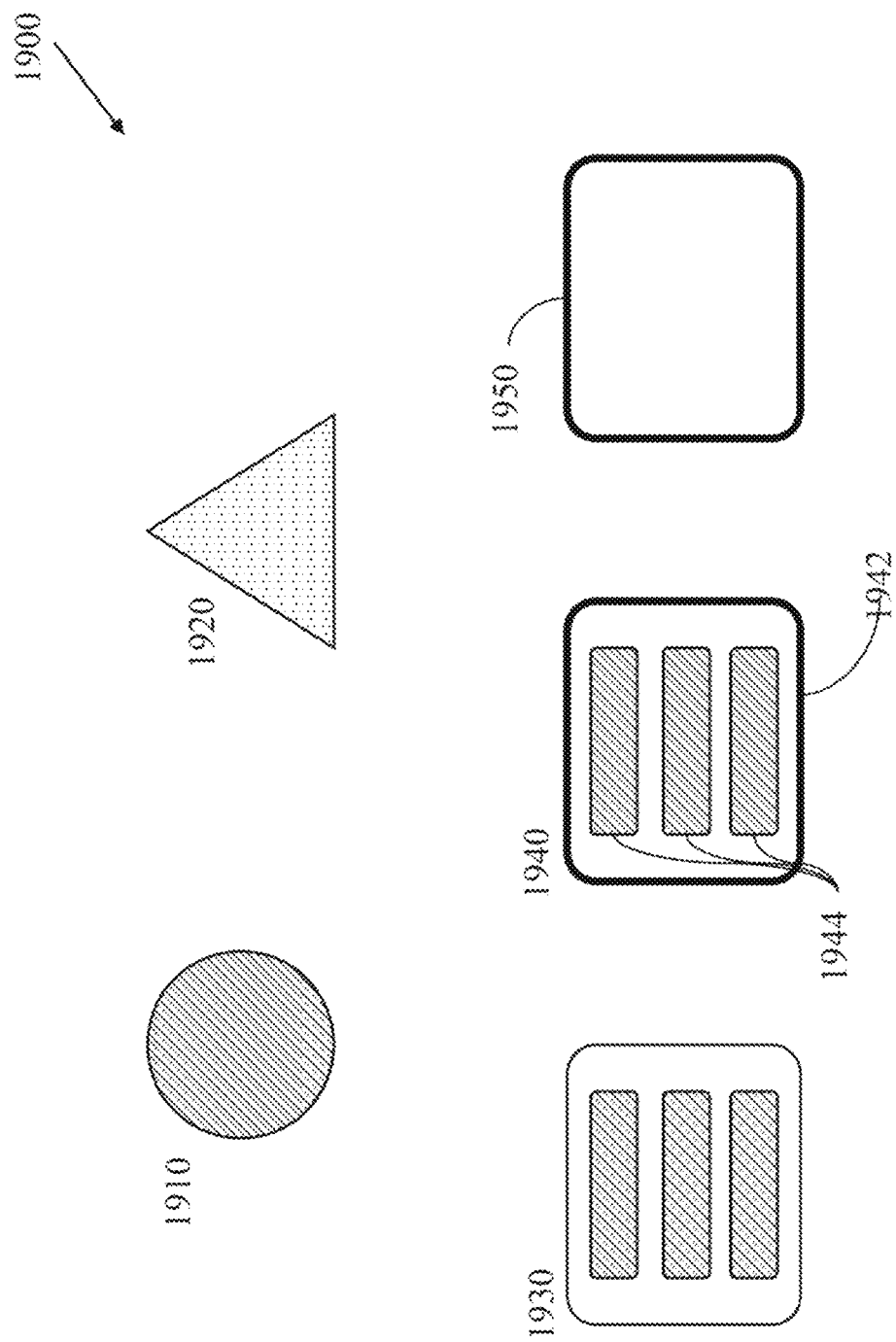
FIG. 19 illustrates indicator regions, according to embodiments of the invention.

FIG. 19 illustrates, generally at 1900, indicator regions, according to embodiments of the invention. With reference to FIG. 19, an indicator region can be made with a variety if shapes. For example, a circular shape for the indicator region is indicated at 1910. A triangular shape for the indicator region is indicated at 1920. A square shape for the indicator region is indicated at 1930. In various embodiments, indicator regions provide a diffuser effect to light radiating from behind the mirror.

In some embodiments, an indicator region is a combination of a diffuser region and a non-diffuser region. In such an embodiment, a first amount of light passes through the diffuser region to provide visual feedback to the user. The "marking" provided by the non-diffuser region draws the user's attention to the indicator region. Drawing the user's attention to the indicator region is helpful in situations, such as, when in a powered down state, the indicator region might not be illuminated.

Non-diffuser regions used in conjunction with an indicator region can be the result of etching or printing on a glass surface, such as the shape illustrated at 1950. Alternatively, or in addition thereto, a non-diffuser region can be provided by creating a shape in the mirror with a color that draws the user's attention thereto.

An example of an indicator region using a combination of non-diffuser region and diffuser region is illustrated at 1940. In this embodiment, a non-diffuser region 1942 is provided in the shape of a square with rounded corners. The square 1942 is provided as a colored shape to distinguish the shape from the continuous reflective mirror surface. Elements 1944 (rectangles with rounded corners) provide diffuser regions that permit light to pass there through. Thus, the combination of a non-diffuser region and diffuser region is used to provide visual feedback to the user concerning the state of a system used in conjunction with a mirror or other device.

In some embodiments, an indicator region is a region that becomes illuminated when a user is within a detection range of a system used in conjunction with a mirror, such as via proximity capacitive sensing. For example, an indicator region is directly illuminated from a back side of the mirror surface when a user is within a detection range of the system thereby making the indicator region visible to the user when the user is within range.

In some embodiments, one or more of tire backlight regions or indicator region(s) blink to provide communication with a user.

Figure 20:
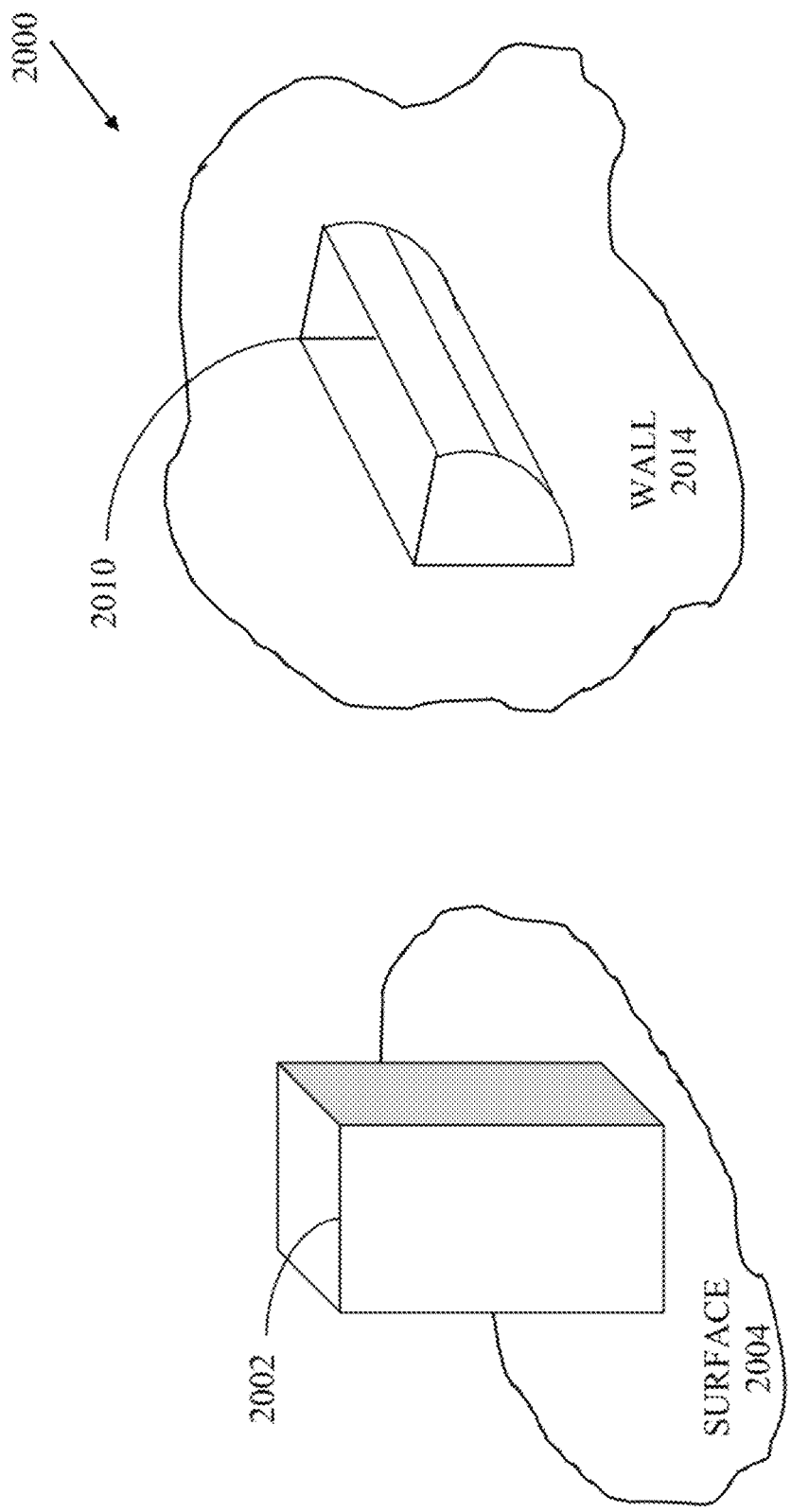
FIG. 20 illustrates light winces, according to embodiments of the invention.

FIG. 20 illustrates generally at 2000, light sources, according to embodiments of the invention. With reference to FIG. 20, several light sources are illustrated such as a light device 2002. The light device 2002 is in various embodiments, provided as a lamp or light cube. The light device 2002 is illustrated resting on a surface 2004, In other embodiments, a light device is provided as a wall light 2010. A wall light 2010 can be in the form of a wall sconce 2010 attached to a wall 2014 or the wall light can be provided in other forms, such as, but not limited to a lighted mirror as described herein. In other embodiments, other forms of light device are provided.

Light devices provide light at one or more color temperatures according to various embodiments of the invention. A color temperature of a light device can be adjusted by a user or the color temperature can be adjusted by logic incorporated into a control system used to change a color temperature of one or more light devices as a function of time as described herein. The description that follows is directed to changing a color temperature of light emitted from a light. device. While the light device used in die discussion below is given in the context of a lighted mirror no limitation is implied, and the description is applicable to light devices other than a lighted mirror.

Figure 21:
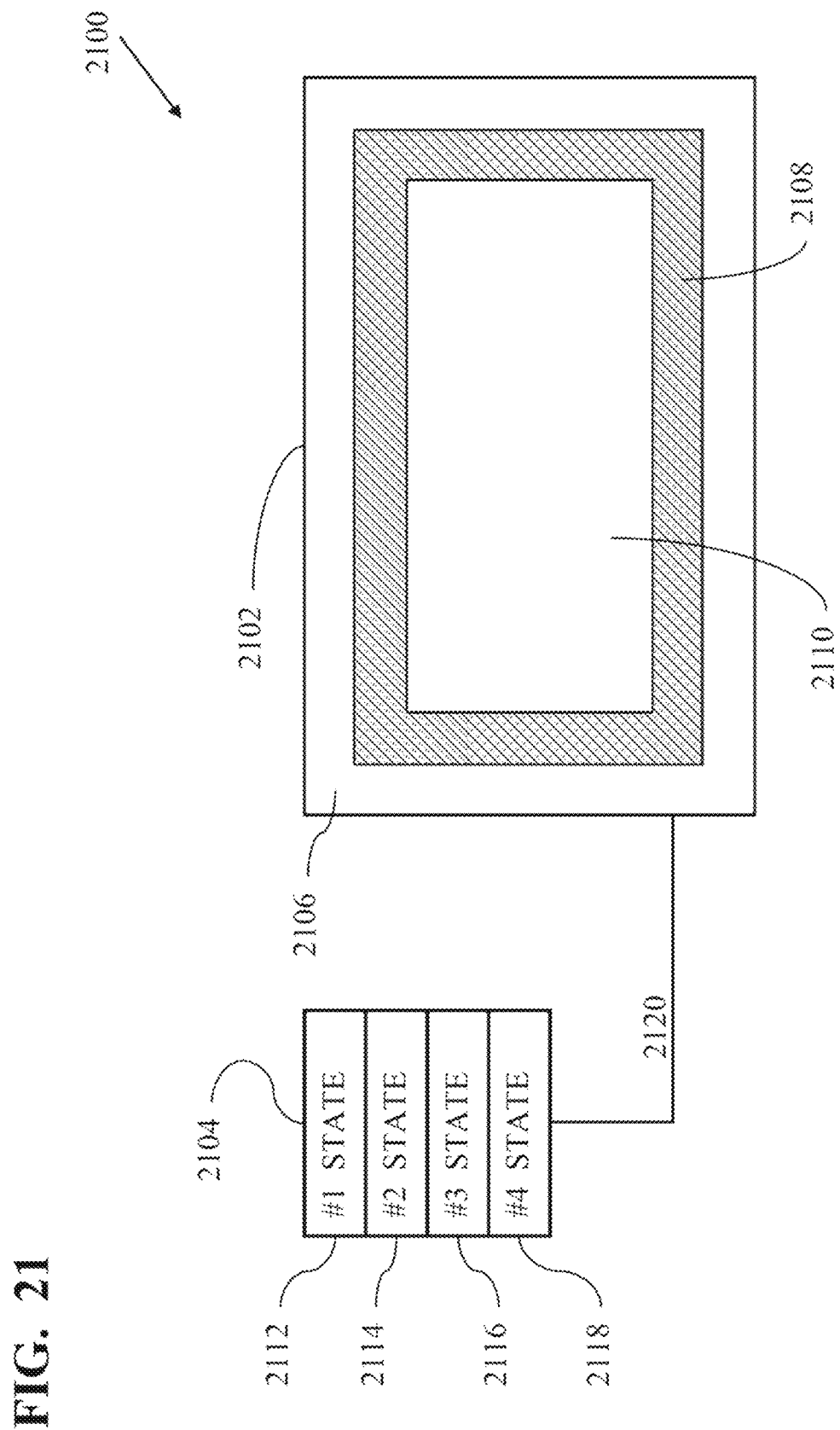
FIG. 21 illustrates a multicolor temperature mirror platform, according to embodiments of the invention.

FIG. 21 illustrates, generally at 2100, a multicolor temperature mirror platform, according to embodiments of the invention. With reference to FIG. 21, a mirror platform 2102 includes a first area 2106/2110 and a second area 2108. The first area 2106/2110 has a first reflectivity which is substantially reflective. Therefore, the first area 2106/2110 performs the function of the mirror for the mirror platform 2102. The second area 2108 has a second reflectivity. The second reflectivity is less than the first reflectivity. The second reflectivity is selected to allow light to pass through the second area 2108 from a back side to a front side of the mirror platform 2102.

In one embodiment, a state selector 2104 contains a general number of states indicated by 2112, 2114, 2116, and 2118, The state selector 2104 is electrically coupled at 2120 with the mirror platform 2102. The state selector 2104 is configured with the mirror platform 2102 to provide different levels of light and different color temperatures of light depending on the selected state. A controller, not shown in FIG. 21 (illustrated in several locations in FIG. 22A below), is used to control a light assembly built into the mirror platform 2102. In one or more embodiments, the controller can be located in different places, such as for example in the state selector 2104, the mirror platform 2102, or separately from the state selector 2104 and the mirror platform 2102.

Figure 22A:
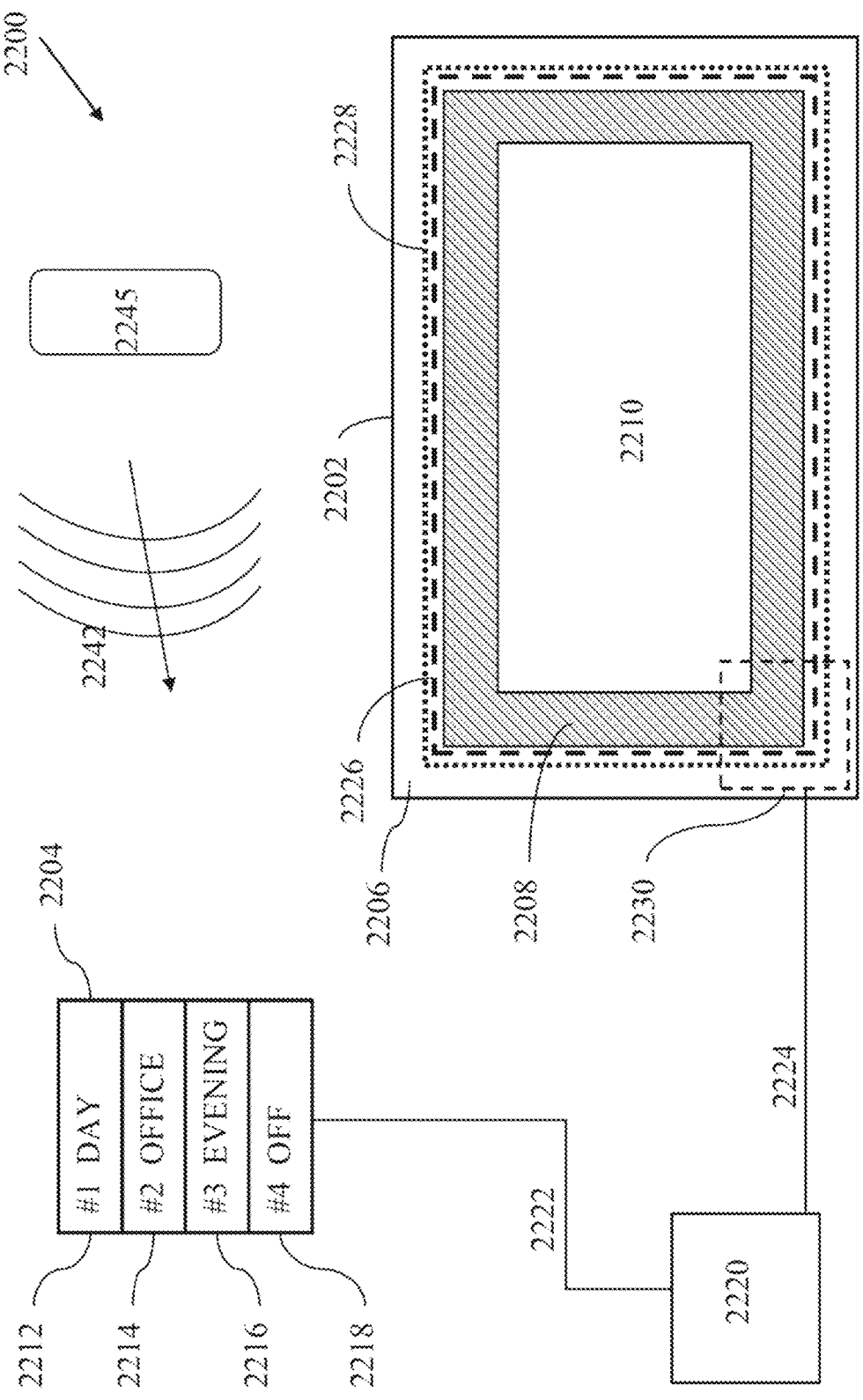
FIG. 22A illustrates a system to produce light at multiple color temperatures, according to embodiments of the invention.

FIG. 22A illustrates, generally at 2200, a system to produce light at multiple color temperatures, according to embodiments of the invention. With reference to FIG. 22A, a mirror platform 2202 includes a first area 2206/2210 and a second area 2208. The first area 2206/2210 has a first reflectivity which is substantially reflective. Therefore, the first area 2206/2210 performs the function of the mirror for the mirror platform 2202. The second area 2208 has a second reflectivity. The second reflectivity is less than the first reflectivity. The second reflectivity is selected to allow light to pass through the second area 2208 from a back side to a front side of the mirror platform 2202.

2276 and 2228 represent two light sources. Light sources 2226 and 2228 are arranged around a perimeter of the second area 2208. Light sources 2226 and 2228 provide a source of backlight which is visible to a user who views the mirror platform 4202 from a front side as shown in FIG. 22A. The light source 2226 (indicated by dashed line type) emits light substantially at a first color temperature and the light source 2228 (indicated by dotted line type) emits light substantially at a second color temperature.

A state selector 2204 contains a general number of states indicated by 2112, 2214, 2216, and 2218. The state selector 2204 is electrically coupled via 2222/2224 with the mirror platform 2202. The state selector 2204 is configured with the mirror platform 2202 to provide different levels of light and different color temperatures of light depending on the selected state. A controller 2220 is used to control a light assembly built into the mirror platform 2202 at 2230 or configured separately from the mirror platform 2202 at 2220 and the controller 2245 is in electrical communication with the state selector at 2204. In one or more embodiments, the controller can be located in different places, such as for example in the state selector 2204, the mirror platform 2202, or separately from the mirror platform 2202.

In some embodiments, the state selector is configured as a push button device for wall mounting or mounting on the mirror platform. In other embodiments, mobile device 2220 is used to send signals 2242 wirelessly to the state selector 2204. The system can be configured to send wireless signals according to wireless protocols such as Bluetooth, ZigBee, etc.

FIG. 22B illustrates, generally at 2250, arrangements of light elements used to produce light at multiple color temperatures, according to embodiments of the invention. With reference to FIG. 22B, one arrangement of light elements utilizes a first strip of light elements 2252 and a second strip of light elements 2256. The first strip of light elements 2252 has a number of light elements arranged at 2254. The light elements 2254 emit light of color temperature indicated by the label "COLOR #1," The second strip of light elements 2256 has a number of light elements arranged at 2258. The light elements 2258 emit light at a color temperature indicated by the label "COLOR #2".

An alternative arrangement of light elements is illustrated at 2260. The light elements in the strip 2260 alternate color temperature, such that a first light element of color temperature COLOR #1 is followed by a light element of color temperature COLOR #2, and then a light element of color temperature COLOR #1, and so on, in an alternating pattern along the light strip.

Light elements of two different color temperatures facilitate the emission of light with either color temperature or a blend between the two color temperatures; in the example, above using COLOR #1 and COLOR #2. In the description that follows, techniques are described that permit a color to be emitted that is in between COLOR #1 and COLOR #2. In some embodiments, more than two separate colors are used for the light source elements. For example, three or more different color temperatures can be used for the light elements. An example of a light strip utilizing light elements at three different color temperatures, i.e., COLOR #1, COLOR #2, and COLOR #3 is illustrated in FIG. 22C below.

Figure 22C:
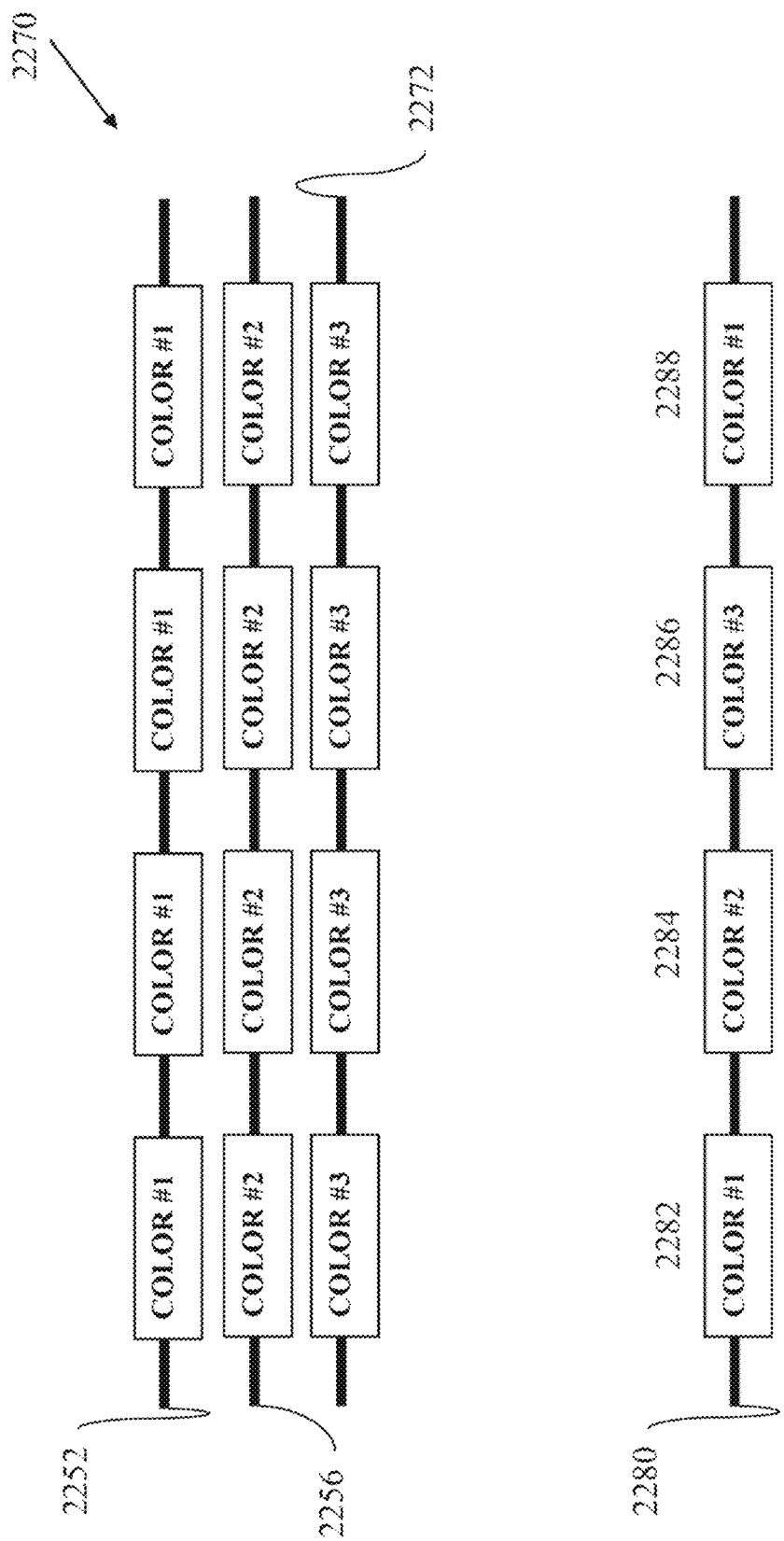
FIG. 22C illustrates another arrangement of light elements used to produce light at multiple color temperatures, according to embodiments of the invention.

FIG. 22C illustrates, generally at 2700, another arrangement of light elements used to produce light at multiple color temperatures, according to embodiments of the invention. With reference to FIG. 22C, a light strip 2272 has a number of light elements that emit light at a color temperature indicated by the label "COLOR #3." The group of three light strips 2252 (COLOR #1), 2256 (COLOR #2), and 2272 (COLOR #3) provide three different color temperatures for the light that each strip emits. Alternatively, a single strip 2280 is constructed with light elements that alternate along the length of the strip. An example is illustrated with 2280, where a light element 2282 having COLOR #1 is followed by a light element 2284 having COLOR #2, followed by a light element 2286 having COLOR #3, followed by a light element 2288 having COLOR #1 and so on, in an alternating fashion along the length of the strip 2280. As described herein, the individual color temperature light elements (using two or more different colors) are used to provide blended light at color temperatures that are at a desired point between the respective values of the color temperatures of the individual light elements.

Figure 23:
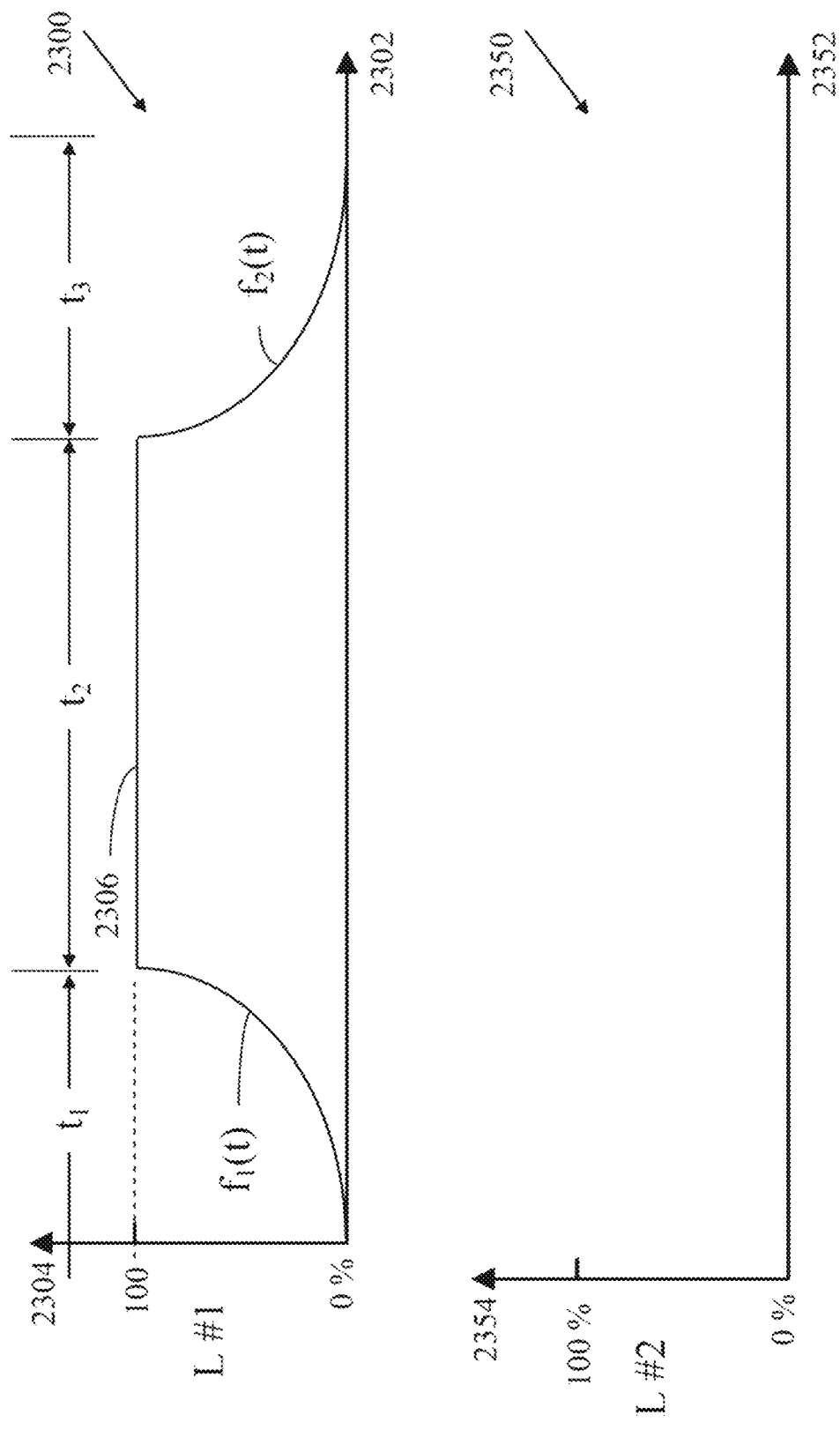
FIG. 23 illustrates a first color temperature illumination level as a function of time, according to embodiments of the invention.

FIG. 23 illustrates a first color temperature illumination level as a function of time, according to embodiments of the invention. With reference to FIG. 23, 2300 illustrates light temperature time profile 2306 for a first light source such as light source 2226 (FIG. 22A) where an axis 2302 indicates time and an axis 2304 represents percentage of full power for the light source. A startup function is indicated by $f_1(t)$ which exists from a time interval $t_1$ followed by a time interval $t_2$ at a power level such as 100% and then a power down function is indicated at $f_2(t)$ which lasts for a time interval $t_3$. Time interval to can last for an indefinite period of time such as When a user turns on the system with a state selector such as 2104 or 2204 or the time interval can be limited by the system.

2350 illustrates light temperature time profile for a second light source such as light source 2228 (FIG. 22A) where an axis 2352 indicates time and an axis 2354 represents percentage of full power for the light source which is zero percent which indicates an off state. As illustrated in FIG. 23, the light emitted by the system from the first light source at 2300 will be emitted at the first color temperature. In various embodiments, a state from one of the state selectors in the preceding figures can correspond with the color temperature of the light emitted in FIG. 23.

In various embodiments, the light sources used with the mirror platforms and systems taught in this description of embodiments are made from a variety of different light elements according to the various embodiments. In some embodiments, light emitting diodes (LEDs) are used. LEDs can be configured as a string of a plurality of LED devices. A string can be a plurality of light sources configured on a circuit board or a mounting board that extends for a distance along a back side of a mirror. In other embodiments, organic light emitting diodes (OLEDs) are used for the light sources. In yet other embodiments, incandescent light sources or fluorescent light sources are used. Light sources can be positioned on a back side of a mirror platform to provide a source of indirect backlight or direct back light with respect to the regions 2108 and 2208 in the preceding figures.

Figure 24:
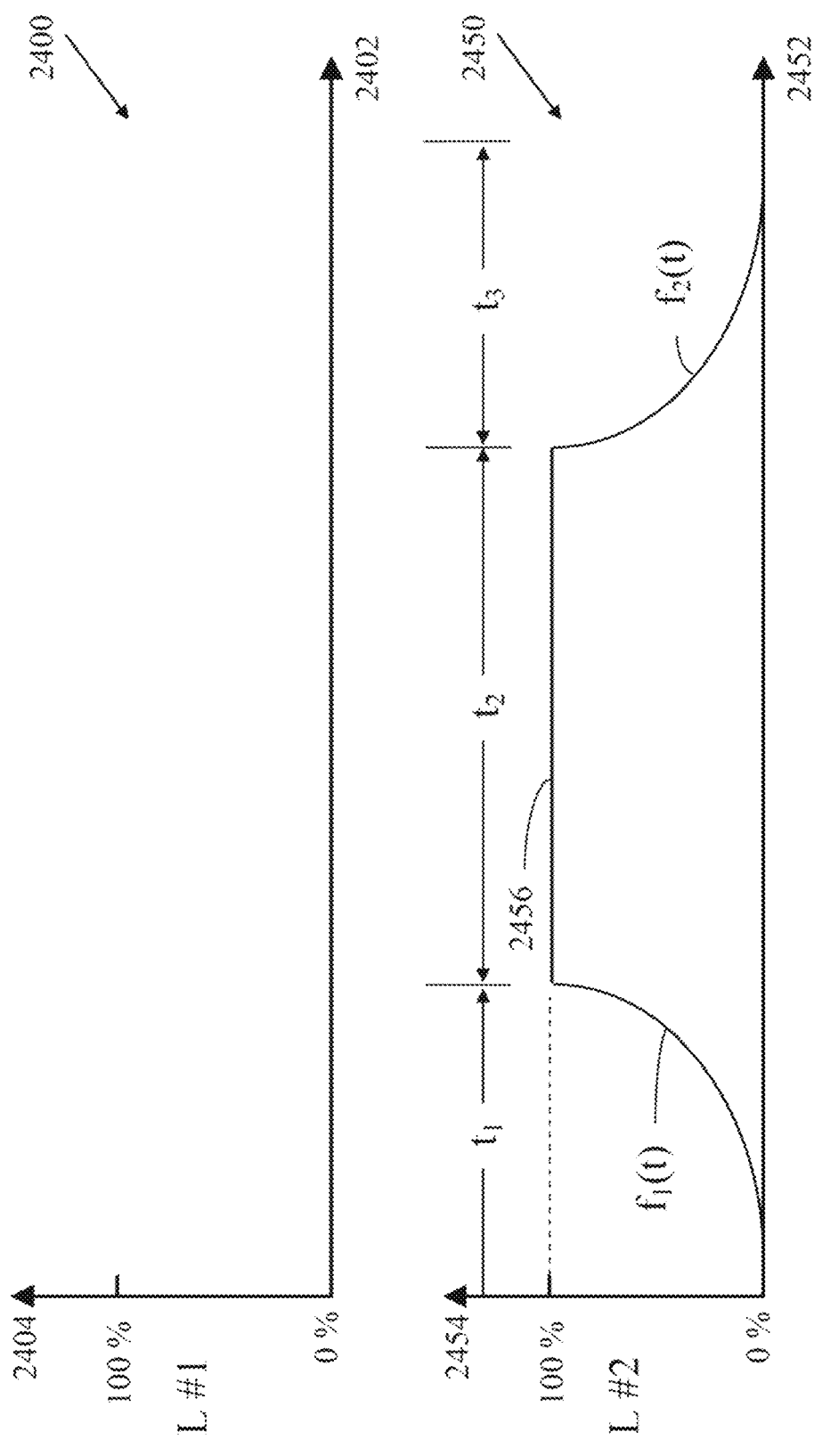
FIG. 24 illustrates a second color temperature illumination level as a function of time, according to embodiments of the invention.

FIG. 24 illustrate a second color temperature illumination level as a function of time, according to embodiments of the invention. With reference to FIG. 24, 2400 illustrates a light temperature time profile fir a first light source such as light source 2226 (FIG. 22A) where an axis 2402 indicates time and an axis 2404 represents percentage of full power for the light source which is zero percent in 2400 which indicates an off state.

2450 illustrates light temperature time profile 2456 for a second light source such as light source 2228 (FIG. 22A)

where an axis 2452 indicates time and an axis 2454 represents percentage of full power for the light source. A startup function is indicated by $f_1(t)$ which exists for a time interval $t_1$ followed by a time interval to at a power level such as 100% and then a power down function is indicated at $f_2(t)$ which lasts for a time interval $t_3$. Time interval $t_2$ can last for an indefinite period of time such as when a user turns on the system with a state selector such as 2104 or 2204 or the time interval can be limited by the system. As illustrated in FIG. 24, the light emitted by the system from the second light source at 2450 will be emitted at the second color temperature. In various embodiments, a state from one of the state selectors in the preceding figures can correspond with the color temperature of the light emitted in FIG. 24.

Figure 25:
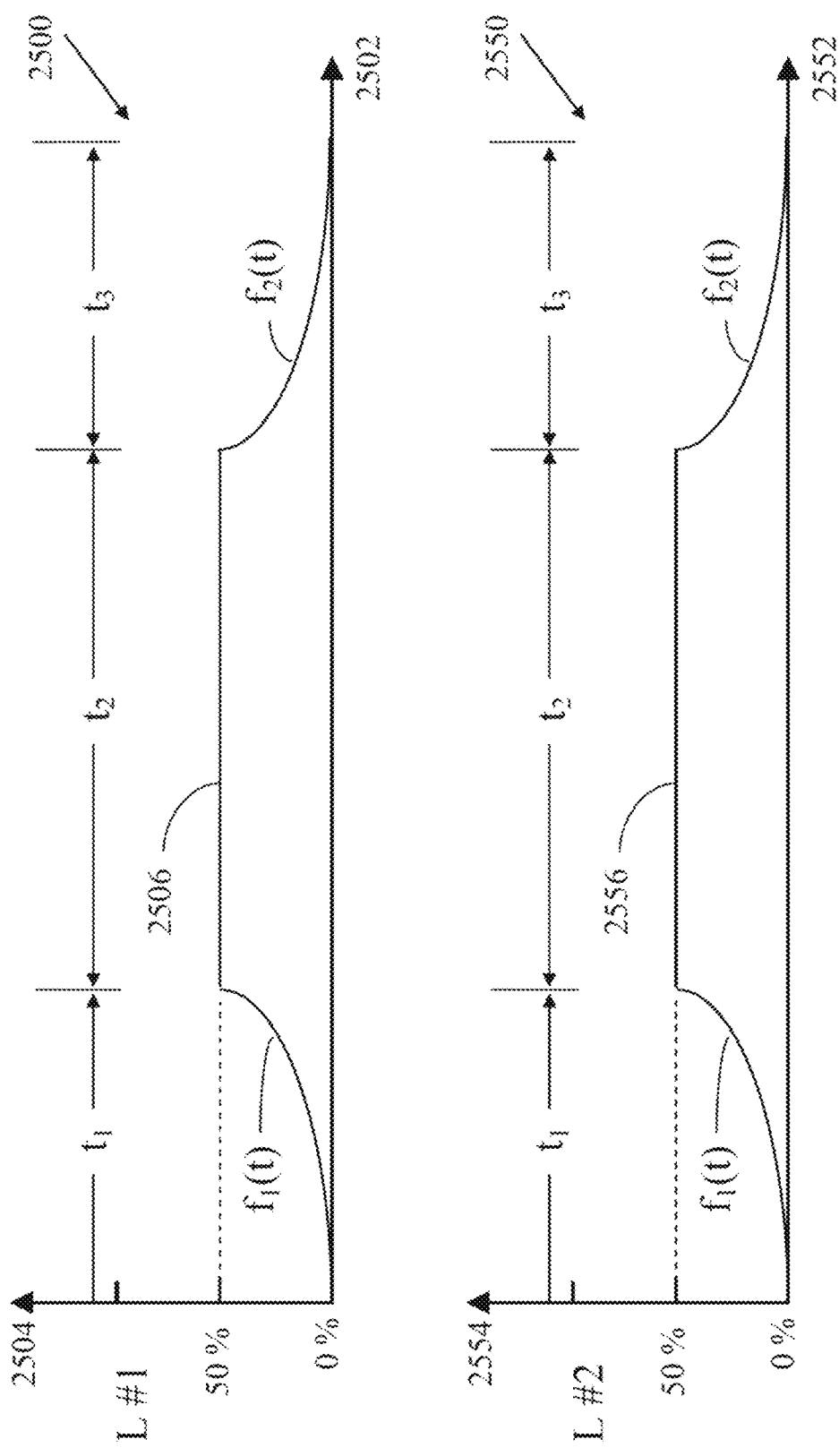
FIG. 25 illustrates a third color temperature illumination level as a function of time, according to embodiments of the invention.

FIG. 25 illustrates a third color temperature illumination level as a function of time, according to embodiments of the invention. With reference to FIG. 25, 2500 illustrates light temperature time profile 2506 for a first light source such as light source 2226 (FIG. 22A) where an axis 2502 indicates time and an axis 2504 represents percentage of full power for the light source, the first light source reaches 50% power as indicated by 2506. A startup function is indicated by $f_1(t)$ which exists for a time interval $t_1$ followed by a time interval $t_2$ at a power level such as 50% and then a power down function is indicated at $f_2(t)$ which lasts for a time interval $t_3$. Time interval $t_2$ can last for an indefinite period of time such as when a user turns on the system with a state selector such as 2104 or 2204 or the time interval can be limited by the system.

2550 illustrates light temperature time profile 2556 for a second light source such as light source 2228 (FIG. 22A) where an axis 2552 indicates time and an axis 2554 represents percentage of full power for the light source, the first light source reaches 50% power as indicated by 2556. A startup function is indicated by $f_1(t)$ which exists for a time interval $t_1$ followed by a time interval $t_2$ at a power level such as 50% and then a power down function is indicated at $f_2(t)$ which lasts for a time interval $t_3$. Time interval $t_2$ can last for an indefinite period of time such as when a user turns on the system with a state selector such as 2104 or 2204 or the time interval can be limited by the system.

In one or more embodiments, the light emitted from the system when in a state configuration such as illustrated in FIG. 25 can correspond to one of the states from the state selectors illustrated in one of the preceding figures. For example, the state illustrated in FIG. 25 can correspond to the "OFFICE" state 2214 in FIG. 22A that is a blend of light from the two light sources.

Figure 26:
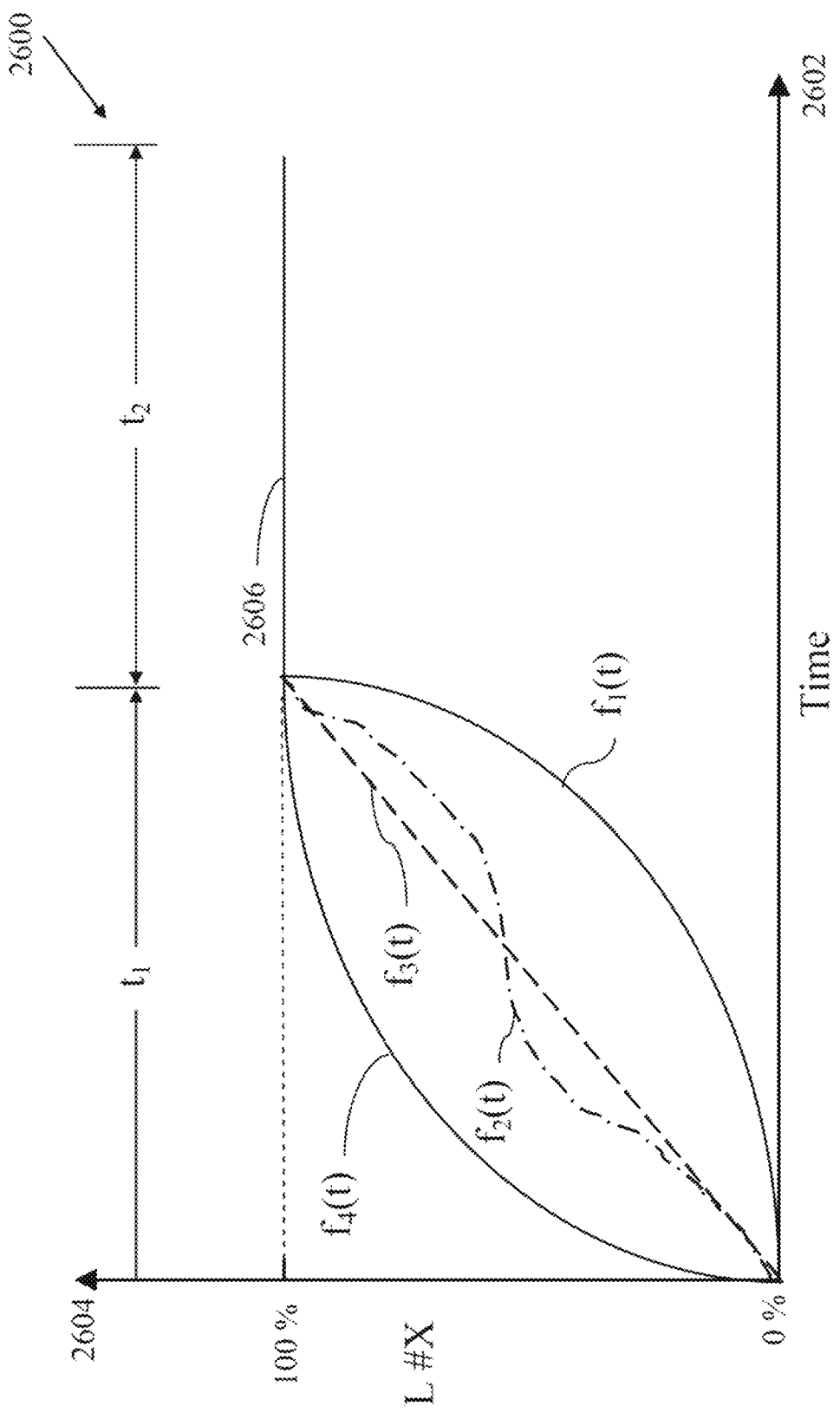
FIG. 26 illustrates various functions of time, according to embodiments of the invention.

FIG. 26 illustrates, generally at 2600, various functions of time, according to embodiments of the invention. With reference to FIG. 26, intensity 2604 of a light source L #X is illustrated as a function of time 2602. Different power up functions of time are possible within different configurations of the system as illustrated by $f_1(t)$, $f_2(t)$, $f_3(t)$, $f_4(t)$, etc. 2606 represents a full power state for the light source L#X. The startup function lasts for time interval $t_1$ and then reaches a constant power level as shown for $t_1$. A power level less than 100% can be used for the operating power level; a 100% power level is used merely for illustration. Transitioning a light system through a function of time reduces stress on the living beings such as humans who are in the presence of the light emitted by the system. Such a transition provides a closer simulation to the natural environment which the living beings are adapted to.

In some embodiments, the system can be powered dower down by transitioning from a constant power level to an OFF state by transients similar to the power up transient only the system transitions in reverse order during power down.

Figure 27:
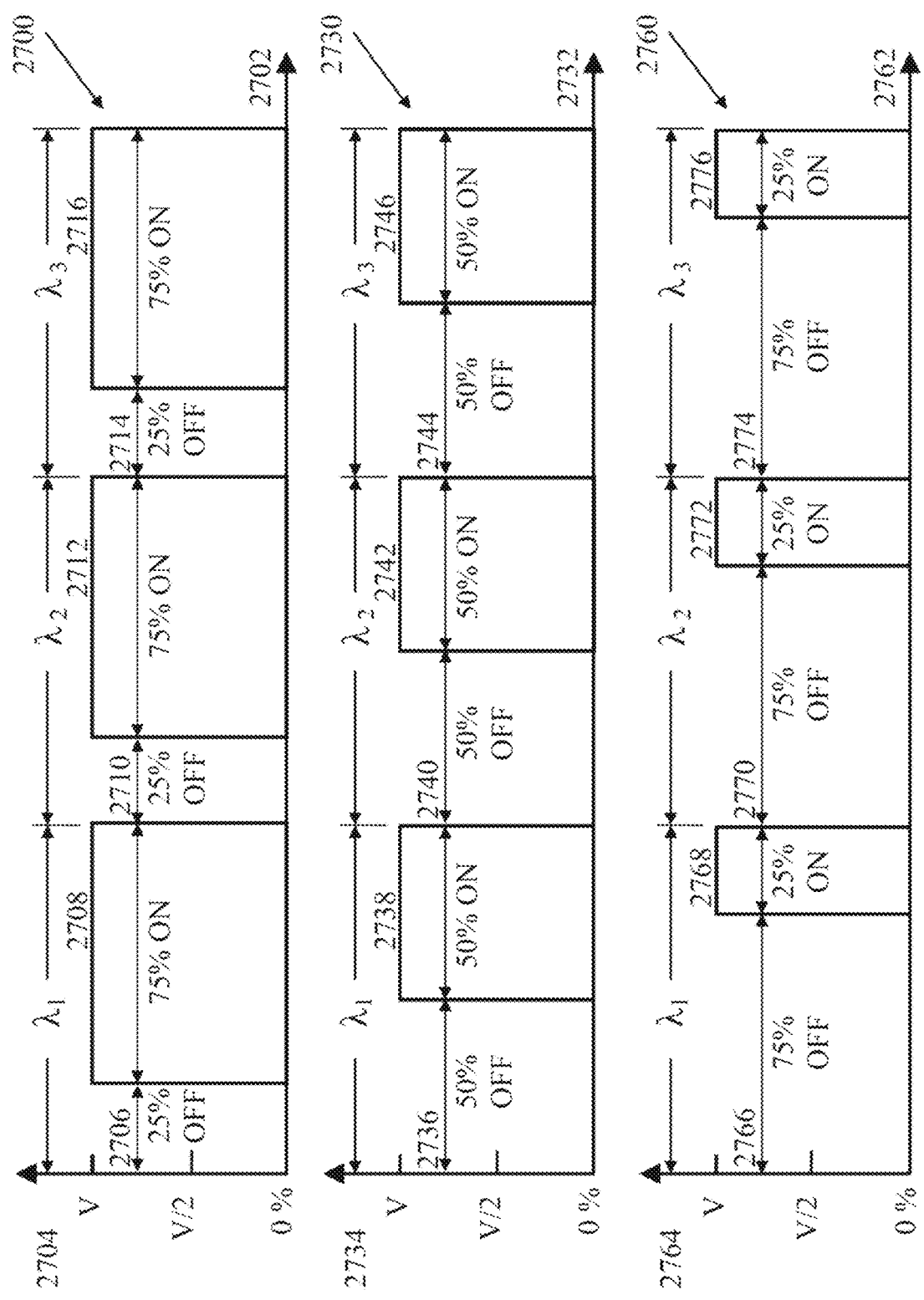
FIG. 27 illustrates pulse width modulation, according to embodiments of the invention.

FIG. 27 illustrates pulse width modulation (PWM), according to embodiments of the invention. At 2700, a 75% "ON" signal is sent to a first light source. The 75% ON signal turns the light source ON for 75% of a cycle period or wavelength as indicated by $\lambda_1$ with a 25% ON time during the cycle period. In one or more embodiments, during PWM the light source is turned ON to full power in order to achieve steady state with respect to its color temperature. The perceived intensity of the light source varies depending on the ratio of ON time to OFF time At 2730, a 50% ON signal is sent to a first light source. The 50% ON signal turns the light source ON for 50% of a cycle period or wavelength as indicated by with a 50% ON time during the cycle period. In one or more embodiments, during PWM the light source is turned ON to full power in order to achieve steady state with respect to its color temperature. The perceived intensity of the light source varies depending on the ratio of ON time to OFF time.

At 2760, a 25% ON signal is sent to a first light source. The 25% ON signal turns the light source ON for 25% of a cycle period or wavelength as indicated by $\lambda_1$ with the light source OFF for 75% of time during the cycle period. In one or more embodiments, during PWM the light source is turned ON to full power in order to achieve steady state with respect to its color temperature. The perceived intensity of the light source varies depending on the ratio of ON time to OFF time.

Thus, in one or more embodiments, an intensity of a light source is varied through PWM. In various embodiments, the PWM techniques described herein are applied to both light sources. In some embodiments each light source is modulated differently. For example, in one non-limiting embodiment, used merely for illustration one at 25% ON 75% OFF and the other at 50% ON 50% OFF. The percentage ON time for a light source is a variable that is adjusted by the system according to control logic used to provide various lighting functionality for a user.

Figure 28:
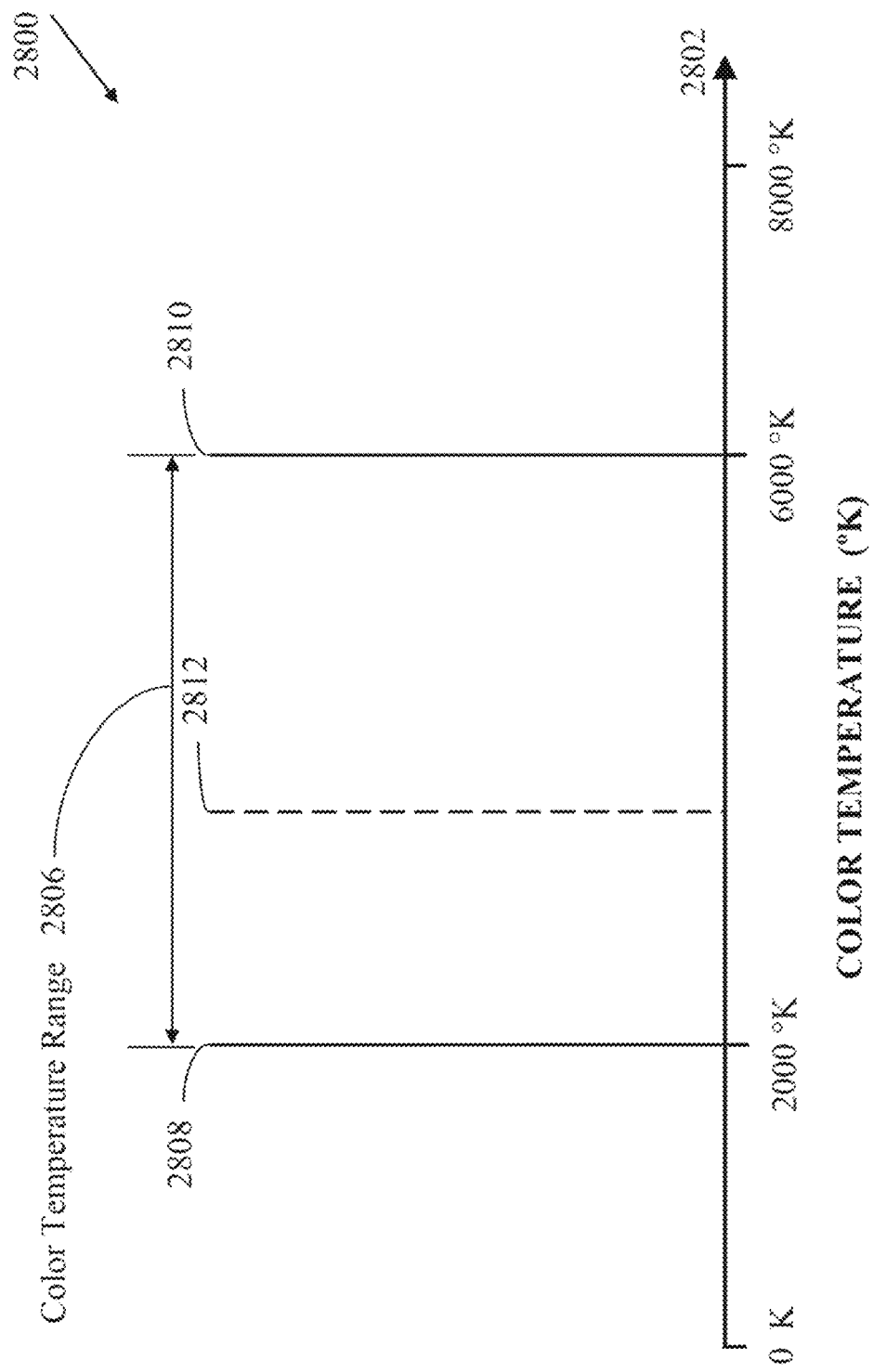
FIG. 28 illustrates blending two light sources of different color temperature according to embodiments of the invention.

FIG. 28 illustrates, generally at 2800, blending two light sources of different color temperature, according to embodiments of the invention. With respect to FIG. 28, an X axis at 2802 illustrates a color temperature spectrum ranging from 0 degrees Kelvin to 8000 degrees Kelvin. In other embodiments, the color temperature range will be different and a range of 0 to 8000 degrees Kelvin is given merely for illustration and does not limit embodiments of the invention. A first light source has a color temperature as indicated at 2808 that corresponds with 2000 degrees Kelvin. A second light source 2810 has a color temperature of 6500 degrees Kelvin. Following the teachings presented herein, in the previous figures two light sources are operated to provide a third color temperature which is different from either of the color temperature of the first light source or the color temperature of the second Light source. A color temperature of 2812 indicates in one embodiment, a blended color temperature for a light source. A blended color temperature such as 2812 can be placed in the color temperature range 2806 by using PWM to adjust one or more ON time(s) for the light sources. In other embodiments, light output intensity is adjusted with means other than PWM in order to achieve a blended light color.

In various embodiments, color temperatures 2808, 2810, and 2812 correspond to the states shown in the state selectors in the preceding figures, e.g., 2104 in FIG. 21 or 2204 in FIG. 22A. While two color temperature light elements 2808 and 2810 are illustrated in FIG. 28 it will be recognized that more than two color temperature light elements can be used to achieve blending of a color temperature 2812, as described above in conjunction with FIG. 22C.

Figure 29:
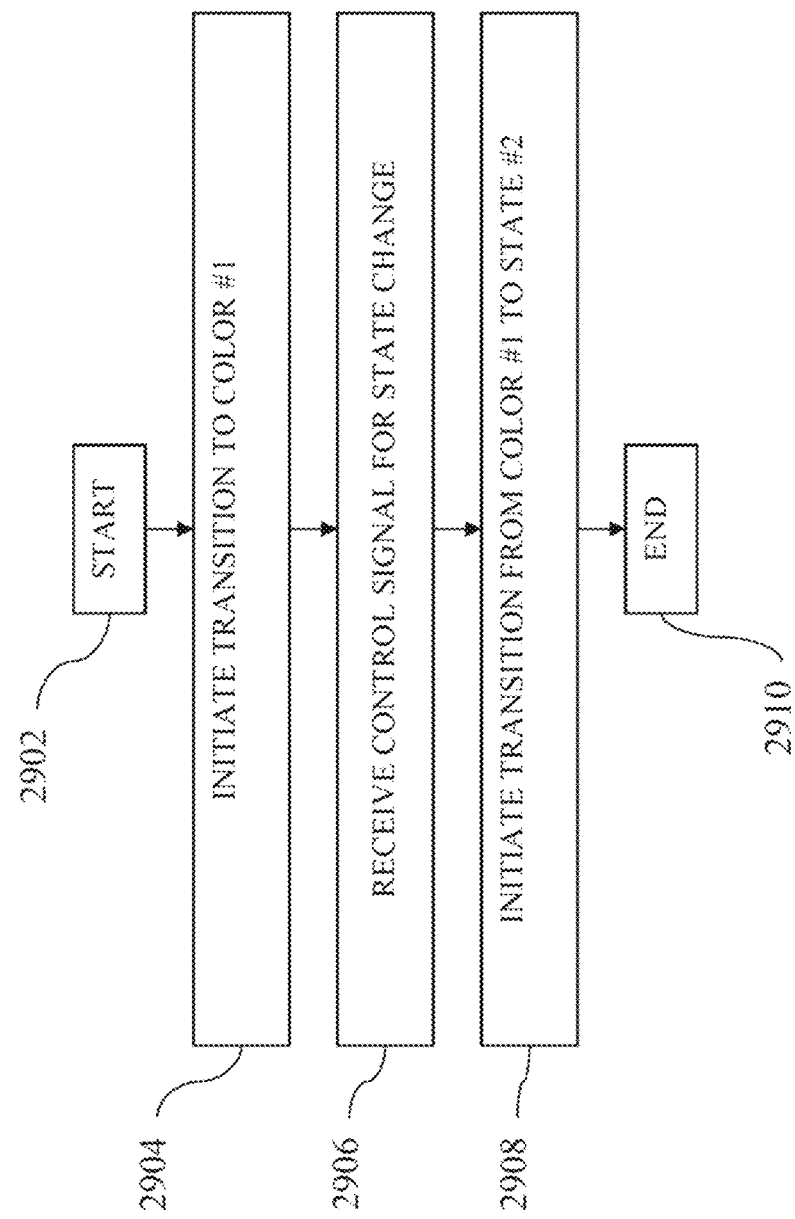
FIG. 29 illustrates a method to produce low impact color temperature transition, according to embodiments of the invention.

FIG. 29 illustrates, generally at 2900, a method to produce low impact color temperature transition, according to embodiments of the invention. With reference to FIG. 29, a process starts at a block 2902. At a block 2904 a transition to a first color temperature is initiated. At a block 2906 a control signal is generated responsive to the color temperature corresponding to the block 2904. At a block 2908, a transition is initiated from a color temperature one to a new state, e.g. state 2. Transitioning to a color temperature includes in various embodiments, changing the control signals sent to one or two of the light sources. Transitioning to a color temperature can include a startup transient or power down transient. Transitioning to a color temperature for one or two of the light sources can include changing the pulse width modulation (PWM) signals as well as a power ON OF power OFF state for a given light source.

Figure 30:
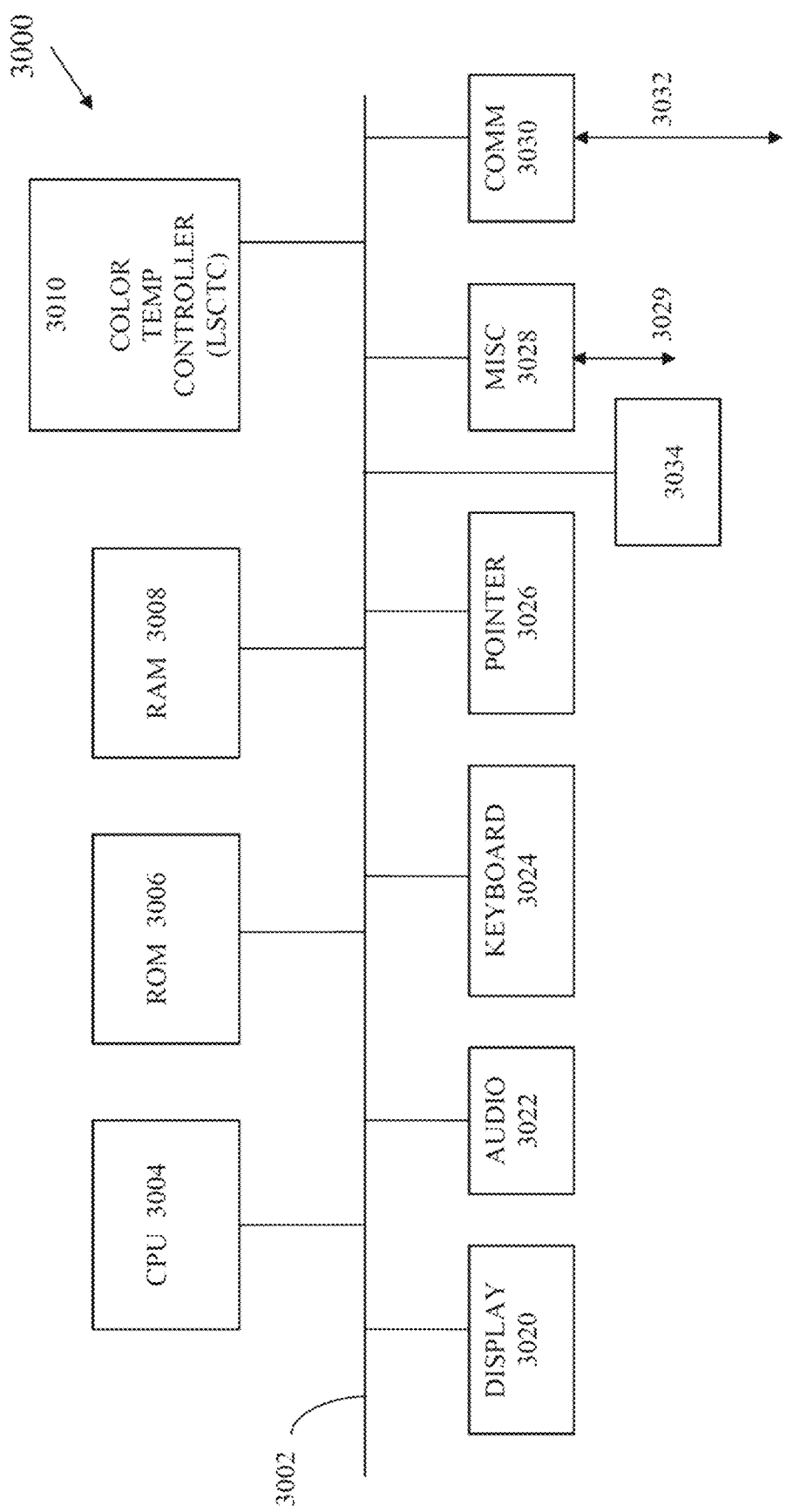
FIG. 30 illustrates a block diagram of a system for controlling a temperature of a light source, according to embodiments of the invention.

FIG. 30 illustrates, generally at 3000, a block diagram of a system for controlling a temperature of a light source, according to embodiments of the invention. With reference to FIG. 30, as used in this description of embodiments, a system can be based on a device such as a computer, in which embodiments of the invention may be used. The block diagram is a high level conceptual representation and may be implemented in a variety of ways and by various architectures. Bus system 3002 interconnects a Central Processing Unit (CPU) 3004 (alternatively referred to herein as a processor), Read Only Memory (ROM) 3006, Random Access Memory (RAM) 3008, storage 3010, display 3020, audio 3022, keyboard 3024, pointer 3026, miscellaneous input/output (I/O) devices 3028, and communications 3030. RAM 3008 can also represent dynamic random access memory (DRAM). It is understood that memory (not shown) can be included with the CPU block 3004. The bus system 3002 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), etc. The CPU 3004 may be a single, multiple, or even a distributed computing resource. Storage 3010 may be Compact Disc (CD), Digital Versatile Disk (DVD), hard disks (HD), solid state disk (SSD), optical disks, tape, flash, memory sticks, video recorders, a redundant array of independent disks (RAID), etc. A light source color temperature control (LSCTC) 3010 can be configured with its own processing unit such as a digital signal processor (DSP) or other processing unit as described above in conjunction with the preceding figures, such as for example FIG. 21 or FIG. 22A. Note that depending upon the actual implementation of a computer system, the computer system may include some, all, more, or a rearrangement of components in the block diagram. Thus, many variations on the system of FIG. 30 are possible.

Figure 31:
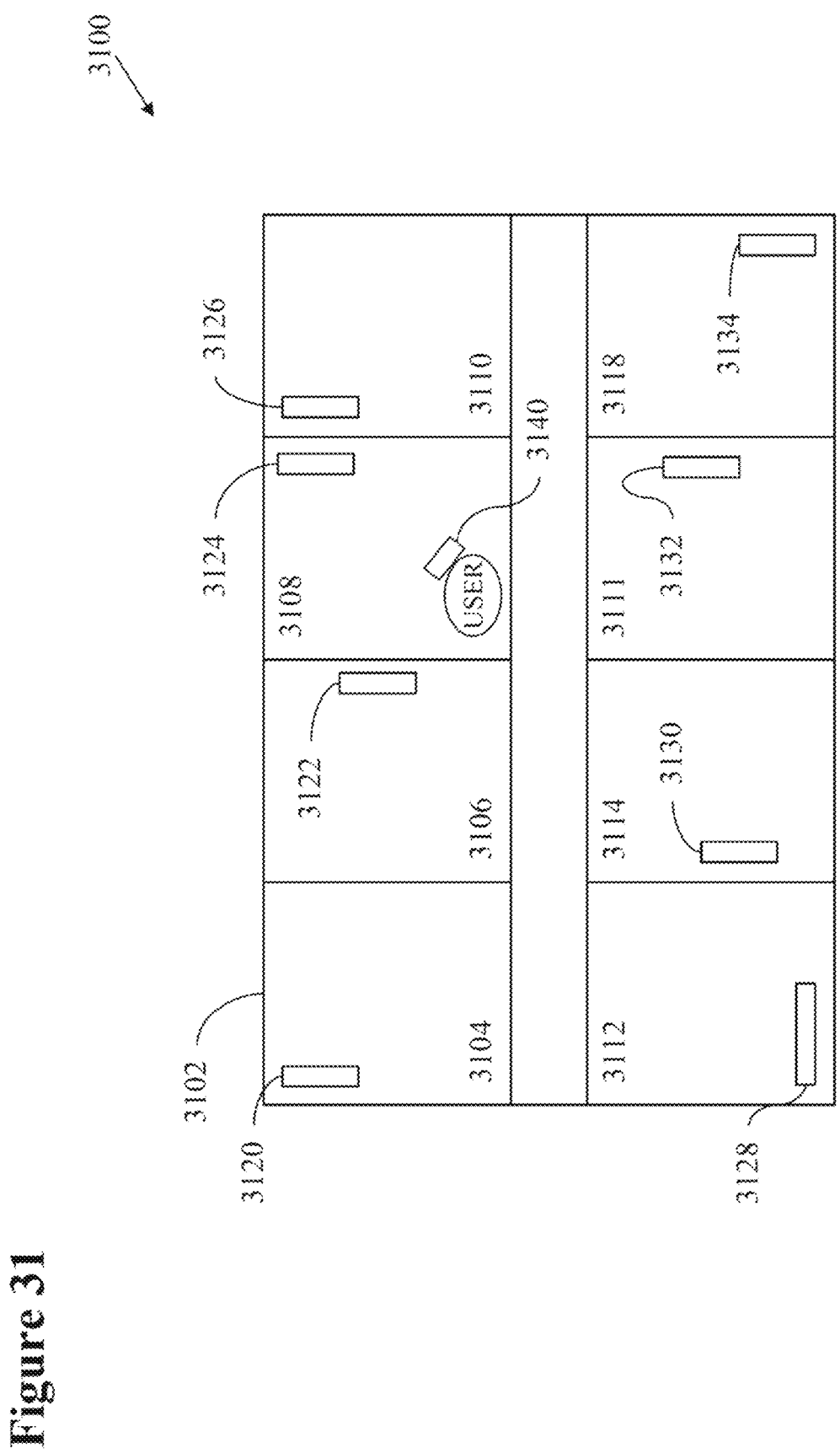
FIG. 31 illustrates a hospitality environment, according to embodiments of the invention.

FIG. 31 illustrates, generally at 3100, a hospitality environment, according to embodiments of the invention. With reference to FIG. 31, 3102 represents a hospitality area for example in various embodiments, a hotel, a motel, a conference center, a marina, a convention center, etc. Within the hospitality area 3102 there is a plurality of rooms or sub areas such as 3104, 3106, 3108, 3110, 3112, 3114, 3116, through 3118. Within one or more of the rooms or sub areas a device is located therein such as a device 3120, 3122, 3124,1176, 3128, 3130, 3132, and 3134. In various embodiments, the plurality of device 3120 through 3134 are configured each with a light source color temperature control (LSCTC), which allows for the color temperature of the light emitted from the respective device to be controlled remotely or locally within the hospitality environment. In various embodiments, the LSCTCs are in communication with a control system (described more fully below in conjunction with FIG. 32) that is used to adjust the color temperature of light emitted from the plurality of devices according to a predefined pattern or program. Thus, a user 3140 can go from room to room within the hospitality area and experience the same color temperature of light emitted from any of the devices within the hospitality area 3102. In various embodiments, the system provides an override function that permits local adjustment of the color temperature for light emitted from a given device. In various embodiments, the devices 3120, 3122 3124, 3126, 3128, 3130, 3132, and 3134 can be mirrors, or the devices can be a mixture of devices described above, such as but not limited to, mirrors, lights, displays, etc.

Figure 32:
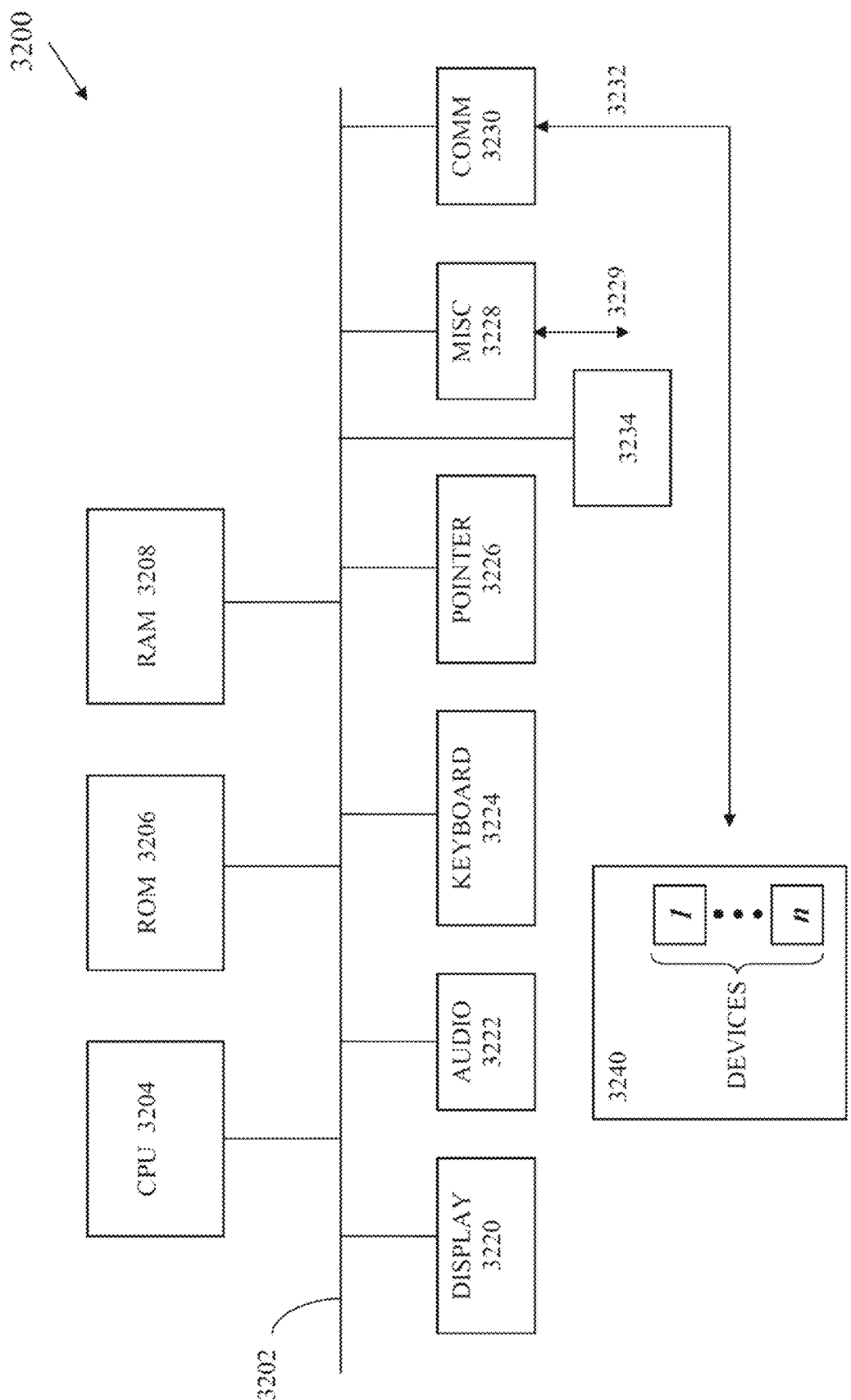
FIG. 32 illustrates a control system for use in a hospitality environment, according to embodiments of the invention.

FIG. 32 illustrates, generally at 3200, a control system for use in a hospitality environment, according to embodiments of the invention. With reference to FIG. 32, as used in this description of embodiments, control system can be a device such as a computer, smart phone, tablet computer, handheld infrared remote control, etc. in which embodiments of the invention may be used. The block diagram is a high level conceptual representation and may be implemented in a variety of ways and by various architectures. Bus system 3202 interconnects a Central Processing Unit (CPU) 3204 (alternatively referred to herein as a processor), Read Only Memory (ROM) 3206, Random Access Memory (RAM) 3208, storage 3210, display 3220, audio, 3222, keyboard 3224, pointer 3226, miscellaneous input/output (I/O) devices 3228, and communications 3230. RAM 3208 can also represent dynamic random access memory (DRAM). It is understood that memory (not shown) can be included with the CPU block 3204. The bus system 3202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), etc. The CPU 3204 may be a single, multiple, or even a distributed computing resource. Storage 3210 may be Compact Disc (CD), Digital Versatile Disk (DVD), hard disks (HD), solid state disk (SSD), optical disks, tape, flash, memory sticks, video recorders, a redundant array of independent disks (RAID), etc. Note that depending upon the actual implementation of a control system, the control system may include some, all, more, or a rearrangement of components in the block diagram. In some embodiments, a user can use a control system 3200 incorporated into a handheld device equipped with wireless infrared communication functionality (or other wireless communication methodology), generally indicated at 3232/3230, to adjust the color temperature of light emitted from a device, such as a mirror platform (one or more of 3240). Thus many variations on the control system of FIG. 32 are possible.

Connection with a network is obtained with 3232 via 3230 either wirelessly or through a wired connection, as is recognized by those of skill in the art, which enables the control system 3200 to communicate with a general number of n devices (which in some embodiments are mirror platforms) at 3240 which can be in remote locations throughout for example a hospitality area 3102 described above in conjunction with FIGS. 31. 3232 and 3230 flexibly represent communication elements in various implementations, and can represent various forms of telemetry, GPRS, Ethernet, Wide Area Network (WAN), Local Area Network (LAN), Internet connection, WiFi, WiMax, ZigBee, Infrared, etc. and combinations thereof. In various embodiments a pointing device such as a stylus is used in conjunction with a touch screen, for example, via 3229 and 3228.

Figure 33:
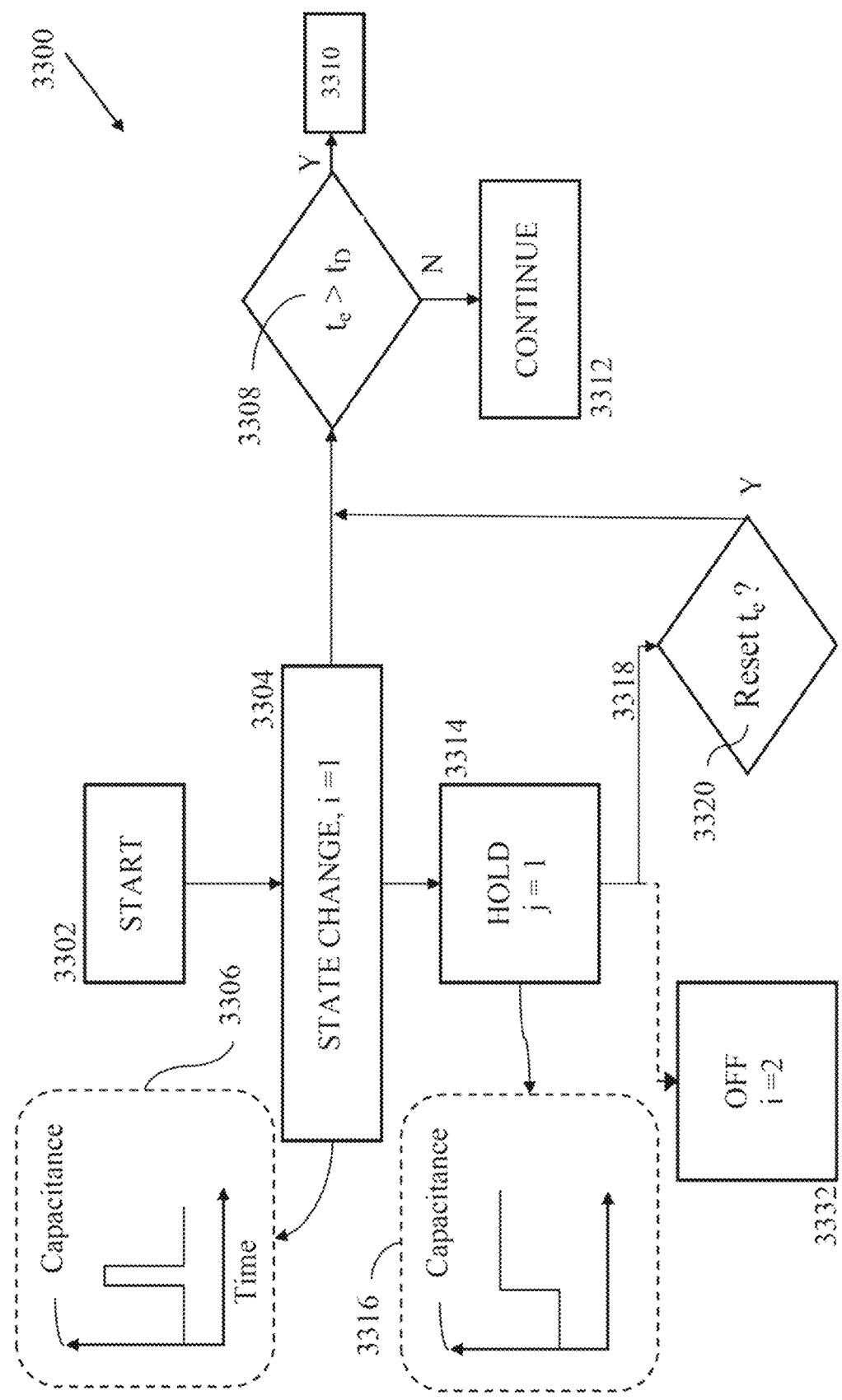
FIG. 33 illustrates a one-touch control system adapted to controlling two parameters, according to embodiments of the invention.

FIG. 33 illustrates, generally at 3330, a one-touch control system adapted to controlling two parameters, according to embodiments of the invention. With reference to FIG. 33, two parameters are controlled by utilizing a capacitive sensing and control system, such as described above in conjunction with the preceding figures and a predefined logical interaction pattern of a user. The logical interaction pattern of the user contemplates two different interactions; a first interaction is a quick motion where the user "taps" a surface of a device or executes a quick gesture relative to a surface of a device. A second interaction pattern, in this case a slow user interaction, is a "hold" where the user maintains contact with a surface or maintains position at a constant stand-off distance from a surface. The discussion that follows utilizes a "tap" and a "hold" as the two user interactions. However, in other embodiments; gestures are used for the quick and slow user interaction patterns.

A process starts at a block 3302. The block 3302 can be a power up from an OFF state for the system. A block 3304 illustrates a system state change (i=1) that occurs when a user executes a first interaction and "taps" a surface of a device. As described in conjunction with the figures above, such as FIG. 6 and FIG. 7, a "tap" produces a state change for the capacitance sensing system such that during a short interval in time, sensor capacitance $C_s$ is increased and is measured by the capacitance sensing system. Such a change in sensor capacitance $C_s$ is illustrated qualitatively in a graph at 3306. The change in sensor capacitance $C_s$ from the "tap" is used together with associated logic to control a first parameter of a control. system for a device. The first parameter can be a color temperature of light radiated from a device.

In a user interaction subsequent to the first interaction, the user touches the surface of the device and "holds" the body part, such as a finger, in contact with the surface of the device at a block 3314, j=1. Touching the surface of the device causes a state change for the capacitive sensing system such that the sensor capacitance $C_s$ is elevated and remains elevated as long as the user maintains contact with the surface. Such a change in sensor capacitance $C_s$ is illustrated qualitatively in a graph at 3316. The change in sensor capacitance $C_s$ from the "hold" is used together with associated logic to control a second parameter of the control system for the device. In various embodiments, system logic is configured to associate "hold" time with a second parameter, thereby either increasing a value associated with the second parameter or decreasing the value associated with the second parameter depending on a value of index j. The second parameter can be an intensity level of light radiated from the device. In various embodiments, in operation, the longer the user "holds" the greater becomes the intensity of light radiated from the device.

In various embodiments, system logic is configured to, track time that elapses ($t_e$) subsequent to execution of the first system state change associated with the block 3304. Elapsed time is compared with a preset time threshold $t_d$ at 3308. If elapsed time $t_e$ exceeds the time threshold $t_d$ then control transfers to a block 3310 where a value of one of the two parameters can be adjusted, for example, in one embodiment, an intensity of light radiated from the device can be dimmed. If the elapsed time $1_e$ has not exceeded the time threshold $t_d$ then control transfers to a block 3312 and the system maintains its current state without change to the two parameters.

In some embodiments, depending on the result of the block 3314 in response to the user interaction, time $t_e$ can be reset. For example, in one embodiment, dimming logic is configured to automatically dim the intensity of the radiated light to 25% of a maximum value when the light has been left on for one hour at an intensity value above 25% of the maximum value.

in one or more embodiments, an optional power OFF function is provided at a block 3322. When a user "taps" the surface of the device a second time, j=2, the system executes a power OFF function and shuts down.

Figure 34:
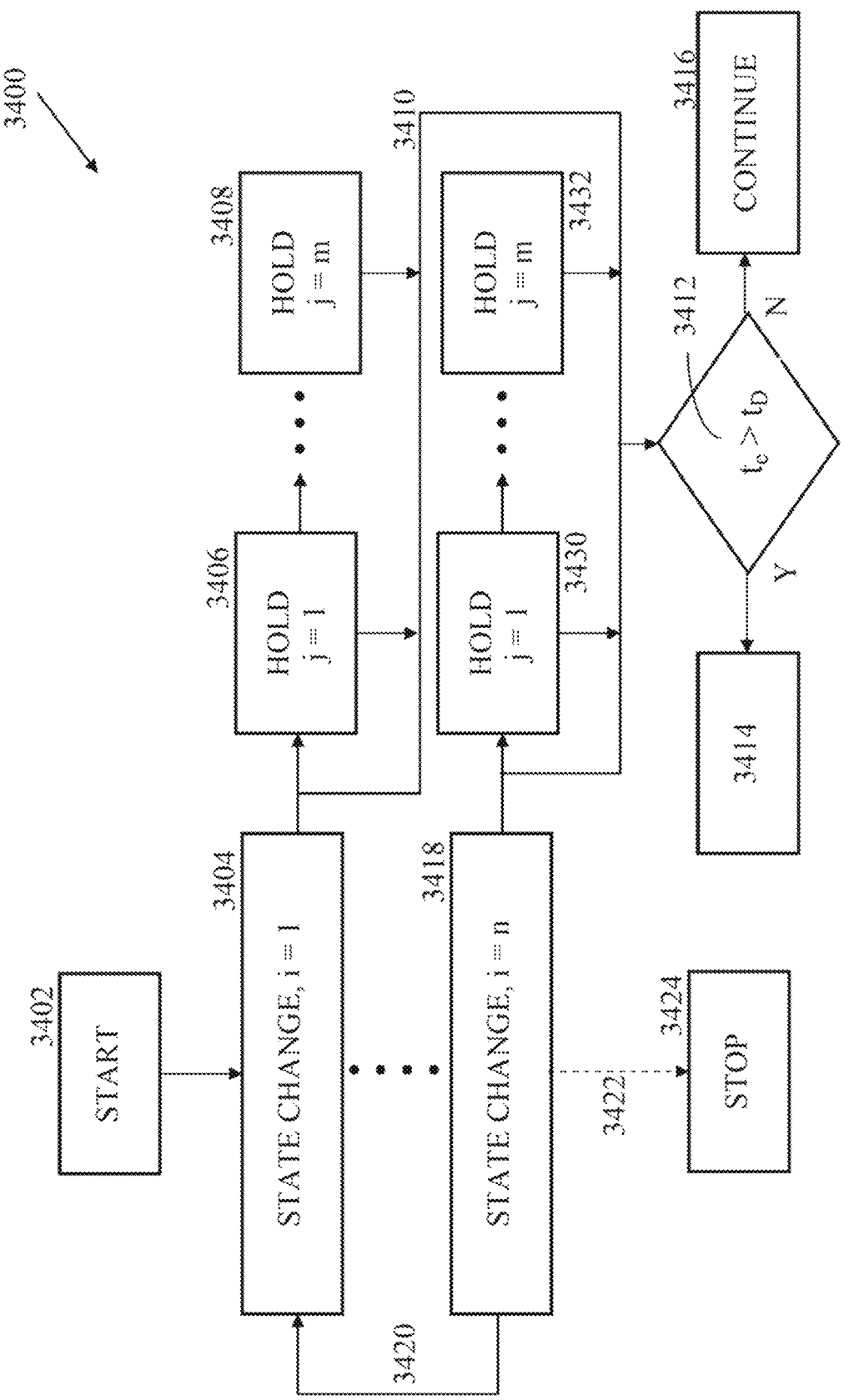
FIG. 34 illustrates a one-touch control system adapted to controlling a plurality of values for each of the two parameters from FIG. 33, according to embodiments of the invention.

FIG. 34 illustrates, generally at 3400, a one-touch control system adapted to controlling a plurality of values for each of the two parameters from FIG. 33, according to embodiments of the invention. With reference to FIG. 34, a process starts at a block 3402. At a block 3404 a user "taps" a surface of a device and executes a first state change for the system thereby establishing a value for a first parameter at i=1.

Subsequent to the first user interaction, at the block 3404, if the user touches the surface of the device and executes a "hold" at 3406 a value for a second parameter is established based on the duration of the "hold" at the block 3406. If the user releases the "hold" associated with the block 3406 and then executes another "hold," j=2, another value for the second parameter is established based on the duration of the "hold" established during j=2. A general number of "m" such subsequent "holds" are possible and are indicated by a block 3408 at j=m. The maximum value of m (if any) and the values established for the second parameter based on a value of j will depending on the configuration of the logic associated with a given system.

Elapsed time $t_e$ is compared with a time threshold $t_d$ at 3412 with input 3410 from block. 3404 and any of blocks 3406 through 3408 and 3430 through 3432, if $t_e$ does not exceed $t_d$, then the values established for the first and second parameters remain unchanged. If $t_e$ is greater than $t_d$, then one or more values previously established for the parameter(s) is adjusted at a bock 3414. In one or more embodiments, a dimming function described above in conjunction with FIG. 33 is performed at the block 3414.

In various embodiments, systems are configured to accommodate a general number of n "taps," where the $n^{th}$ "tap" is illustrated at a block 3418; thereby establishing n different values for the first parameter. When the n+1 tap is issued by the user, control cycles back to the block 3404. In some embodiments, when the n+1 tap is issued by the user, an OFF state is executed via 3422 to 3424.

In various embodiments, the system architecture illustrated in FIG. 34 is applied to control a color temperature and intensity of light radiated from a device with i=4 states that establish 4 different values for a first parameter. The first parameter is used to set a color temperature for the light. A value for a second parameter is established based on an index j (blocks 3406 through 3408) and the value of the second parameter that is established during the jth "hold" interaction with the user. In one or more embodiments, system logic associates a jth "hold" interaction with a light intensity value. In various embodiments, pulse width modulation (PWM) techniques, described above, are used to set a color temperature and intensity for the light radiated from a device. In other embodiments, light output is adjusted by means other than PWM in order to set a color temperature and intensity for the light radiated from a device.

Figure 35:
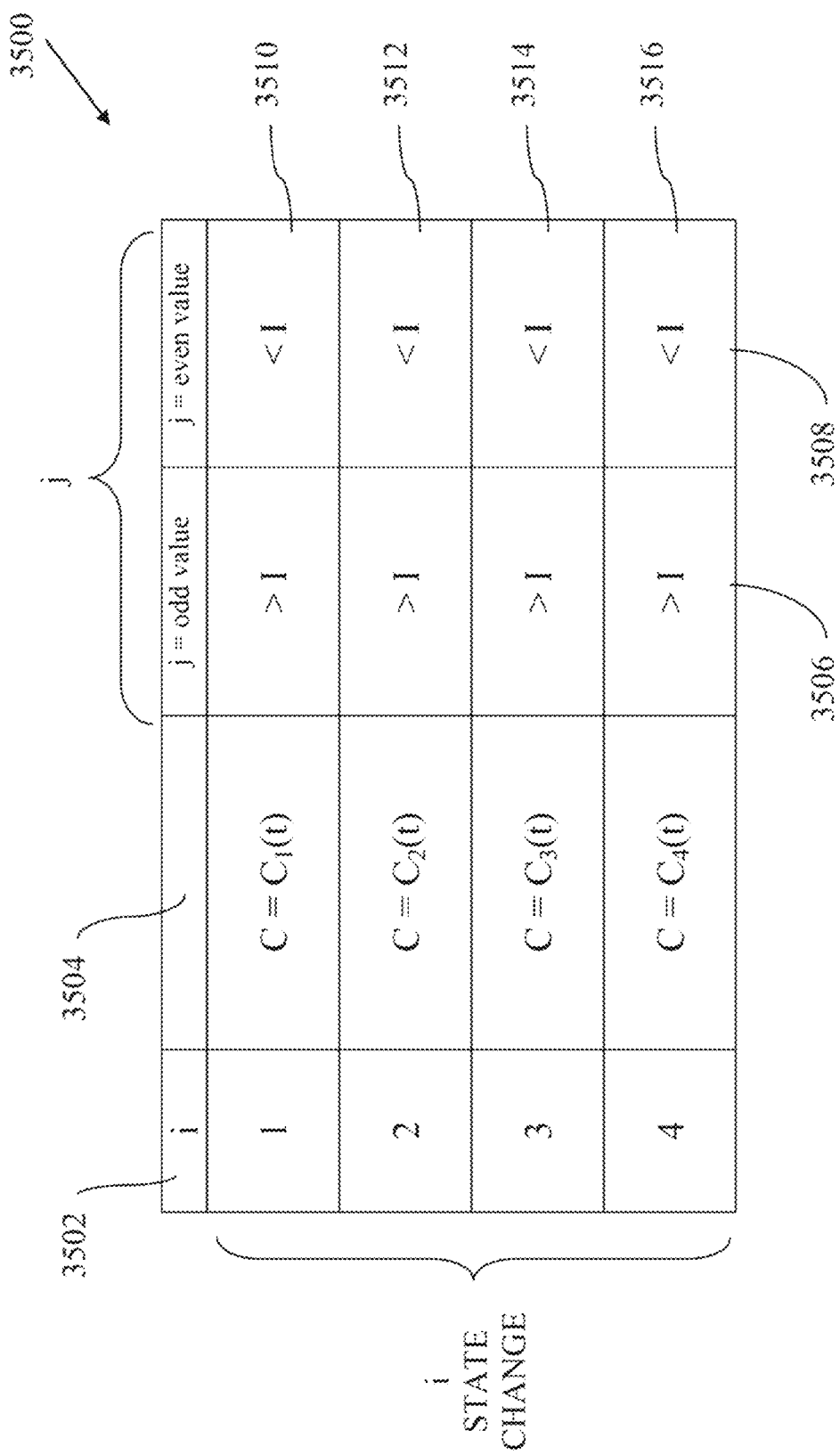
FIG. 35 illustrates a one-touch control system utilizing a first set of light color temperature functions and light intensity values, according to embodiments of the invention.

FIG. 35 illustrates, generally at 3500, a one-touch control system utilizing a first set of light color temperature functions and light intensity values, according to embodiments of the invention. With reference to FIG. 35, the table of values is configured with i=4 rows, 3510, 3512, 3514, and 3516 corresponding to four states, i=1, i=2, i=3 i=4 respectively. At each value of (column 3502) a corresponding column 3504 contains a color temperature function used by the system to radiate light from the device. For example, at i=1 (row 3510) light "C" is radiated with color temperature $C_1(t)$, as given by the equation $C=C_1(t)$. Column 3506 contains the function that is applied to the intensity of the light by the logic implemented in the control system. In one embodiment, as illustrated in column 3506, system logic is configured to increase ">" light intensity in response to a "hold." Column 3506 is used for the odd values of j. In accordance with the design philosophy of this embodiment, a column 3508 contains the function that is applied to the intensity of the light by the logic implemented in the control system for even values of j. In this embodiment, as illustrated in column 3508, system logic is configured to decrease "<" light intensity in response to a "hold" for even values of j.

In operation, a first "tap" establishes a first color temperature $C=C_1(t)$ for i=1. In response thereto, light $C_1(t)$ is radiated at a preset intensity. A follow-on user interaction resulting in a first "hold" increases (column 3506 row 3510) the intensity of the radiated light $C_1(t)$ until the user release the "hold." A subsequent "hold," j=2, decreases "<" (column 3508, row 3510) the intensity of the light $C_1(t)$. A third "hold," j=3, is an odd value, where the direction taken by the intensity during the "hold" is given in column 3506 as decreasing "<." Thus, in one or more embodiments, a number of successive "holds" are processed as shown with columns 3506 and 3508, first increasing and then decreasing the intensity of the radiated light.

A second "tap" advances the system to a second color temperature function $C=C_2(t)$ for i=2. A third "tap" advances the system to a third color temperature function $C=C_3(t)$ for i=3. A fourth "tap" advances the system to a fourth color temperature function $C=C_4(t)$ for i=4. In each of these successive color temperature functions, an intensity is adjusted by one or more "holds" as described above in conjunction with $C_1(t)$.

Figure 36:
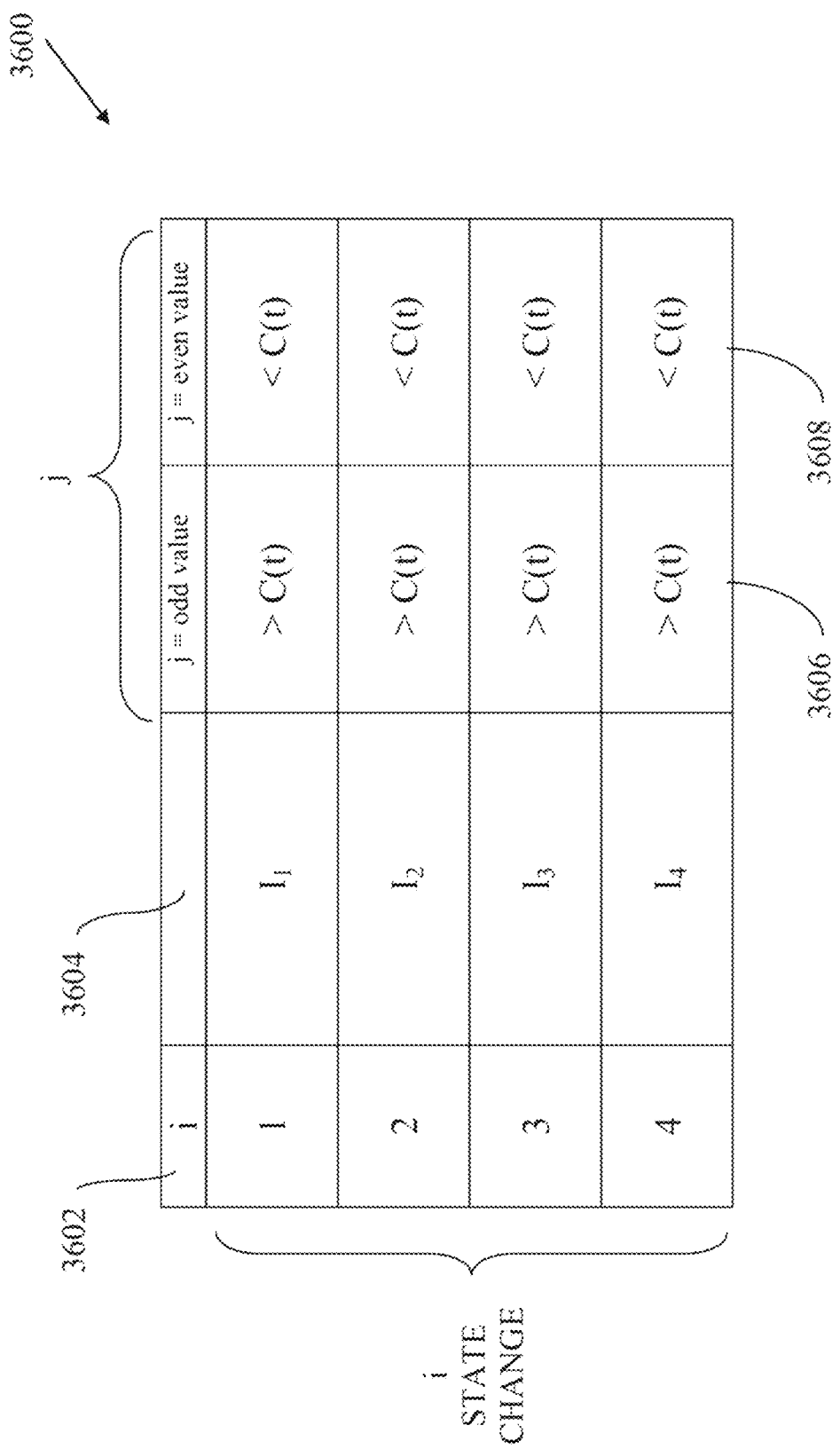
FIG. 36 illustrates a one-touch control system utilizing different parameters with the user interactions of "tap" and "hold," according to embodiments of the invention.

FIG. 36 illustrates, generally at 3600, a one-touch control system utilizing different parameters with the user interactions of "tap" and "hold," according to embodiments of the invention. With reference to FIG. 36, the logic implemented associates a "tap" with a change in intensity of the radiated light as illustrated in column 3604 with intensity values $I_1, I_2, I_3$, and $I_4$. In addition, this implementation of logic uses the "hold" to ramp up ">" the color temperature function C(t) of the radiated light as illustrated in a column 3606 for j=odd values. For j=even values, for the "hold," the logic ramps the color temperature function C(t) down "<" as illustrated in a column 3608. Ramping up a color temperature function C(t) increases a color temperature of the radiated light. Ramping down a color temperature function C(t) decreases a color temperature of the radiated light.

Figure 37:
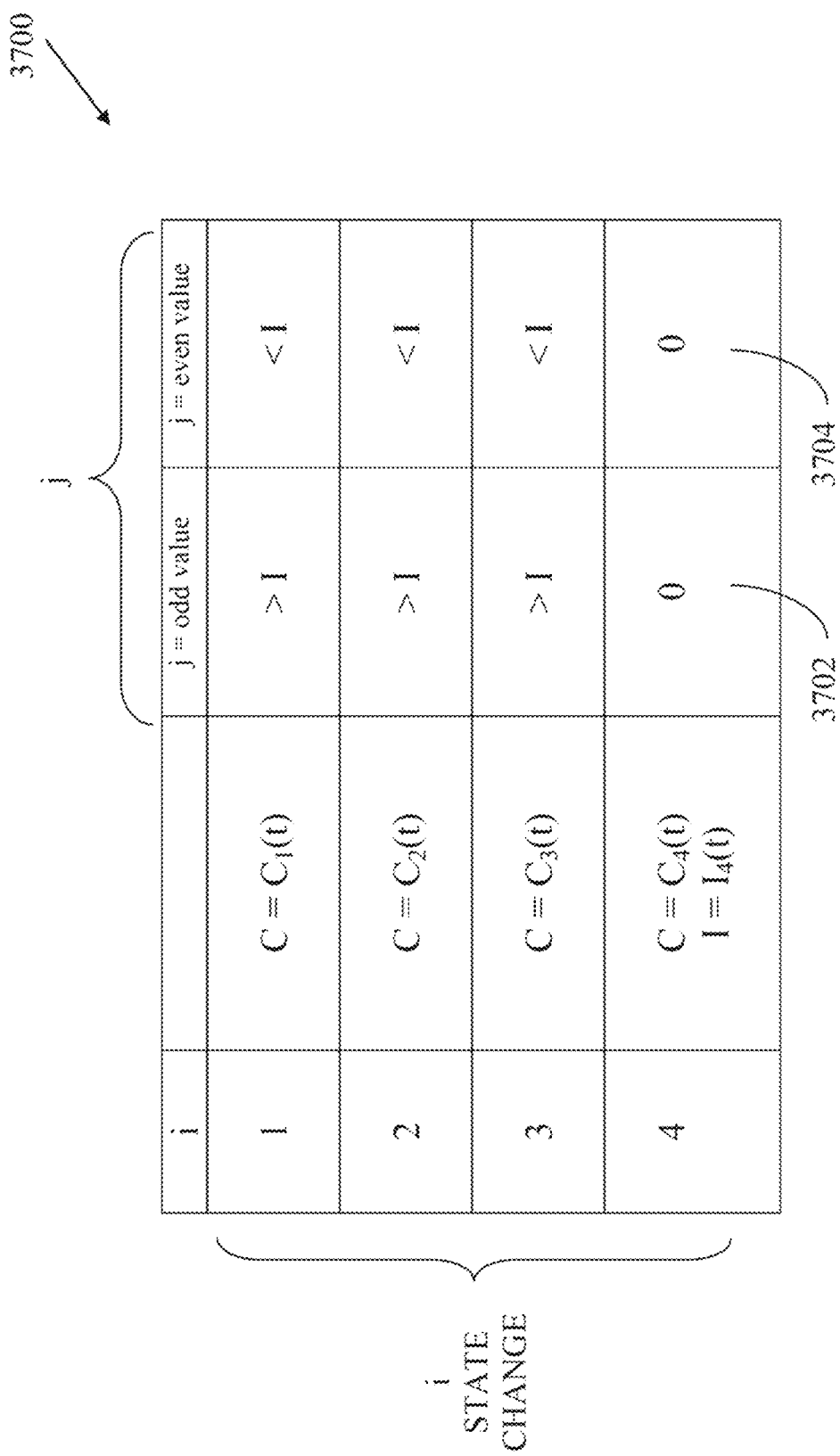
FIG. 37 illustrates a one-touch control system utilizing the first set of light color temperature functions and light intensity values as substantially shown in FIG. 35 where several entries are zero, according to embodiments of the invention.

FIG. 37 illustrates, generally at 3700, a one-touch control system utilizing the first set of light color temperature functions and light intensity values as substantially shown in FIG. 35 where now several entries are zero, according to embodiments of the invention. With reference to FIG. 37, the light color temperature function $C=C_4(t)$ is unchanged by user "hold" interaction as indicated by the zero entry in locations 3702 and 3704. In various embodiments, according to different system logic design implementations, one or more "hold" locations are set to zero. "Hold" locations 3702 and 3704 are used merely for illustration and do not limit embodiments of the invention. In some embodiments, a "night light" mode is used for i=4, $C=C_4(t)$ with no ability for the user to adjust the night light via a "hold." In other embodiments, zeros are not used at 3702 and 3704 resulting in the ability of the user tri adjust the night light through a "hold" interaction.

Figure 38:
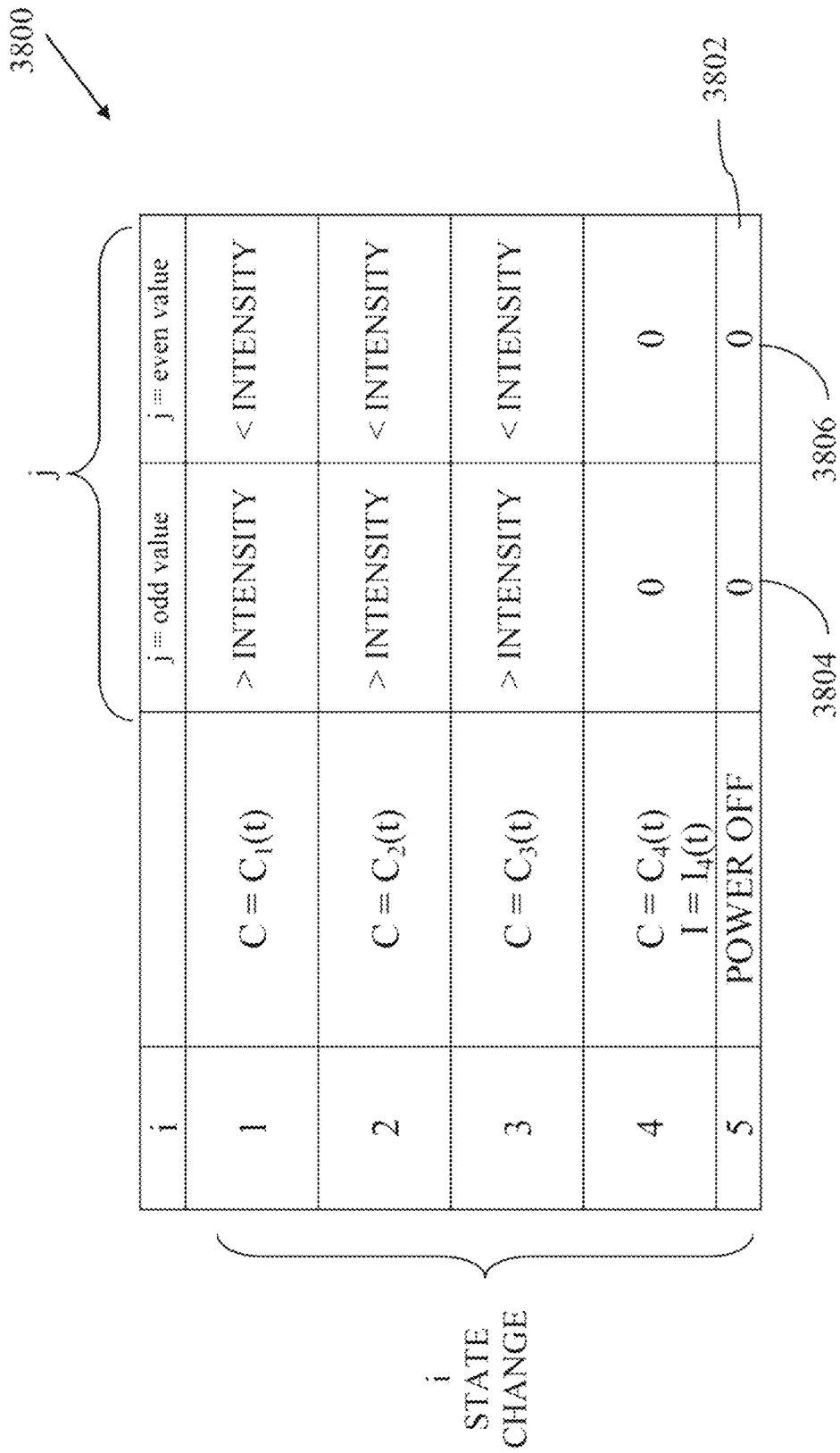
FIG. 38 illustrates a one-touch control system utilizing the first set of light color temperature functions and light intensity values from FIG. 37 with a power off state, according to embodiments of the invention.

FIG. 38 illustrates, generally at 3800, a one-touch control system utilizing the first set of light color temperature functions and light intensity values from FIG. 37 with a power OFF state, according to embodiments of the invention. With reference to FIG. 38, a fifth state, i=5, is provided as shown at 3802 that powers OFF the system. The system logic implemented in 3800 utilizes a zero at 3804 and 3806 indicating that a "hold" while in the OFF state does not result in a system response.

Figure 39:
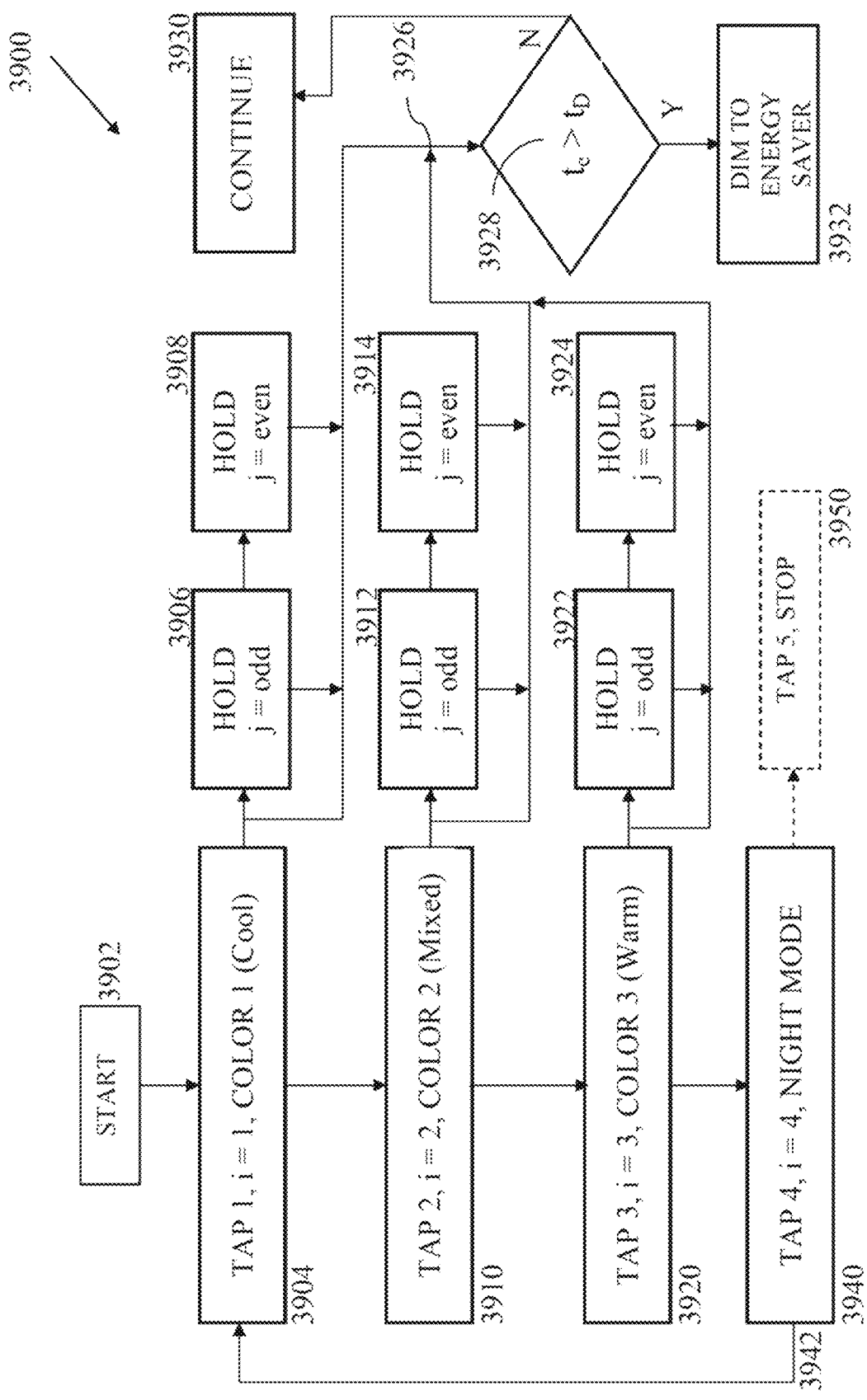
FIG. 39 illustrates a one-touch control system utilizing the first set of light color temperature functions and light intensity values from FIG. 37, adapted to a light color temperature operational schema, according to embodiments of the invention.

FIG. 39 illustrates, generally at 3900, a one-touch control system utilizing the first set of light color temperature functions and light intensity values from FIG. 37, adapted to a light color temperature operational schema, according to embodiments of the invention. With reference to FIG. 39, the light color temperature schema embodied in the system logic provides a constant color temperature as a function of time for states i=2, and i=3.

The first state, i=1, is entered by a user "tap" indicated at a block 3904 and provides a cool light color temperature approximately equal to 6,500 Kelvin. The second state, i=2, is entered by a user "tap" indicated at a block 3910 and provides a mixed light color temperature approximately equal to 4,600 Kelvin. The third state, i=3, is entered by a user "tap" indicated at a block 3920 and provides a warm light color temperature approximately equal to 2,700 Kelvin. The fourth state, i=4, is entered by a user "tap" indicated at a block 3940 and places the system Night mode providing a warm light color temperature approximately equal to 2,700 Kelvin with an intensity function that varies with time as described below.

In one or more embodiments, system logic is designed to power the system up from OFF into state 1 at i=1, setting the intensity of the light at 50% full scale and the color temperature of the light to cool at approximately 6,500 Kelvin. Similarly, when in Night mode (3940), at i=4, another "tap" by a user cycles the system back to the first state (3904) i=1, setting the intensity of the light at 50% full scale and the color temperature to cool at approximately 6,500 Kelvin. An optional OFF state is illustrated at 3950. In one embodiment, when the OFF state is provided, a user "tap" received in Night mode causes the system to power OFF to 3950 instead of cycling back to the first state at 3904.

When the system is in states i=1, i=2, and i=3, a first "hold" and all subsequent odd "holds" (indicated at 3906, 3912, or 3922) increase the intensity (brightness) until the "hold" is released or when 100% of full scale is reached. A second hold and all subsequent even "holds" (indicated at 3908, 3914, or 3924) decrease the intensity (brightness) until the "hold" is released or when the intensity has decreased to 7% of full scale.

In one embodiment, power saver logic is implemented by monitoring changes (3926) and elapsed time $t_e$ from the last time a light temperature color was selected (state change) or the light color temperature was changed if the light intensity is above a value. At 3928 if elapsed time $t_e$ is greater than the threshold time $t_1$ then the light intensity is automatically dimmed down to the value at 3932. If the elapsed time $t_e$ is not greater than the threshold time $t_1$ the system maintains at

3030 the intensity level that the user has previously established for the light. If the intensity of the light has been adjusted below the value the intensity is not dimmed. Given merely for illustration and with no limitation implied thereby, in one embodiment, the value is 25% of full scale and the threshold time is one hour. In other embodiments, the value and or the threshold time are different.

Power saving logic is implemented tear other electronic devices that are used in conjunction with a device. For example, a device incorporating light temperature control can be configured as a mirror. The mirror can include a defogger. In one embodiment, system logic is configured to power down the defogger at an elapsed time greater than a threshold time $t_1$ where the elapsed time is measured from the last light color selection made by a user. Given merely for illustration, and with no limitation implied thereby, in one embodiment, the threshold time is three hours. In other embodiments, the threshold time is different.

Night mode is entered at state 4 with i=4 at 3940. Night mode adjusts the light color temperature to a warm light temperature approximately equal to 2,700 Kelvin. In Night mode, the light intensity is not constant but follows a predefined function of time similar to the description given above in conjunction with FIG. 10 for night light mode. When the system enters Night mode, the light intensity is decreased to c %, where c %=1.5% of full scale. The intensity gradually decreases over a period of time to e %, where e %=0.5% of full scale. In one embodiment, the period of time is 20 minutes which permits the human eye to naturally adjust to the diminished light intensity. In other embodiments, a different period of time, different values for c % and e % can be implemented. Values are provided merely for illustration and do not limit embodiments of the invention.

In various embodiments, the system logic utilizes smooth transitions between state changes in response to "taps" at 3904, 3910, 3920 3940, 3942 and/or 3950 if a power OFF is provided. Given merely for illustration, and with no limitation implied thereby, in one embodiment, the transition time between state changes is two seconds. In other embodiments, a different transition time is implemented.

The control functionality, "tap" for state change i and "hold" j, used to select values for the two system parameters has been described in the figures above where a "tap" is used to adjust a first parameter, e.g., color temperature and a "hold" is used to adjust intensity. Alternatively, a "tap" and a "hold" can be applied differently or non-uniformly across the states. For example, in one embodiment referring to FIG. 37, instead of applying zero at 3702 and 3704, the "hold" in this state, i=4, is used to adjust a color temperature of the light displayed. One sample of this functionality is described with Night mode. Night mode, as described above, varies light intensity I as a function of time. Such a variation is represented by $1=I_4(t)$. Thus, at 3702, the color temperature is now configured to increase ">" and at 3704 the color temperature is now configured to decrease "<" in response to a "hold" while the system is in Night mode state i=4.

Embodiments of the invention can be used to select a color temperature of light that is used to illuminate a user during an application of makeup with the device. For example, a user of a device with a color temperature selectable light source can match the color temperature of a future lighting environment that the user is planning an activity for by adjusting the color temperature of the present environment during the application of makeup with the device. When planning for outdoor activities in sun light, a user selects the cool color temperature state in the range of 6,000K to 7,000K during application of makeup with the device. If the activity is an indoor event such as a meeting at work, a user selects the lighting color temperature state of approximately 4,600K for illumination during application of makeup with the device. If the activity is an evening activity such as dinner, nightclub, theater, etc. the user selects color temperature state of approximately 2,700K during application of makeup with the device. Color temperatures used in the states are selectable, the numbers given in the examples above are used merely for illustration and do not limit embodiments of the invention. Embodiments of the invention are configured to select a plurality of different color temperatures within a range that exists between the different color temperature lights used for the light sources.

In some embodiments, a "hold" is provided to enable the user to create a fine adjustment of the color temperature of the light emitted by the device. In other embodiments, user feedback is provided in a viewing window that communicates to the user the color temperature selected. For example, in one non-limiting embodiment, if the color temperature of the light source has been selected to 6,500 K then 6,500 K is displayed in the viewing, window to provide feedback to the user on the state that the system has entered.

In some embodiments, a device is provided with beacon functionality, such that when a user is within a detection range of the beacon, an audio tutorial is played to communicate to the user aspects of the logic contained within the functionality of the schema. In the example give above, an audio tutorial would explain to a user the functionality accomplished by a "tap" and a "hold." In other embodiments, the audio tutorial would be different in accordance with the needs of a given embodiment.

FIG. 40 illustrates, generally at 4000, color temperature associated with different lighting sources. With reference to FIG. 40, a table 4002 illustrates color temperatures that are emitted from different sources of light, where color temperature is listed in a column 4004 and the corresponding sources of light are listed in a column 4006. The table 4002 can be used to construct a desired color temperature profile (DCTP) as a function of time for a user's environment. According to various embodiments of the invention, a device is used to produce the desired color temperature time profile described below in conjunction with the figures that follow. In some embodiments, the desired color temperature time profile would not ordinarily exist in the geographical area of interest because of various reasons such as location on the planet, local weather conditions, indoor environments with lack of windows, time of day, etc.

The DCTP includes an array of color temperature values and their corresponding times during the day. An example, merely for illustration, with no limitation implied thereby, is a selection of values to create a natural progression of outdoor light having a color temperature that ranges from 1,850 Kelvin (K) at sunrise to 6,500 K (daytime) and back down to 1,850 K at sunset. The DCTP array is illustrated by variable $C2_i(t)$ and corresponds, in one or more embodiments, to 4156 in FIG. 41.

Figure 41:
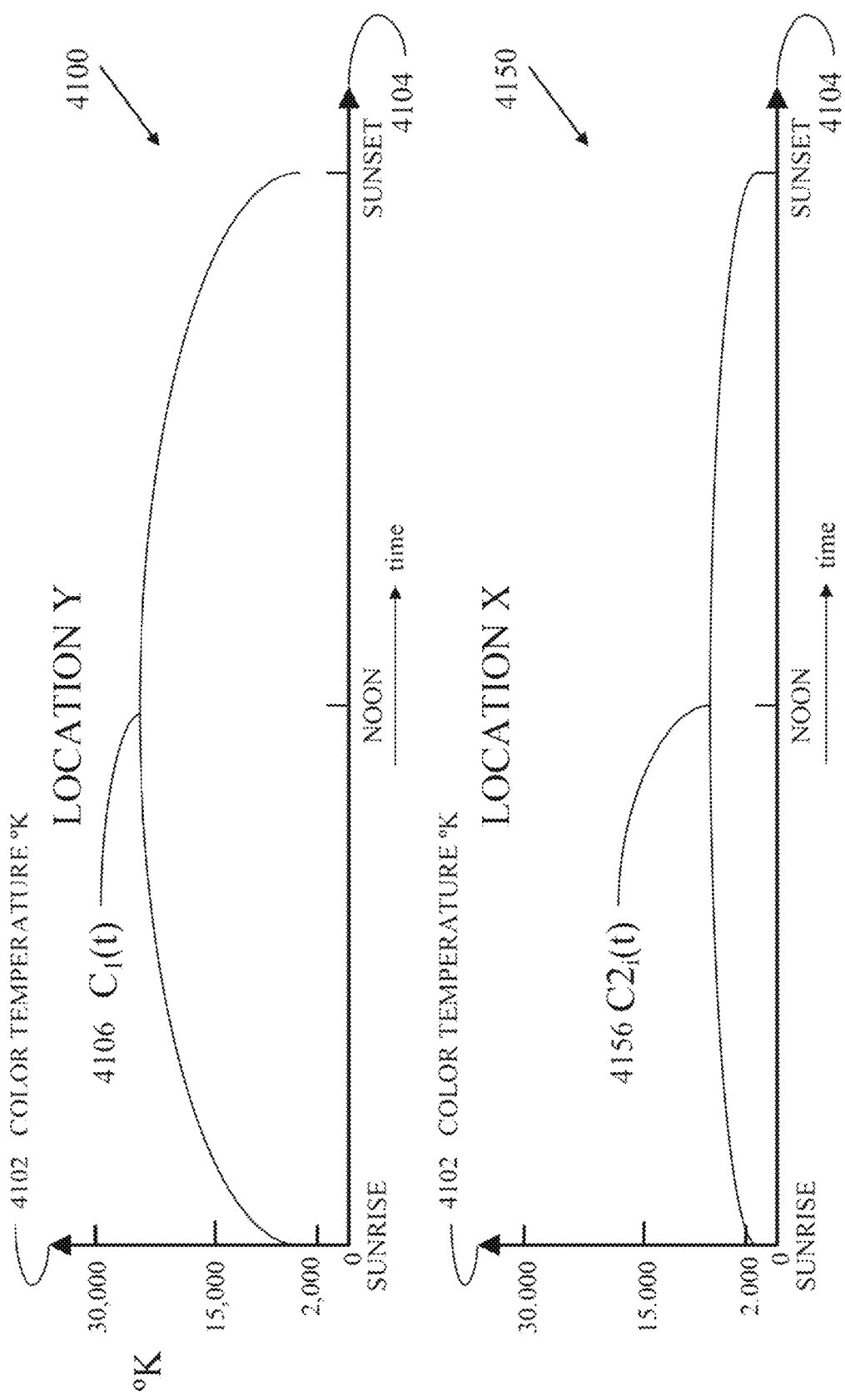
FIG. 41 illustrates color temperature profiles for two locations, according to embodiments of the invention.

FIG. 41 illustrates, generally at 4100, color temperature profiles for two locations, according to embodiments of the invention. With reference to FIG. 41, a color temperature time profile 4106 is illustrated for a Location Y. The temperature time profile 4106 is plotted with time of day along a horizontal axis at 4104. On a vertical axis 4102 light color temperature is plotted.

The light color temperature profile 4106 can be an example of an undesirable light color temperature time profile. In 4150, the light color temperature time profile

4156 illustrates the desired light color temperature profile (DCTP) that the system will create in Location Y In some embodiments, it is desirable to create a DCTP with a greater degree of warm light and less cool light as illustrated in this non-limiting embodiment provided merely for illustration.

Figure 42:
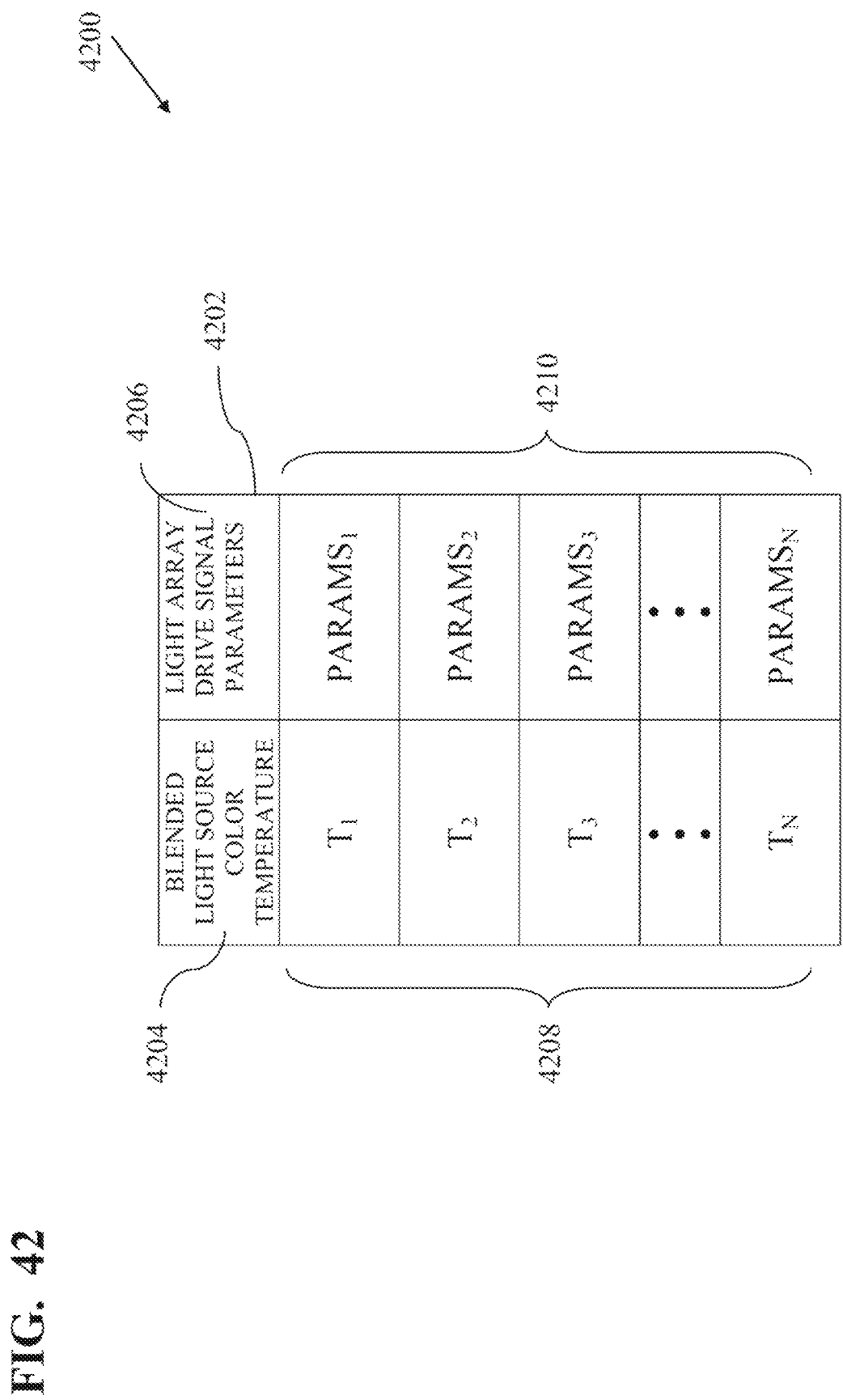
FIG. 42 illustrates a light source calibration, according to embodiments of the invention.

FIG. 42 illustrates, generally at 4200, a light source calibration, according to embodiments of the invention. With reference to FIG. 42, a system of two or more light sources, each with a different color temperature are calibrated to obtain light array drive signal parameters that are needed to produce a given radiated light color temperature from the system. A table of values is illustrated at 4202 to represent the calibration. A column 4204 contains the blended light source color temperatures 4208. A blended light source color temperature is the color temperature that results from the contribution of the individual light sources. Typically, but not always, a blended light source color temperature is a different value from either of the individual light source color temperatures that are used to create the blended light. In some embodiments, a source of infrared light is used as one of the light sources to create the final blended light.

A column 4206 contains the light array drive signal parameters 4210 that are used to produce the blended light color temperatures 4208. Light array drive signal parameters include the parameters that are used by a pulse width modulation (PWM) drive module described above in conjunction with the previous figures if PWM is used to produce blended light. In other embodiments, techniques other than PWM are used and appropriate data are stored. In various embodiments, the light source calibration is performed with the aid of a light temperature standard such as for example the Sekonic C-700R-U SpectroMaster Color Meter. An alternative light temperature standard is obtained using a mobile device such as an iPhone® running a Cine Meter 11 iPhone® application program. The light temperature standard is used to quantify the particular light temperature associated with a set of light source drive signal parameters.

In one embodiment, a blended light color temperature source calibration is performed by setting a first light color temperature source to a minimum output value and then stepping the second light color temperature source through a range of output values. The color temperature of the blended light is recorded (along with the light source drive level parameters, e.g., drive frequency and percent ON time if the light sources are being driven by a PWM controller) using the color temperature standard as the second light color temperature source is incremented through the range of output values. The calibration continues by incrementing the output of the first light color temperature source and then repeating the process with the second light color temperature source, i.e., stepping through the range of output values while recording the blended light out color temperature using the standard. The calibration process continues and the color temperature of the system is obtained at the desired drive range levels. The calibration described above can be used with a general number of light color temperature sources. The description presented above is provided with two light color temperature sources; however no limitation is implied thereby. From the calibration so described, light array drive signal parameters are selected for use at 4210 in order to produce the desired light color temperatures 4208. Blended light source calibration can be performed with methods other than the one described above. The calibration description provided herein is one non-limiting example given for merely for illustration.

In various embodiments, referring back to FIG. 30, the system 3000 is used to change the color temperature of a device that emits light using the data in table 4202. In one or more embodiments, light array drive signal parameters 4210 are stored and are used by the system 3000 to produce the desired blended light source color temperatures 4208 in Location Y (FIG. 41). Thus, a lighting environment in Location Y is changed to match the desired lighting environment of Location X.

Figure 43:
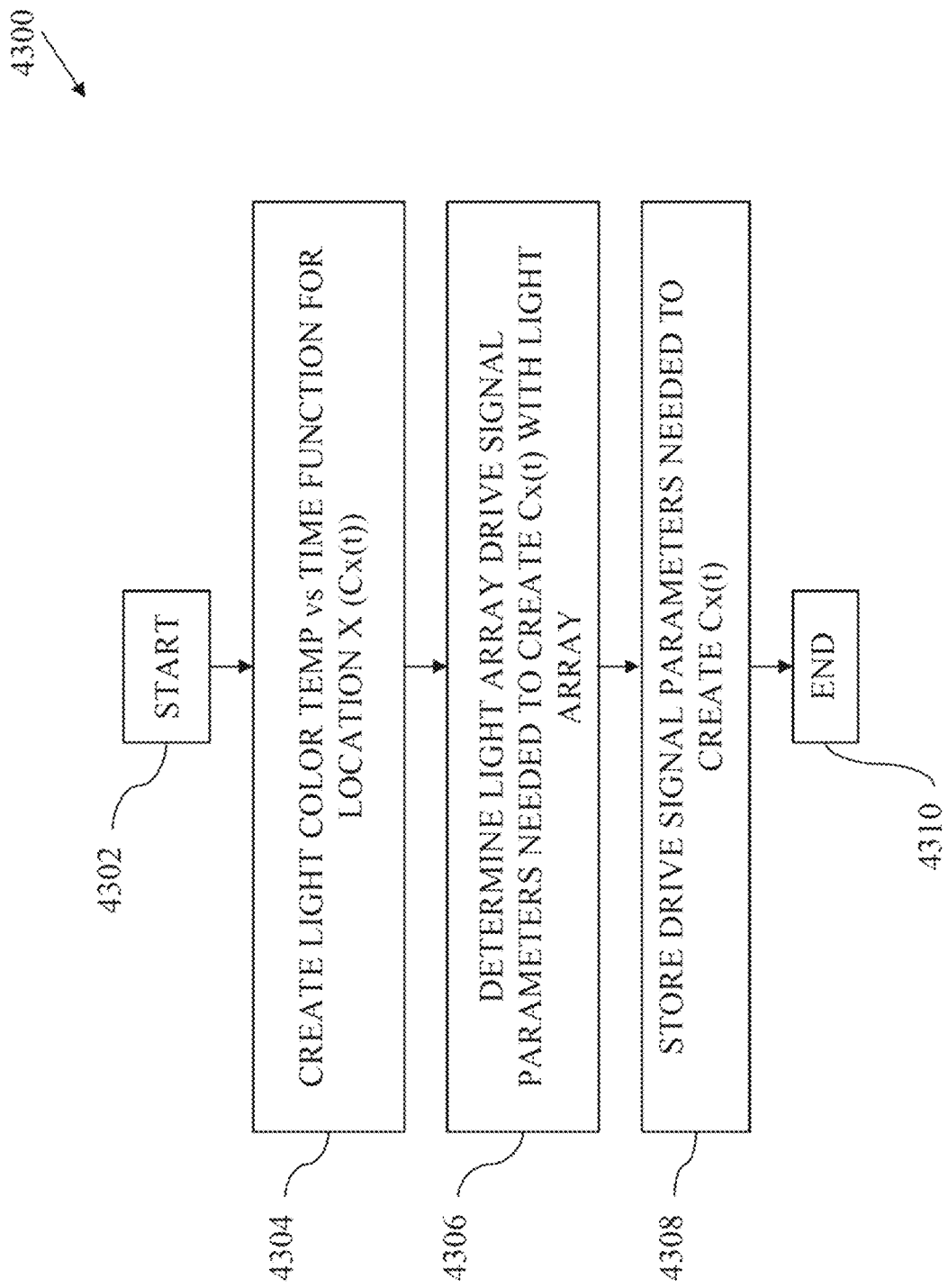
FIG. 43 illustrates determining drive signal parameters according to embodiments of the invention.

FIG. 43 illustrates, generally at 4300, determining drive signal parameters according to embodiments of the invention. With reference to FIG. 43, another method is illustrated to obtain a desired color temperature profile (DCTP). A process starts at a block 4302. At a block 4304 a desired color temperature time profile is obtained for a location of interest, e.g., Location X. The DCTP can be obtained by direct measurement of the color temperature at a geographical location of interest as a function of time. For example, a color temperature standard, as described above in conjunction with the light source calibration is used to record light color temperature throughout the day or at a set of times during the day at Location X; these data are used to provide Cx(t), At a block 4306 the light array drive signal parameters needed to create Cx(t) are determined from the calibration performed in conjunction with FIG. 42. These parameters are PARAM$_x$. At a block 4308 the drive signal parameters determined in the block 4306 are stored in association with Cx(t). The process stops at a block 4310. The process of FIG. 43 can be repeated in various geographical locations such as California, Florida, Greece, etc. thereby accumulating a series of DCTP data that can be used to create lighting environments for Location X.

In various embodiments, the parameters in array PARAM$_x$ are used with system 3000 (FIG. 30) to create a desired color temperature time profile for Location X as described herein.

Figure 44:
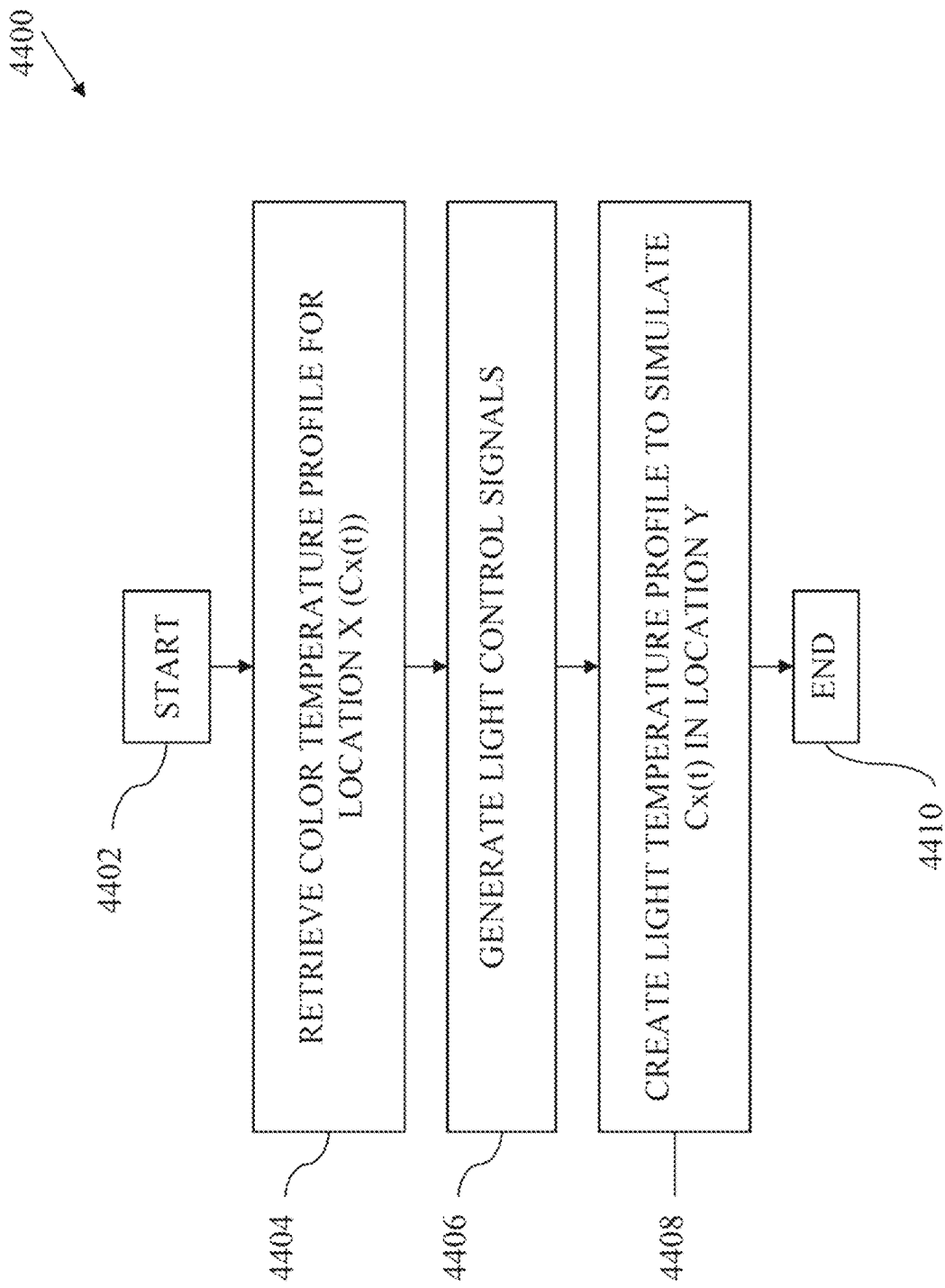
FIG. 44 illustrates creating a lighting color temperature time profile in a location, according to embodiments of the invention.

FIG. 44 illustrates, generally at 4400, creating a lighting color temperature time profile in a location, according to embodiments of the invention. With reference to FIG. 44, a process starts at a block 4402. At a block 4404 a color temperature profile is retrieved for use a geographical area with a lighting color temperature control system. At a block 4406 lighting array control signals are generated. At a block 4408 a DCTP is created in Location Y simulating the desired color temperature from Location X.

Figure 45:
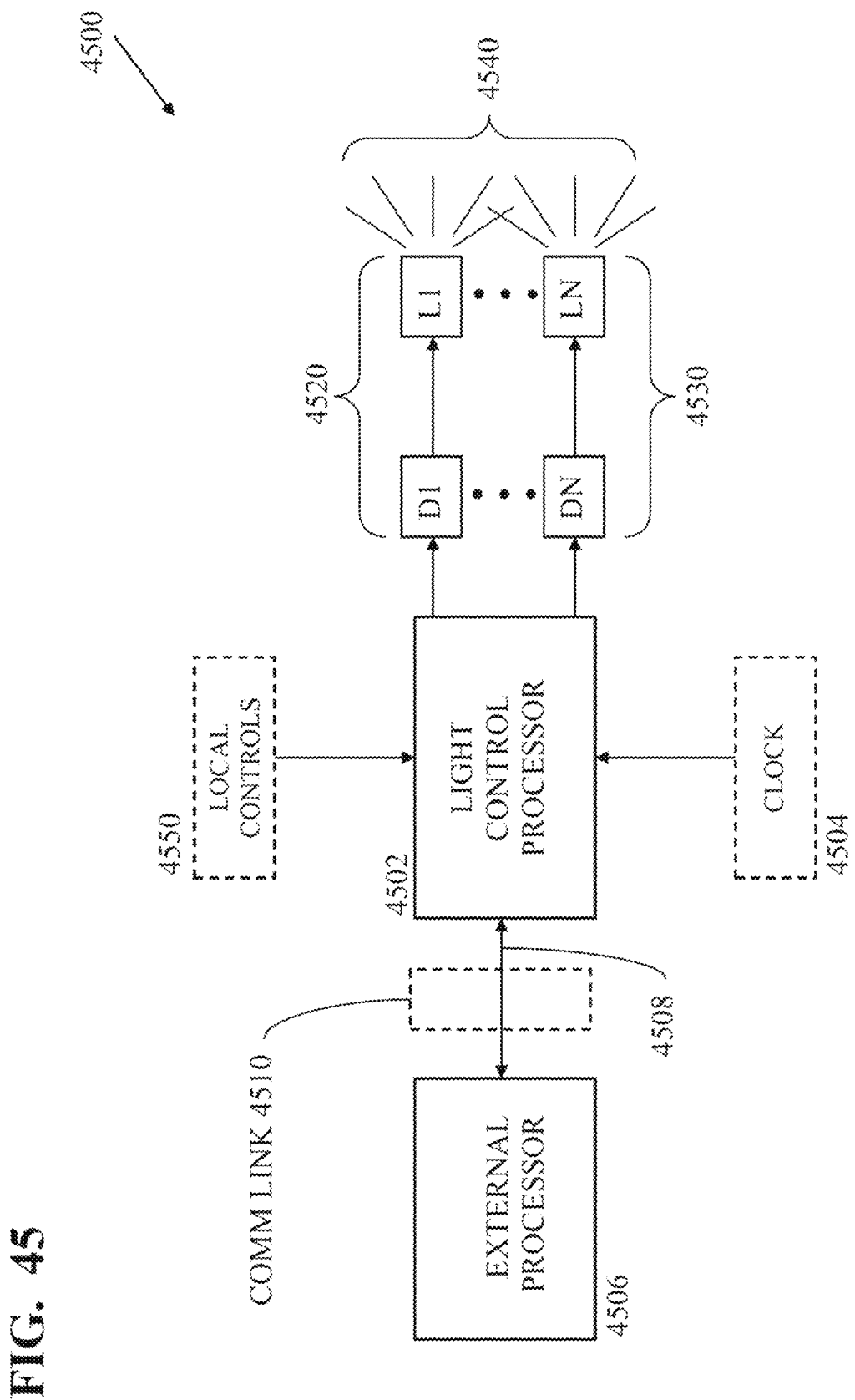
FIG. 45 illustrates a light temperature control system according to embodiments of the invention.

FIG. 45 illustrates, generally at 4500, a light temperature control system according to embodiments of the invention. With reference to FIG. 45, a light control processor 4502 is configured to process light array drive signal parameters described above. The light control processor 4502 provides drive signals to a number of different light color temperature sources indicated at 4520 through 4530. For example, light color temperature source 4520 emits light at a first color temperature. Light color temperature source 4530 emits light at a second color temperature. The light control processor 4502 processes the light array drive signal parameters in order to create blended light 4540 for a desired light color temperature profile (DCTP) that corresponds with the light array drive signal parameters.

Light control processor 4502 is configured with an input from a clock 4504. In some embodiments local controls are optionally provided at 4550. In various embodiments, a user device 4506 is in electrical communication at 4508 with the light control processor 4502. In some embodiments, the user device 4506 is in wireless communication via communications link 4510 with the light control processor 4502. A user device can contain a variety of color temperature profile data, as described above, for various locations that a user wishes to create in the user's local environment. In operation, the user transfers a selected DCTP (that can be represented by Cx(t)) to the light control processor 4502 in order to experience the desired light color temperature time profile in the user's local environment.

In various embodiments, a portion of the light temperature control system 4500 is implemented in an integrated circuit device, which may include an integrated circuit package containing the integrated circuit. In some embodiments, light temperature control system 4500 or part of the light temperature control system 4500 is implemented in a single integrated circuit die. In other embodiments, the light temperature control system 4500 is implemented in more than one integrated circuit die of an integrated circuit device which may include a multi-chip package containing the integrated circuit.

In some embodiments, the light temperature control system of FIG. 45 is also represented with one of more of the figures described herein.

In some embodiments, a user creates the Cx(t) data with an application program that runs on the user's device 4506. In various embodiments, the user device 4506 is a computing device, such as, but not limited to; mobile phone, a computer, a tablet, wrist band computing device, etc. An application program that is configured for use on a user device uses a light sensor input and interfaces with a light standard, such as the software program described above for use with the iPhone® to create the Cx(t) data for a given location.

In various embodiments of operation, a user travels to a geographical area. In the geographical area, the user measures a Cx(t) profile for the area with the application program. The application program stores the values of light color temperature collected during the day or night. The geographical location might be for example a desired location, such as, but not limited to; California, Arizona, New Mexico, Mexico, Greece, a location with a warm climate, an equatorial location, etc. The user might take such a trip specifically to collect light color temperature data for treatment of a medical condition. When the user returns home from the trip the user recreates the light environment using Cx(t) (collected in the geographical location) and a system as described herein to provide a controlled lighting environment that simulates the Cx(t) collected in the geographical location for the user in the user's local environment of interest.

In other embodiments of operation, a plurality of DCTP data are collected from different geographical areas, represented as Cx(t)$_i$ where i is in the range 1 to N, with N being the number of different geographical locations where DCPT data has been collected. A user can retrieve desired Cx(t)$_i$, data wirelessly and use the Cx(t)$_i$ data to adjust the local lighting environment accordingly.

Embodiments of the invention are used to control light color temperature in various environments, such as, but not limited to; home environments, hospitality environments, school environments, healthcare environments, work environments including office, factory, and warehouse environments, commercial environments, public environments, jails or correctional centers, etc. Environments that embodiments of the invention are employed in to control light color temperature are both indoor and outdoor.

In some embodiments, a light room is configured with light sources that emit light of a known color temperature. The light emitted at the known color temperature can be at a constant color temperature or it can be adjusted as a function of time. A light room can vary in size from a small room, much like the size of a small sauna, or a light room can be very large on the scale of the size of a warehouse. Light rooms designed to emit light at color temperature(s) that supplement what a human is not getting because of light constraints whether manmade or natural can improve the state of health of the human.

In some embodiments, a home environment is equipped with lights that have color temperature control providing the ability to control the color temperature in one or more of the MOMS of the house, either individually, in a group, or in unison. For example, in one embodiment, the bedroom is equipped with a source of light that has color control functionality and a system designed, as described herein, is used to control the color temperature in conformance with a user defined function or a preprogrammed schema. One non-limiting example of a schema designed for a home environment would adapt the light color temperature according to the rise of a given room with consideration of the time of day. For example, at a time in the evening when occupants are headed for bed, bedrooms are provided with warm color temperature light, a computer room is provided with cool color temperature light and a kitchen is provided with a mix at approximate 4700 K. These color temperate res are modified during the day in a fashion that supports human health and vitality.

In some embodiments, the preprogrammed schema is designed to support natural human biorhythms by conforming to the natural progression of light in an optimal outdoor location such as, for example, warm at sunrise progressing to cool at midday and then progressing back to warm at sunset. Such a schema can be used in geographical locations such as at northern latitudes or southern latitudes to help correct the extremes in light color temperature that exist therein at various times of the year. Thus, embodiments of the invention are used to correct light deprivation in a variety of environments.

For purposes of discussing and understanding the different embodiments, it is to be understood that various terms are used by those knowledgeable in the art to describe techniques and approaches. Furthermore, in the description, for purposes of explanation, numerous specific details are set forth in order to provide a thorough understanding of an embodiment, It will be evident, however, to one of ordinary skill in the art that an embodiment may be practiced without these specific details, In some instances, weft-known structures and devices are shown in block diagram form, rather than in detail, in order to avoid obscuring various embodiments. These embodiments are described in sufficient detail to enable those of ordinary skill in the an to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk- read only memories (CD-ROMs), and magnetic-optical disks, read-only memories (ROMs), random access memories (RAMs), dynamic random access memories (DRAM), electrically programmable read-only memories (EPROM)s, electrically erasable programmable read-only memories (EEPROMs), FLASH memories, magnetic or optical cards, RAID, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient construct more specialized apparatus to perform the required method. For example, any of the methods according to the embodiments can be implemented in hard-wired circuitry, by programming a general-purpose processor, or by any combination of hardware and software. One of ordinary skill in the art will immediately appreciate that the embodiments can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The embodiments can also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, the embodiments are not described with reference to any particular programming language. It will be appreciated that a variety of programming languages may be used to implement the teachings of the embodiments as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical representation in at least hardware and/or software (such as a computer system in which the techniques of the present invention may be practiced as well as implemented as an embodiment).

Non-transitory machine-readable media is understood to include any mechanism for storing information (such as program code, etc.) in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, stricture, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a memory;
   a processor, the processor is configured to access the memory;
   a value of a desired light color temperature-time function, the value is to be read from the memory;
   a first light driver, the first light driver is in electrical communication with a first light source and the processor, the first light source having a first color temperature; and
   a second light driver, the second light driver is in electrical communication with a second light source and the processor, the second light source having a second color temperature; wherein the processor is configured to create a first light drive signal for the first light source and a second light drive signal for the second light source in response to the value, wherein a combination of light emitted from the first light source and from the second light source creates light having a third color temperature, the third color temperature is responsive to the value.

2. A method comprising:

reading a value of a desired light color temperature-time function;

selecting a first drive signal parameter for a first light source having a first color temperature and a second drive signal parameter for a second light source having a second color temperature, wherein the selecting is performed to create a color temperature for the value; and emitting first light from the first light source and second light from the second light source wherein the first light and the second light combine to form light at the color temperature for the value.

3. A system for execution by a data processing system to create light having a specified color temperature, the system comprising:

a memory;

a processor, the processor is in electrical communication with the memory; and a computer program, the computer program and the processor to cause the data processing system to perform the steps comprising:

reading a value of a desired light color temperature-time function from the memory;

selecting a first drive signal parameter for a first light source having a first color temperature and a second drive signal parameter for a second light source having a second color temperature, wherein the selecting is performed to create a color temperature for the value; and emitting first light from the first light source and second light from the second light source wherein the first light and the second light combine to form light at the color temperature for the value, wherein the color temperature for the value is the specified color temperature.

4. A computer-readable storage medium storing program code for causing a data processing system to perform the steps comprising:

reading a value from a desired light color temperature-time function;

selecting a first drive signal parameter for a first light source having a first color temperature and a second drive signal parameter for a second light source having a second color temperature, wherein the selecting is performed to create a color temperature for the value; and emitting first light from the first light source and second light from the second light source wherein the first light and the second light combine to form light at the color temperature for the value.

5. A system to provide light source color temperature control within a hospitality environment, comprising:

a plurality of devices, each device of the plurality is configured to permit adjustment of a color temperature of emitted light, each device further comprising:

a communication interface; and a light source color temperature control, the light source color temperature control is configured to receive input instructions from the communication interface and to output a light source color temperature drive signal;

a communication network; the communication network is in communication with each communication interface; and a control system, the control system is in communication with the plurality of devices through the communication network, the control system is configured to receive, as an input, a desired light source color temperature, in operation, the control system is configured to output desired light source color temperature information to each device, the desired light source color temperature information is responsive to the input, the desired light source color temperature information will cause each device to emit light at the desired light source color temperature.

6. The system of claim 5, each device further comprising:

a light source, the light source is configured to emit light at a color temperature responsive to the light source color temperature drive signal.

7. The system of claim 6, wherein the light source further comprising:

a first light source device, the first light source device emits light at a first color temperature; and a second light source device, the second light source device emits light at a second color temperature, the first color temperature is different from the second color temperature.

8. The system of claim 5, wherein the control system is a mobile device.

9. The system of claim 5, wherein at least one device of the plurality is a lighted mirror.

10. The system of claim 5, wherein in operation, the control system provides for local control of a color temperature of emitted light at a device of the plurality.

11. A method to provide light source color temperature control within a hospitality environment, comprising:

receiving a desired light source color temperature input for the hospitality environment;

sending light source color temperature information to a plurality of devices within the hospitality environment, wherein each device of the plurality is configured to permit adjustment of a color temperature of emitted light;

driving each device of the plurality with a light source color temperature drive signal; and illuminating the hospitality environment with the plurality of devices.

12. The method of claim 11, wherein the receiving occurs at a mobile device.

13. The method of claim 12, wherein the mobile device is a mobile telephone.

14. A computer-readable storage medium storing program code for causing a data processing system to perform the steps comprising:

receiving a desired light source color temperature input for a hospitality environment; and sending light source color temperature information to a plurality of devices within the hospitality environment, wherein each device of the plurality is configured to permit adjustment of a color temperature of emitted light.

15. The computer-readable storage medium of claim 14, wherein the receiving occurs at a mobile device.

16. The computer-readable storage medium of claim 15, wherein the mobile device is a mobile telephone.

17. The system of clain 3, wherein the first light source and the second light source are configured in a lighted i irror.

18. The method of claim 11, wherein at least one device of the plurality is a lighted mirror.

* * * * *